United States Patent
Zeng et al.

(10) Patent No.: US 10,268,685 B2
(45) Date of Patent: *Apr. 23, 2019

(54) STATISTICS-BASED MACHINE TRANSLATION METHOD, APPARATUS AND ELECTRONIC DEVICE

(71) Applicant: Alibaba Group Holding Limited, Grand Cayman (KY)

(72) Inventors: Xiaodong Zeng, Hangzhou (CN); Weihua Luo, Hangzhou (CN); Feng Lin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/247,490

(22) Filed: Aug. 25, 2016

(65) Prior Publication Data

US 2017/0060854 A1   Mar. 2, 2017

(30) Foreign Application Priority Data

Aug. 25, 2015 (CN) .......................... 2015 1 0527745

(51) Int. Cl.
*G06F 17/28* (2006.01)
*G06F 17/27* (2006.01)

(52) U.S. Cl.
CPC ...... *G06F 17/2818* (2013.01); *G06F 17/2705* (2013.01); *G06F 17/2785* (2013.01); *G06F 17/2872* (2013.01)

(58) Field of Classification Search
None
See application file for complete search history.

(56) References Cited

U.S. PATENT DOCUMENTS

| 4,905,188 A | 2/1990 | Chuang et al. |
| 5,418,922 A | 5/1995 | Liu |

(Continued)

FOREIGN PATENT DOCUMENTS

| CN | 101079028 A | 11/2007 |
| CN | 102214166 A | 10/2011 |

(Continued)

OTHER PUBLICATIONS

PCT Invitation to Pay Additional Fees dated Dec. 30, 2016 for PCT Application No. PCT/IB2016/001563, 2 pages.

(Continued)

*Primary Examiner* — Satwant K Singh
(74) *Attorney, Agent, or Firm* — Lee & Hayes, P.C.

(57) ABSTRACT

A statistics-based machine translation method is disclosed. The method generates probabilities of translation from a sentence to be translated to candidate translated texts based on features of the candidate translated texts that affect the probabilities of translation and a pre-generated translation probability prediction model. The features that affect probabilities of translation include at least degrees of semantic similarity between the sentence to be translated and the candidate translated texts. A preset number of candidate translated texts with highly ranked probabilities of translation are selected to serve as translated texts of the sentence to be translated. The method is able to go deep into a semantic level of a natural language when a machine translation model is constructed to avoid a semantic deviation of a translated text from an original text, thereby achieving the effect of improving the quality of translation.

10 Claims, 30 Drawing Sheets

(56) References Cited

U.S. PATENT DOCUMENTS

| | | |
|---|---|---|
| 5,664,154 A | 9/1997 | Purcell et al. |
| 5,768,603 A | 6/1998 | Brown et al. |
| 5,845,323 A | 12/1998 | Roberts et al. |
| 6,065,101 A | 5/2000 | Gilda |
| 6,138,213 A | 10/2000 | McMinn |
| 7,113,903 B1 | 9/2006 | Riccardi et al. |
| 7,454,326 B2 | 11/2008 | Marcu et al. |
| 7,533,013 B2 | 5/2009 | Marcu |
| 7,698,124 B2 | 4/2010 | Menezes et al. |
| 8,099,376 B2 * | 1/2012 | Serrano-Morales ... G06N 5/025 706/47 |
| 9,002,696 B2 | 4/2015 | Kraenzel et al. |
| 9,317,501 B2 | 4/2016 | Kraenzel et al. |
| 9,471,883 B2 * | 10/2016 | Chatterjee ............ G06N 99/005 |
| 2006/0265209 A1 | 11/2006 | Bradford |
| 2007/0186073 A1 | 8/2007 | Luick |
| 2008/0154577 A1 | 6/2008 | Kim et al. |
| 2009/0083023 A1 | 3/2009 | Foster et al. |
| 2009/0248422 A1 | 10/2009 | Li et al. |
| 2009/0326912 A1 | 12/2009 | Ueffing |
| 2010/0179803 A1 * | 7/2010 | Sawaf ..................... G06F 17/28 704/2 |
| 2014/0163951 A1 | 6/2014 | Nikoulina et al. |
| 2014/0207439 A1 * | 7/2014 | Venkatapathy ..... G06F 17/2836 704/4 |
| 2014/0229158 A1 | 8/2014 | Zweig et al. |
| 2014/0350914 A1 | 11/2014 | Andrade Silva et al. |
| 2017/0060854 A1 | 3/2017 | Zeng et al. |
| 2017/0060855 A1 * | 3/2017 | Song ................... G06F 17/2818 |

FOREIGN PATENT DOCUMENTS

| | | |
|---|---|---|
| CN | 104391842 A | 3/2015 |
| EP | 0570660 | 11/1997 |
| JP | 2001273293 A | 10/2001 |
| WO | WO9708604 | 3/1997 |
| WO | WO2015029241 | 3/2015 |

OTHER PUBLICATIONS

PCT Search Report and Written Opinion dated Jan. 12, 2017 for PCT Application No. PCT/US16/48751, 13 pages.

PCT Search Report and Written Opinion dated Mar. 10, 2017 for PCT application No. PCT/IB16/01563, 15 pages.

PCT Invitation to Pay Additional Fees dated Oct. 21, 2016 for PCT Application No. PCT/US16/48722, 2 pages.

PCT Invitation to Pay Additional Fees from corresponding PCT application No. PCT/US16/48751, dated Oct. 7, 2016, 2 pages.

Office action for U.S. Appl. No. 15/247,690, dated Jun. 1, 2018, Song, "Method and system for generation of candidate translations", 6 pages.

Translation of Search Report from corresponding Chinese Patent Application No. 2015105277458, dated Sep. 26, 2018, 2 pages.

* cited by examiner

```
                                                                    ← 1900

┌─────────────────────────────────────────────────────────────────┐
│ CONSTRUCT RESPECTIVE NEURAL NET LANGUAGE MODEL SAMPLES CORRESPONDING TO │
│ N-GRAM PHRASES INCLUDED IN THE SOURCE LANGUAGE SENTENCE TO BE CALCULATED │
│ AND THE TARGET LANGUAGE SENTENCE TO BE CALCULATED BASED ON PRE-GENERATED │─ S1906
│ CORRESPONDENCE RELATIONSHIPS BETWEEN WORDS AND WORD VECTORS, A NEURAL │
│ NET LANGUAGE MODEL CORRESPONDING TO A SOURCE LANGUAGE AND A NEURAL NET │
│           LANGUAGE MODEL CORRESPONDING TO A TARGET LANGUAGE             │
└─────────────────────────────────────────────────────────────────┘
                                      │
                                      ▼
┌─────────────────────────────────────────────────────────────────┐
│        OBTAIN THE SENTENCE VECTOR OF THE SOURCE LANGUAGE SENTENCE TO BE │
│      CALCULATED AND THE SENTENCE VECTOR OF THE TARGET LANGUAGE SENTENCE TO BE │
│    CALCULATED THROUGH LEARNING, BY MAXIMIZING A SUM OF LIKELIHOOD PROBABILITIES │
│       OF RESPECTIVE NEURAL NET LANGUAGE MODEL SAMPLES CORRESPONDING TO THE N- │
│    GRAM PHRASES INCLUDED IN THE SOURCE LANGUAGE SENTENCE TO BE CALCULATED AND │─ S1908
│      A SUM OF LIKELIHOOD PROBABILITIES OF RESPECTIVE NEURAL NET LANGUAGE MODEL │
│          SAMPLES CORRESPONDING TO THE N-GRAM PHRASES INCLUDED IN THE TARGET │
│      LANGUAGE SENTENCE TO BE CALCULATED, WHILE MINIMIZING A DISTANCE BETWEEN THE │
│       SENTENCE VECTOR OF THE SOURCE LANGUAGE SENTENCE TO BE CALCULATED AND THE │
│         SENTENCE VECTOR OF THE TARGET LANGUAGE SENTENCE TO BE CALCULATED AS A │
│                                  TRAINING GOAL                          │
└─────────────────────────────────────────────────────────────────┘
```

FIG. 19B

STATISTICS-BASED MACHINE TRANSLATION METHOD, APPARATUS AND ELECTRONIC DEVICE

CROSS REFERENCE TO RELATED PATENT APPLICATION

This application claims foreign priority to Chinese Patent Application No. 201510527745.8 filed on Aug. 25, 2015, entitled "Statistics-Based Machine Translation Method, Apparatus and Electronic Device", and is related to U.S. patent application Ser. No. 15/247,690, filed on Aug. 25, 2016 entitled "Method and System for Generation of Candidate Translations", which applications are hereby incorporated by reference in their entirety.

TECHNICAL FIELD

The present disclosure relates to the field of machine translation technologies, and in particular, to statistics-based machine translation methods, apparatuses and electronic devices. The present disclosure also relates to semantic similarity calculation methods, apparatuses and electronic devices, and word quantization methods, apparatuses and electronic devices.

BACKGROUND

Machine translation refers to the use of an electronic computer to implement automatic translation from a text of a natural language (a source language) to a text of another natural language (a target language), and a software component that implements this process is called a machine translation system. With the development and popularity of electronic computers and the Internet, cultural exchanges between nations have become more frequent, and the problem of language barrier is emerged again in a new era. Thus, machine translation has become more urgently needed by people than ever before.

Machine translation methods may be classified into Rule-Based and Corpus-Based types. The former one constructs a knowledge source from a dictionary and a rule base. The latter constructs a knowledge source from a corpus that is classified and tagged, without the need of any dictionary or rule, but depends mainly on statistical regularities. Corpus-based methods may be classified into a Statistics-based method and an Example-based method. The above machine translation methods are described in brief as follows.

1) Rule-based Machine Translation Method

This method is generally performed with the aid of dictionaries, templates and manually organized rules. Original texts of a source language to be translated need to be analyzed, meanings of the original texts are represented, and equivalent translated texts of a target language are then generated. A good rule-based machine translation apparatus needs to have enough number of translation rules with a broad enough coverage, and is further able to solve conflict problems among the rules effectively. As the rules generally need to be sorted out manually, the labor cost is high, and it is difficult to obtain a large number of translation rules with a very comprehensive coverage. Furthermore, the probability of having conflicts between translation rules provided by different people is high.

2) Example-based Machine Translation Method

This method is based on examples, and mainly uses pre-processed bilingual corpora and translation dictionaries to perform translation. During a translation process, segments matching with original text segments are first searched from a translation example base, corresponding translated text segments are determined, and the translated text segments are then recombined to obtain a final translated text. As can be seen, the coverage and storage method of translation examples directly affect the translation quality and speed of this type of translation technology.

3) Statistics-based Machine Translation Method

A basic idea of this method is to perform statistics on a large number of parallel corpora to construct a statistical translation model, and to perform translation using the model. Early word-based machine translation has been transited to phrase-based machine translation, and syntactic information is being integrated to further improve the accuracy of the translation.

The method is based on a bilingual corpus, in which translation knowledge in the bilingual corpus is represented as a statistical model through a machine learning method and translation rules are extracted, and then original texts to be translated are translated into translated texts of a target language according to the translation rules. The statistics-based machine translation method requires less manual processing and has a quick processing speed, being independent of specific examples and not limited by application fields. Therefore, this method has apparent advantages as compared with the other two machine translation technologies, and is a method having a relatively good performance among existing unlimited-field machine translation technologies.

In view of the above, the statistics-based machine translation method is currently the most commonly used machine translation method as compared to the former two methods. Since the 1990s, the statistics-based machine translation method has been developed rapidly, and gradually becomes core content in the research field of machine translation. During that period of time, scholars have proposed a number of statistics-based machine translation methods, including word-based, phrase-based, level phrase-based, syntax-based and semantics-based statistical machine translation methods.

The existing semantics-based statistical machine translation method is a statistical machine translation method completely based on semantics. The defects of the method are very obvious. First, a form of a semantic expression used in this type of translation method is over-complicated and is not general enough (that is, a large difference between expression forms of a same semantic meaning in different languages exists). Furthermore, the degree of difficulty in establishing a semantic analyzer of a specific language is extremely high. Therefore, it is difficult to use a language expression structure as an "intermediate language" used for the translation method. Second, semantic translation rules that are obtained by a statistical machine translation system completely based on semantics are generally overly redundant. Therefore, this type of translation method currently remains at a phase of theories and experiments only, and cannot be used in batch in industrial fields.

For other existing statistics-based machine translation methods, when a machine translation model is constructed, a semantic level of a natural language is not thoroughly analyzed, thus leading to deviations between a semantic meaning of a translated text that is generated and a semantic meaning of an original text. Accordingly, a translation effect of semantic consistency cannot be achieved, thereby severely reducing the quality of the machine translation. For example, a word "apple" in "the apple product" of a source language of English expresses a semantic meaning of "Apple Company". If this word is translated into an "apple" of food, a semantic deviation is resulted, thereby severely reducing the user experience of a user.

In view of the above, the statistical machine translation method that is completely based on semantics needs to use a complicated structure of semantic expressions, and therefore the practicability of the method is poor. Other statistics-based machine translation methods do not consider information of semantic components, and therefore a semantic inconsistency problem may occur when languages having large syntactic and semantic differences are processed, thus resulting in an unreadable translation result even though "each word is correct".

Generally, the problem of deviation of a semantic meaning of a translated text from a semantic meaning of an original text may be relieved by obtaining a high-quality and large-scale bilingual parallel corpus in a statistics-based machine translation method. However, obtaining a high-quality and large-scale bilingual parallel corpus is difficult from a lot of languages. As can be seen, obtaining a high-quality and large-scale bilingual parallel corpus to relieve the problem of having a difference between semantic meanings of a translated text and an original text in a statistics-based machine translation method is not an effective method.

In short, a problem of semantic inconsistency between an original text and a translated text exists when an existing statistics-based machine translation method is used for translation.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method, an apparatus and an electronic device for statistics-based machine translation to solve the problem of a semantic inconsistency between an original text and a translated text in existing technologies. The present disclosure further provides a method, an apparatus and an electronic device for semantic similarity calculation, as well as a method, apparatus and an electronic device for word quantization.

The present disclosure provides a statistics-based machine translation method, which may include:
  decoding a sentence to be translated to generate candidate translated texts of the sentence to be translated according to a pre-generated translation rule;
  generating respective probabilities of translation from the sentence to be translated to the candidate translated texts based on features of the candidate translated texts that affect the probabilities of translation and a pre-generated translation probability prediction model, wherein the features that affect the probabilities of translation include at least degrees of semantic similarity between the sentence to be translated and the candidate translated texts; and
  selecting a preset number of candidate translated texts having corresponding probabilities of translation being in high ranking positions to serve as translated texts of the sentence to be translated.

Moreover, the present disclosure further provides a semantic similarity calculation method, which may include:
  obtaining a sentence vector of a source language sentence to be calculated, and a sentence vector of a target language sentence to be calculated; and
  calculating a distance between the sentence vector of the source language sentence to be calculated and the sentence vector of the target language sentence to be calculated to serve as a degree of semantic similarity between the source language sentence to be calculated and the target language sentence to be calculated, wherein the sentence vector of the source language sentence to be calculated and the sentence vector of the target language sentence to be calculated include semantic information of corresponding sentences.

Moreover, the present disclosure further provides a word quantization method, which may include:
  obtaining a parallel corpus;
  parsing sentences included in the parallel corpus, and obtaining all words included in the parallel corpus;
  setting word vectors in a first preset dimension for the words included in the parallel corpus to form correspondence relationships between the words and the word vectors;
  randomly setting sentence vectors in a second preset dimension for the sentences;
  constructing respective neural net language model samples corresponding to N-gram phrases included in source language sentences and target language sentences in the parallel corpora for each pair of parallel corpora in the parallel corpus based on the correspondence relationships between the words and the word vectors, sentence vectors corresponding to the source language sentences and target language sentences in the parallel corpora, a preset neural net language model corresponding to a source language and a preset neural net language model corresponding to a target language; and
  training the neural net language model corresponding to the source language and the neural net language model corresponding to the target language by maximizing a sum of likelihood probabilities of the respective neural net language model samples corresponding to the N-gram phrases included in the source language sentences in the parallel corpus and a sum of likelihood probabilities of the respective neural net language model samples corresponding to the N-gram phrases included in the target language sentences in the parallel corpus, and minimizing a sum of distances between sentence vectors of the source language sentences and the target language sentences of all pairs in the parallel corpus as a training goal to obtain the correspondence relationships between the words and the word vectors, wherein an input layer of the neural net language model includes sentence vectors corresponding to sentences where the N-gram phrases are located.

Compared with existing technologies, the present disclosure has the following advantages:
  The statistics-based machine translation method, apparatus and electronic device provided in the present disclosure generate probabilities of translating a sentence to be translated to various candidate translated texts based on features of the candidate translated texts that affect the translation probabilities and a pre-generated translation probability prediction model, where the features that affect the translation probabilities include at least degrees of semantic similarity between the sentence to be translated and the candidate translated texts, and a preset number of candidate translated texts with highly ranked translation probabilities are selected to serve as translated texts of the sentence to be translated. Thus, when a machine translation model is constructed, a semantic level of a natural language can be deeply analyzed to avoid a semantic deviation between a translated text and an original text, thereby achieving the effect of improving the quality of translation.

BRIEF DESCRIPTION OF THE DRAWINGS

FIG. 19A-G are flowcharts of a semantic similarity calculation method according to an embodiment of the present disclosure.

DETAILED DESCRIPTION

Figure 1:
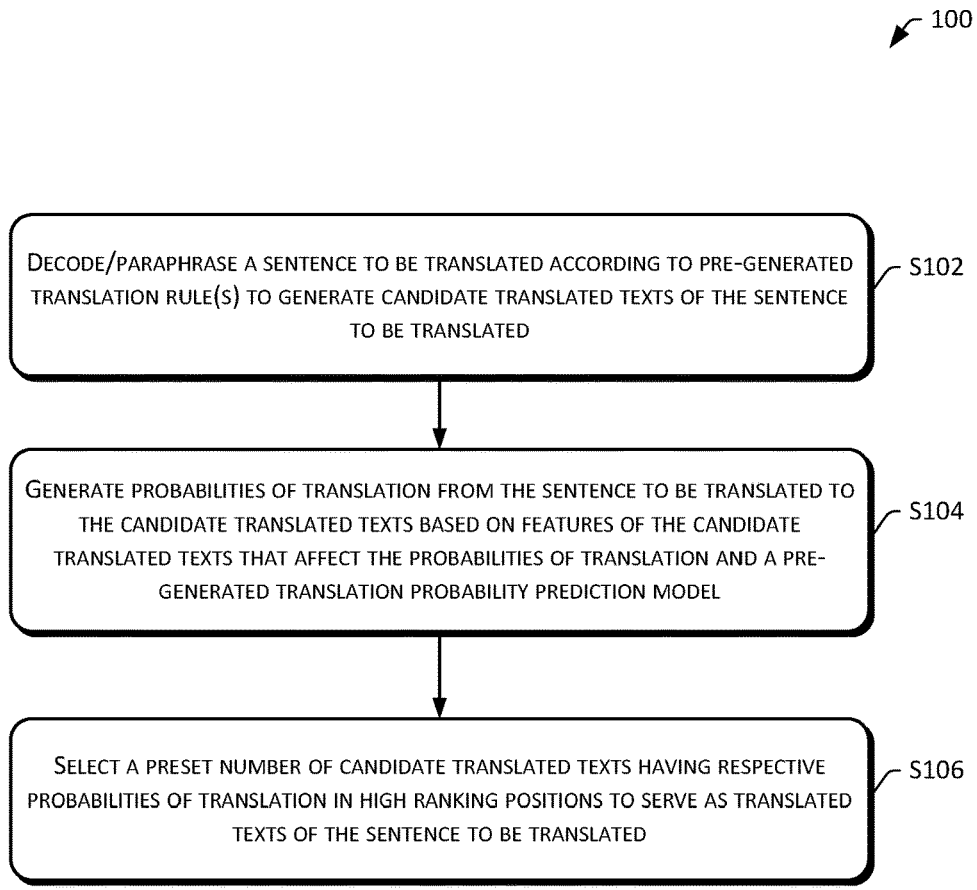
FIG. 1 is a flowchart of a statistics-based machine translation method according to an embodiment of the present disclosure.

A number of specific details are described hereinafter to facilitate full understanding of the present disclosure. However, the present disclosure can be implemented in many other manners different from those described herein, and one skilled in the art may perform similar promotion without departing from the essence of the present disclosure. Therefore, the present disclosure is not limited by specific implementations disclosed herein.

The present disclosure provides a method, an apparatus and an electronic device for statistics-based machine translation, a method, an apparatus and an electronic device for semantic similarity calculation, and a method, an apparatus and an electronic device for word quantization. Detailed descriptions are successively made using the following embodiments.

An idea of the statistics-based machine translation method provided in the present disclosure is to go deep into a semantic level of a natural language when a machine translation model is constructed. In other words, when probabilities of translation of candidate translated texts are scored, degrees of semantic similarity between a sentence to be translated and the candidate translated texts are taken into consideration. Since evaluation scores of degrees of semantic similarity are used as a strong feature of translation and decoding to affect a generation process of a translated text, a decoder tends to generate translation having a high consistency, thereby achieving the effect of improving the quality of translation.

Prior to going into details of a variety of different embodiments, a high-level description of the present disclosure is given as follows.

The present disclosure provides a method, an apparatus and an electronic device for statistics-based machine translation to solve the problem of a semantic inconsistency between an original text and a translated text in existing technologies. The present disclosure further provides a method, an apparatus and an electronic device for semantic similarity calculation, as well as a method, apparatus and an electronic device for word quantization.

The present disclosure provides a statistics-based machine translation method, which may include:

decoding a sentence to be translated to generate candidate translated texts of the sentence to be translated according to a pre-generated translation rule;

generating respective probabilities of translation from the sentence to be translated to the candidate translated texts based on features of the candidate translated texts that affect the probabilities of translation and a pre-generated translation probability prediction model, wherein the features that affect the probabilities of translation include at least degrees of semantic similarity between the sentence to be translated and the candidate translated texts; and selecting a preset number of candidate translated texts having corresponding probabilities of translation being in high ranking positions to serve as translated texts of the sentence to be translated.

In implementations, the degrees of semantic similarity between the sentence to be translated and the candidate translated texts are calculated by:

obtaining a sentence vector of the sentence to be translated and a sentence vector of a candidate translated text; and calculating a distance between the sentence vector of the sentence to be translated and the sentence vector of the candidate translated text, which serves as a degree of semantic similarity between the sentence to be translated and the candidate translated text, wherein the sentence vector of the sentence to be translated and the sentence vector of the candidate translated text include semantic information of corresponding sentences.

In implementations, the sentence vector of the sentence to be translated and the sentence vector of the candidate translated text are generated by the following procedure:

constructing neural net language model samples corresponding to N-gram phrases included in the sentence to be translated and neural net language model samples corresponding to N-gram phrases included in the candidate translated text based on pre-generated correspondence relationships between words and word vectors, a neural net language model corresponding to a source language and a neural net language model corresponding to a target language; and learning and obtaining the sentence vector of the sentence to be translated and the sentence vector of the candidate translated text by maximizing a sum of likelihood probabilities of the neural net language model samples corresponding to the N-gram phrases included in the sentence to be translated and a sum of likelihood probabilities of the neural net language model samples corresponding to the N-gram phrases included in the candidate translated text, while minimizing the distance between the sentence vector of the sentence to be translated and the sentence vector of the candidate translated text as a training goal, wherein the source language refers to a language to which the sentence to be translated belongs, the target language refers to a language to which the candidate translated text belongs, and an input layer of the neural net language model includes sentence vectors corresponding to sentences at which the N-gram phrases are located.

In implementations, constructing the neural net language model samples corresponding to the N-gram phrases included in the sentence to be translated and he neural net language model samples corresponding to the N-gram phrases included in the candidate translated text based on the pre-generated correspondence relationship between the words and the word vectors, the neural net language model corresponding to the source language and the neural net language model corresponding to the target language may include:

parsing the sentence to be translated and the candidate translated text to obtain words included in the sentence to be translated and the candidate translated text;

obtaining word vectors corresponding to the words included in the sentence to be translated and the candidate translated text based on the correspondence relationship between the words and the word vectors;

randomly setting the sentence vector of the sentence to be translated and the sentence vector of the candidate translated text;

constructing the neural net language model samples corresponding to the N-gram phrases for the N-gram phrases included in the sentence to be translated based on the word vectors corresponding to the words included in the N-gram phrases and the sentence vector of the sentence to be translated, and the neural net language model corresponding to the source language; and constructing the neural net language model samples corresponding to the N-gram phrases for the N-gram phrases included in the candidate translated text based on the word vectors corresponding to the words included in the N-gram phrases and the sentence vectors of the candidate translated texts, and the neural net language model corresponding to the target language.

In implementations, learning and obtaining the sentence vector of the sentence to be translated and the sentence vector of the candidate translated text by maximizing the sum of likelihood probabilities of the neural net language model samples corresponding to the N-gram phrases included in the sentence to be translated and the sum of likelihood probabilities of the neural net language model samples corresponding to the N-gram phrases included in the candidate translated text, and minimizing the distance between the sentence vector of the sentence to be translated and the sentence vector of the candidate translated text as the training goal may include:

calculating a value of a first objective function based on the constructed neural net language model samples; and determining whether the value of the first objective function is greater than a previous value of the first objective function;

adopting an optimization algorithm to update the sentence vector of the sentence to be translated and the sentence vector of the candidate translated text and returning to the calculating of the value of the first objective function based on the constructed neural net language model samples if affirmative, wherein the first objective function refers to a difference between a sum of a first average value and a second average value, and the distance between the sentence vector of the sentence to be translated and the sentence vector of the candidate translated text, the first average value refers to an average value of the likelihood probabilities of the neural net language model samples corresponding to the N-gram phrases included in the sentence to be translated, and the second average value refers to an average value of the likelihood probabilities of the neural net language model samples corresponding to the N-gram phrases included in the candidate translated text.

In implementations, the optimization algorithm adopts a random gradient algorithm, and adopting the optimization algorithm to update the sentence vector of the sentence to be translated and the sentence vector of the candidate translated text may include:

calculating gradients of the sentence vector of the sentence to be translated and the sentence vector of the candidate translated text according to a preset learning rate and the first objective function; and updating the sentence vector of the sentence to be translated and the sentence vector of the candidate translated text based on the gradients of the sentence vector of the sentence to be translated and the sentence vector of the candidate translated text.

In implementations, the distance between the vectors includes an included angle cosine distance or a Euclidean distance.

In implementations, the neural net language model includes a feed-forward neural net algorithm language model or a recurrent neural net language model.

In implementations, connection weights from the input layer to a hidden layer of the neural net language model are all the same; and connection weights from the input layer to an output layer of the neural net language model are zeros.

In implementations, an excitation function of the hidden layer of the neural net language model is a linear function.

In implementations, a vector value of the hidden layer of the neural net language model is a sum average value or a combination and splicing of vector values of the input layer.

In implementations, the correspondence relationships between the words and the word vectors, the neural net language model corresponding to the source language and the neural net language model corresponding to the target language are generated by the following procedure:

obtaining a parallel corpus;

parsing sentences included in the parallel corpus, and obtaining all words included in the parallel corpus;

setting word vectors in a first preset dimension for the words included in the parallel corpus to form the correspondence relationships between the words and the word vectors;

randomly setting sentence vectors in a second preset dimension for the sentences;

constructing respective neural net language model samples corresponding to N-gram phrases included in source language sentences and target language sentences for each pair of parallel corpora in the parallel corpus based on the correspondence relationships between the words and the word vectors, respective sentence vectors corresponding to the source language sentences and the target language sentences in the parallel corpora, the preset neural net language model corresponding to the source language and the preset neural net language model corresponding to the target language; and learning and obtaining the correspondence relationships between the words and the word vectors, the neural net language model corresponding to the source language and the neural net language model corresponding to the target language by maximizing a sum of likelihood probabilities of the respective neural net language model samples corresponding to the N-gram phrases included in all source language sentences in the parallel corpus and a sum of likelihood probabilities of the respective neural net language model samples corresponding to the N-gram phrases included in all target language sentences in the parallel corpus, and minimizing a sum of distances between sentence vectors of source language sentences and target language sentences of all pairs in the parallel corpus as a training goal.

In implementations, constructing the neural net language model samples corresponding to the N-gram phrases included in the source language sentences and the target language sentences based on the correspondence relationships between the words and the word vectors, the respective sentence vectors corresponding to the source language sentences and the target language sentences in the parallel corpora, the preset neural net language model corresponding to the source language and the preset neural net language model corresponding to the target language may include:

parsing the source language sentences and the target language sentences, and obtaining words included in the source language sentences and the target language sentences;

obtaining word vectors corresponding to the words included in the source language sentences and the target language sentences, according to the correspondence relationships between the words and the word vectors;

constructing neural net language model samples corresponding to N-gram phrases for the N-gram phrases included in the source language sentences based on the word vectors corresponding to the words included in the N-gram phrases and the sentence vectors of the source language sentences, as well as the neural net language model corresponding to the source language; and constructing neural net language model samples corresponding to N-gram phrases for the N-gram phrases included in the target language sentences based on the word vectors corresponding to the words included in the N-gram phrases and the sentence vectors of the target language sentences, as well as the neural net language model corresponding to the target language.

In implementations, learning and obtaining the correspondence relationships between the words and the word vectors, the neural net language model corresponding to the source language and the neural net language model corresponding to the target language by maximizing the sum of likelihood probabilities of the neural net language model samples corresponding to the N-gram phrases included in all source language sentences in the parallel corpus and the sum of likelihood probabilities of the neural net language model samples corresponding to the N-gram phrases included in all target language sentences in the parallel corpus, and minimizing the sum of distances between the sentence vectors of the source language sentences and the target language sentences in all the pairs in the parallel corpus as the training goal may include:

calculating a value of a second objective function based on the constructed neural net language model samples;

determining whether the value of the second objective function is greater than a previous value of the second objective function; and adopting an optimization algorithm to update the word vectors, the sentence vectors of the source language sentences, the sentence vectors of the target language sentences, the neural net language model corresponding to the source language and the neural net language model corresponding to the target language, and returning to the calculating of the value of the second objective function based on the constructed neural net language model samples if affirmative, wherein the second objective function refers to a difference between a sum of a third average value and a fourth average value and the sum of distances between the sentence vectors of the source language sentences and the target language sentences in all the pairs in the parallel corpus, the third average value refers to an average value of the likelihood probabilities of the neural net language model samples corresponding to the N-gram phrases included in all the source language sentences in the parallel corpus, and the fourth average value refers to an average value of the likelihood probabilities of the neural net language model samples corresponding to the N-gram phrases included in all the target language sentences in the parallel corpus.

In implementations, the optimization algorithm adopts a random gradient algorithm, and adopting the optimization algorithm to update the word vectors, the sentence vectors of the source language sentences, the sentence vectors of the target language sentences, the neural net language model corresponding to the source language and the neural net language model corresponding to the target language may include:
  calculating gradients of connection weights of the word vectors, the sentence vectors of the source language sentences, the sentence vectors of the target language sentences, the neural net language model corresponding to the source language, and the neural net language model corresponding to the target language according to a preset learning rate and the second objective function; and
  updating the word vectors, the sentence vectors of the source language sentences, the sentence vectors of the target language sentences, the neural net language model corresponding to the source language, and the neural net language model corresponding to the target language according to the gradients of the connection weights of the word vectors, the sentence vectors of the source language sentences, the sentence vectors of the target language sentences, the neural net language model corresponding to the source language and the neural net language model corresponding to the target language.

In implementations, the features that affect the probabilities of translation may further include: at least one of a phrase translation probability from the sentence to be translated to a candidate translated text, a phrase translation probability from the candidate translated text to the sentence to be translated, a word translation probability from the sentence to be translated to the candidate translated text, a word translation probability from the candidate translated text to the sentence to be translated, a sentence probability of the candidate translated text, or a classification probability of whether the sentence to be translated and the candidate translated text are reordered.

In implementations, decoding the sentence to be translated according to the pre-generated translation rule to generate the candidate translated texts of the sentence to be translated may be implemented using an algorithm including a CYK decoding algorithm, a stack-based decoding algorithm, or a shift-reduce decoding algorithm.

In implementations, decoding the sentence to be translated according to the pre-generated translation rule to generate the candidate translated texts of the sentence to be translated may include:
  parsing the sentence to be translated, and generating substrings of the sentence to be translated;
  obtaining candidate translated texts of the substrings according to the pre-generated translation rule; and
  combining and splicing candidate translated texts of adjacent substrings according to positions of the substrings in the sentence to be translated to form a candidate translated text of the sentence to be translated.

In implementations, obtaining the candidate translated texts of the substrings according to the pre-generated translation rule may include:
  determining whether a substring belongs to a translation rule for each translation rule; and
  generating a candidate translated text of the substring according to the translation rule if a result of the determination is affirmative.

In implementations, the translation probability prediction model may be learned from pre-stored parallel corpora through a linear regression algorithm.

Correspondingly, the present disclosure further provides a statistics-based machine translation apparatus, which may include:
  a candidate translated text generation unit for decoding a sentence to be translated according to a pre-generated translation rule to generate candidate translated texts of the sentence to be translated;
  a translation probability calculation unit for generating probabilities of translation of the sentence to be translated into the candidate translated texts based on features of the candidate translated texts that affect the probabilities of translation and a pre-generated translation probability prediction model, wherein the features that affect the probabilities of translation at least include degrees of semantic similarity of the sentence to be translated and the candidate translated texts; and
  a selection unit for selecting a preset number of candidate translated texts having corresponding probabilities of translation being in high ranking positions to serve as translated texts of the sentence to be translated.

In implementations, the apparatus further includes a semantic similarity calculation unit for calculating the degrees of semantic similarity between the sentence to be translated and the candidate translated texts.

In implementations, the semantic similarity calculation unit includes an acquisition subunit for obtaining a sentence vector of the sentence to be translated and a sentence vector of a candidate translated text; and a calculation subunit for calculating a distance between the sentence vector of the sentence to be translated and the sentence vector of the candidate translated text to serve as a degree of semantic similarity between the sentence to be translated and the candidate translated text, wherein the sentence vector of the sentence to be translated and the sentence vector of the candidate translated text include semantic information of corresponding sentences.

In implementations, the apparatus further includes a sentence vector generation unit for generating the sentence vector of the sentence to be translated and the sentence vector of the candidate translated text.

In implementations, the sentence vector generation unit includes:
  a sample construction subunit for constructing neural net language model samples corresponding to N-gram phrases included in the sentence to be translated and neural net language model samples corresponding to N-gram phrases included in the candidate translated text based on pre-generated correspondence relationships between words and word vectors, a neural net language model corresponding to a source language and a neural net language model corresponding to a target language; and a learning subunit for learning and obtaining the sentence vector of the sentence to be translated and the sentence vector of the candidate translated text by maximizing a sum of likelihood probabilities of the neural net language model samples corresponding to N-gram phrases included in the sentence to be translated and a sum of likelihood probabilities of the neural net language model samples corresponding to N-gram phrases included in the candidate translated text, and minimizing the distance between the sentence vector of the sentence to be translated and the sentence vector of the candidate translated text as a training goal, wherein, the source language refers to a language to which the sentence to be translated belongs, the target language refers to a language to which the candidate translated text belongs, and an input layer of the neural net language model includes sentence vectors corresponding to sentences at which the N-gram phrases are located.

In implementations, the sample construction subunit includes:

a parsing subunit for parsing the sentence to be translated and the candidate translated text, and obtaining words included in the sentence to be translated and the candidate translated text;

a mapping subunit for obtaining word vectors corresponding to the words included in the sentence to be translated and the candidate translated text based on the correspondence relationship between the words and the word vectors;

a setting subunit for randomly setting the sentence vector of the sentence to be translated and the sentence vector of the candidate translated text;

a first construction subunit for constructing the neural net language model samples corresponding to the N-gram phrases for the N-gram phrases included in the sentence to be translated based on the word vectors corresponding to the words included in the N-gram phrases and the sentence vector of the sentence to be translated, and the neural net language model corresponding to the source language; and a second construction subunit for constructing the neural net language model samples corresponding to the N-gram phrases for the N-gram phrases included in the candidate translated text based on the word vectors corresponding to the words included in the N-gram phrases and the sentence vectors of the candidate translated texts, and the neural net language model corresponding to the target language.

In implementations, the learning subunit includes:

a calculation subunit for calculating a value of a first objective function based on the constructed neural net language model samples; and a determination subunit for determining whether the value of the first objective function is greater than a value of a previous first objective function; adopting an optimization algorithm to update the sentence vector of the sentence to be translated and the sentence vector of the candidate translated text and returning to the calculating of the value of the first objective function based on the constructed neural net language model samples if affirmative, wherein the first objective function refers to a difference between a sum of a first average value and a second average value, and the distance between the sentence vector of the sentence to be translated and the sentence vector of the candidate translated text, the first average value refers to an average value of the likelihood probabilities of the neural net language model samples corresponding to the N-gram phrases included in the sentence to be translated, and the second average value refers to an average value of the likelihood probabilities of the neural net language model samples corresponding to the N-gram phrases included in the candidate translated text.

In implementations, the apparatus further includes:

a training unit for generating the correspondence relationships between the words and the word vectors, the neural net language model corresponding to the source language and the neural net language model corresponding to the target language.

In implementations, the training unit includes:

an acquisition subunit for obtaining a parallel corpus;

a parsing subunit for parsing sentences included in the parallel corpus, and obtaining all words included in the parallel corpus;

a setting subunit for setting word vectors in a first preset dimension for the words included in the parallel corpus to form the correspondence relationships between the words and the word vectors, and randomly setting sentence vectors in a second preset dimension for the sentences;

a construction subunit for constructing respective neural net language model samples corresponding to N-gram phrases included in source language sentences and target language sentences for each pair of parallel corpora in the parallel corpus based on the correspondence relationships between the words and the word vectors, respective sentence vectors corresponding to the source language sentences and the target language sentences in the parallel corpora, the preset neural net language model corresponding to the source language and the preset neural net language model corresponding to the target language; and a learning subunit for learning and obtaining the correspondence relationships between the words and the word vectors, the neural net language model corresponding to the source language and the neural net language model corresponding to the target language by maximizing a sum of likelihood probabilities of the respective neural net language model samples corresponding to the N-gram phrases included in all source language sentences in the parallel corpus and a sum of likelihood probabilities of the respective neural net language model samples corresponding to the N-gram phrases included in all target language sentences in the parallel corpus, and minimizing a sum of distances between sentence vectors of source language sentences and target language sentences of all pairs in the parallel corpus as a training goal.

In implementations, the construction subunit includes:

a parsing subunit for parsing the source language sentences and the target language sentences, and obtaining words included in the source language sentences and the target language sentences;

a mapping subunit for obtaining word vectors corresponding to the words included in the source language sentences and the target language sentences, according to the correspondence relationships between the words and the word vectors;

a first construction subunit for constructing neural net language model samples corresponding to N-gram phrases for the N-gram phrases included in the source language sentences based on the word vectors corresponding to the words included in the N-gram phrases and the sentence vectors of the source language sentences, as well as the neural net language model corresponding to the source language; and a second construction subunit for constructing neural net language model samples corresponding to N-gram phrases for the N-gram phrases included in the target language sentences based on the word vectors corresponding to the words included in the N-gram phrases and the sentence vectors of the target language sentences, as well as the neural net language model corresponding to the target language.

In implementations, the learning subunit includes:

a calculation subunit for calculating a value of a second objective function based on the constructed neural net language model samples; and a determination subunit for determining whether the value of the second objective function is greater than a previous value of the second objective function; adopting an optimization algorithm to update the word vectors, the sentence vectors of the source language sentences, the sentence vectors of the target language sentences, the neural net language model corresponding to the source language and the neural net language model corresponding to the target language, and returning to the calculating of the value of the second objective function based on the constructed neural net language model samples if affirmative, wherein the second objective function refers to a difference between a sum of a third average value and a fourth average value and the sum of distances between the sentence vectors of the source language sentences and the target language sentences in all the pairs in the parallel corpus, the third average value refers to an average value of the likelihood probabilities of the neural net language model samples corresponding to the N-gram phrases included in all the source language sentences in the parallel corpus, and the fourth average value refers to an average value of the likelihood probabilities of the neural net language model samples corresponding to the N-gram phrases included in all the target language sentences in the parallel corpus.

In implementations, the candidate translated text generation unit includes:

a parsing subunit for parsing the sentence to be translated, and generating substrings of the sentence to be translated;

an acquisition subunit for obtaining candidate translated texts of the substrings according to the pre-generated translation rule; and a splicing subunit for combining and splicing candidate translated texts of adjacent substrings according to positions of the substrings in the sentence to be translated to form a candidate translated text of the sentence to be translated.

In implementations, the acquisition subunit includes:

a determination subunit for determining whether a substring belongs to a translation rule for each translation rule; and a generation subunit for generating a candidate translated text of the substring according to the translation rule if a result of the determination is affirmative.

Correspondingly, the present disclosure further provides an electronic device, which may include:

a display;

processor(s); and memory, wherein the memory is used for storing a statistics-based machine translation apparatus, and the statistics-based machine translation apparatus when executed by the processor(s), performing acts including: decoding a sentence to be translated according to a pre-generated translation rule to generate candidate translated texts of the sentence to be translated; generating probabilities of translation of the sentence to be translated into the candidate translated texts based on features of the candidate translated texts that affect the probabilities of translation and a pre-generated translation probability prediction model, wherein the features that affect the probabilities of translation at least include degrees of semantic similarity of the sentence to be translated and the candidate translated texts; and selecting a preset number of candidate translated texts having corresponding probabilities of translation being in high ranking positions to serve as translated texts of the sentence to be translated.

Moreover, the present disclosure further provides a semantic similarity calculation method, which may include:

obtaining a sentence vector of a source language sentence to be calculated, and a sentence vector of a target language sentence to be calculated; and calculating a distance between the sentence vector of the source language sentence to be calculated and the sentence vector of the target language sentence to be calculated to serve as a degree of semantic similarity between the source language sentence to be calculated and the target language sentence to be calculated, wherein the sentence vector of the source language sentence to be calculated and the sentence vector of the target language sentence to be calculated include semantic information of corresponding sentences.

In implementations, the sentence vector of the source language sentence to be calculated and the sentence vector of the target language sentence to be calculated are generated by the following procedure:

constructing respective neural net language model samples corresponding to N-gram phrases included in the source language sentence to be calculated and respective neural net language model samples corresponding to N-gram phrases included in the target language sentence to be calculated based on pre-generated correspondence relationships between words and word vectors, a neural net language model corresponding to a source language and a neural net language model corresponding to a target language;

learning and obtaining the sentence vector of the source language sentence to be calculated and the sentence vector of the target language sentence to be calculated by maximizing a sum of likelihood probabilities of the respective neural net language model samples corresponding to the N-gram phrases included in the source language sentence to be calculated and a sum of likelihood probabilities of the respective neural net language model samples corresponding to the N-gram phrases included in the target language sentence to be calculated, and minimizing a distance between the sentence vector of the source language sentence to be calculated and the sentence vector of the target language sentence to be calculated as a training goal, wherein an input layer of the neural net language model includes sentence vectors corresponding to sentences where the N-gram phrases is located.

In implementations, constructing the respective neural net language model samples corresponding to the N-gram phrases included in the source language sentence to be calculated and the respective neural net language model samples corresponding to the N-gram phrases included in the target language sentence to be calculated based on the pre-generated correspondence relationships between the words and the word vectors, the neural net language model corresponding to the source language and the neural net language model corresponding to the target language includes:

parsing the source language sentence to be calculated and the target language sentence to be calculated, and obtaining words included in the source language sentence to be calculated and the target language sentence to be calculated;

obtaining word vectors corresponding to the words included in the source language sentence to be calculated and the target language sentence to be calculated based on the correspondence relationships between the words and the word vectors;

randomly setting the sentence vector of the source language sentence to be calculated and the sentence vector of the target language sentence to be calculated;

constructing the respective neural net language model samples corresponding to the N-gram phrases for the N-gram phrases included in the source language sentence to be calculated based on word vectors corresponding to the words included in the N-gram phrases, the sentence vector of the source language sentence to be calculated, and the neural net language model corresponding to the source language; and constructing the respective neural net language model samples corresponding to the N-gram phrases for the N-gram phrases included in the target language sentence to be calculated based on the word vectors corresponding to the words included in the N-gram phrases, the sentence vector of the target language sentence to be calculated, and the neural net language model corresponding to the target language.

In implementations, learning and obtaining the sentence vector of the source language sentence to be calculated and the sentence vector of the target language sentence to be calculated by maximizing the sum of likelihood probabilities of the neural net language model samples corresponding to the N-gram phrases included in the source language sentence to be calculated and the sum of likelihood probabilities of the neural net language model samples corresponding to the N-gram phrases included in the target language sentence to be calculated, and minimizing the distance between the sentence vector of the source language sentence to be calculated and the sentence vector of the target language sentence to be calculated as the training goal includes:

calculating a value of a first objective function based on the constructed neural net language model samples;

determining whether the value of the first objective function is greater than a previous value of the first objective function; and adopting an optimization algorithm to update the sentence vector of the source language sentence to be calculated and the sentence vector of the target language sentence to be calculated, and returning to the calculating of the value of the first objective function based on the constructed neural net language model samples if affirmative, wherein the first objective function refers to a difference between a sum of a first average value and a second average value and the distance between the sentence vector of the source language sentence to be calculated and the sentence vector of the target language sentence to be calculated, the first average value refers to an average value of the likelihood probabilities of the neural net language model samples corresponding to the N-gram phrases included in the source language sentence to be calculated, and the second average value refers to an average value of the likelihood probabilities of the neural net language model samples corresponding to the N-gram phrases included in the target language sentence to be calculated.

In implementations, the optimization algorithm adopts a random gradient algorithm, and adopting the optimization algorithm to update the sentence vector of the source language sentence to be calculated and the sentence vector of the target language sentence to be calculated includes:

calculating gradients of the sentence vector of the source language sentence to be calculated and the sentence vector of the target language sentence to be calculated according to a preset learning rate and the first objective function; and updating the sentence vector of the source language sentence to be calculated and the sentence vector of the target language sentence to be calculated based on the gradients of the sentence vector of the source language sentence to be calculated and the sentence vector of the target language sentence to be calculated.

In implementations, the distance between the vectors includes an included angle cosine distance or a Euclidean distance.

In implementations, the neural net language model includes a feed-forward neural net algorithm language model or a recurrent neural net language model.

In implementations, connection weights from the input layer to a hidden layer of the neural net language model are all the same, and connection weights from the input layer to an output layer of the neural net language model are zeros.

In implementations, an excitation function of the hidden layer of the neural net language model is a linear function.

In implementations, a vector value of the hidden layer of the neural net language model is a sum average value or a combination and splicing of vector values of the input layer.

In implementations, the correspondence relationships between the words and the word vectors, the neural net language model corresponding to the source language and the neural net language model corresponding to the target language are generated by the following procedure:

obtaining a parallel corpus;

parsing sentences included in the parallel corpus, and obtaining all words included in the parallel corpus;

setting word vectors in a first preset dimension for the words included in the parallel corpus to form the correspondence relationships between the words and the word vectors;

randomly setting sentence vectors in a second preset dimension for the sentences;

constructing respective neural net language model samples corresponding to N-gram phrases included in source language sentences and target language sentences in the parallel corpora for each pair of parallel corpora in the parallel corpus based on the correspondence relationships between the words and the word vectors, respective sentence vectors corresponding to the source language sentences and target language sentences in the parallel corpora, the preset neural net language model corresponding to the source language and the preset neural net language model corresponding to the target language; and learning and obtaining the correspondence relationships between the words and the word vectors, the neural net language model corresponding to the source language and the neural net language model corresponding to the target language by maximizing a sum of likelihood probabilities of respective neural net language model samples corresponding to the N-gram phrases included in all source language sentences in the parallel corpus and a sum of likelihood probabilities of respective neural net language model samples corresponding to the N-gram phrases included in all target language sentences in the parallel corpus, and minimizing a sum of distances between sentence vectors of source language sentences and target language sentences of all pairs in the parallel corpus as a training goal.

In implementations, constructing the respective neural net language model samples corresponding to N-gram phrases included in source language sentences and target language sentences in the parallel corpora based on the correspondence relationships between the words and the word vectors, the respective sentence vectors corresponding to the source language sentences and target language sentences in the parallel corpora, the preset neural net language model corresponding to the source language and the preset neural net language model corresponding to the target language includes:

parsing the source language sentences and the target language sentences in the parallel corpora, and obtaining words included in the source language sentences and the target language sentences in the parallel corpora;

obtaining word vectors corresponding to the words included in the source language sentences and the target language sentences in the parallel corpora based on the correspondence relationships between the words and the word vectors;

constructing the neural net language model samples corresponding to the N-gram phrases for the N-gram phrases included in the source language sentences in the parallel corpora based on the word vectors corresponding to the words included in the N-gram phrases, the sentence vectors of the source language sentences in the parallel corpora and the neural net language model corresponding to the source language; and constructing the neural net language model samples corresponding to the N-gram phrases for the N-gram phrases included in the target language sentences in the parallel corpora based on the word vectors corresponding to the words included in the N-gram phrases, the sentence vectors of the target language sentences in the parallel corpora and the neural net language model corresponding to the target language.

In implementations, learning and obtaining the correspondence relationships between the words and the word vectors, the neural net language model corresponding to the source language and the neural net language model corresponding to the target language by maximizing the sum of likelihood probabilities of the neural net language model samples corresponding to the N-gram phrases included in all source language sentences in the parallel corpus and the sum of likelihood probabilities of the neural net language model samples corresponding to the N-gram phrases included in all target language sentences in the parallel corpus, and minimizing the sum of distances between the sentence vectors of the source language sentences and target language sentences of all the pairs in the parallel corpus as the training goal includes:

calculating a value of a second objective function based on the constructed neural net language model samples; and determining whether the value of the second objective function is greater than a previous value of the second objective function; adopting an optimization algorithm to update the word vectors, the sentence vectors of the source language sentences and the sentence vectors of the target language sentences in the parallel corpora, the neural net language model corresponding to the source language and the neural net language model corresponding to the target language, and returning to the calculating of the value of the second objective function based on the constructed neural net language model samples if affirmative, wherein the second objective function refers to a difference between a sum of a third average value and a fourth average value and a sum of distances between the sentence vectors of the source language sentences and target language sentences of all the pairs in the parallel corpus, the third average value refers to an average value of the likelihood probabilities of the neural net language model samples corresponding to the N-gram phrases included in all source language sentences in the parallel corpus, and the fourth average value refers to an average value of the likelihood probabilities of the neural net language model samples corresponding to the N-gram phrases included in all target language sentences in the parallel corpus.

In implementations, the optimization algorithm adopts a random gradient algorithm, and adopting the optimization algorithm to update the word vectors, the sentence vectors of the source language sentences and the sentence vectors of the target language sentences in the parallel corpora, the neural net language model corresponding to the source language and the neural net language model corresponding to the target language includes:

calculating gradients of connection weights of the word vectors, the sentence vectors of the source language sentences and the sentence vectors of the target language sentences in the parallel corpora, and the neural net language model corresponding to the source language and the neural net language model corresponding to the target language according to a preset learning rate and the second objective function; and updating the word vectors, the sentence vectors of the source language sentences and the sentence vectors of the target language sentences in the parallel corpora, and the neural net language model corresponding to the source language and the neural net language model corresponding to the target language according to the gradients of the connection weights of the word vectors, the sentence vectors of the source language sentences and the sentence vectors of the target language sentences in the parallel corpora, and the neural net language model corresponding to the source language and the neural net language model corresponding to the target language.

Correspondingly, the present disclosure further provides a semantic similarity calculation apparatus, which may include:

an acquisition unit for obtaining a sentence vector of a source language sentence to be calculated and a sentence vector of a target language sentence to be calculated; and a calculation subunit for calculating a distance between the sentence vector of the source language sentence to be calculated and the sentence vector of the target language sentence to be calculated to serve as a degree of semantic similarity between the source language sentence to be calculated and the target language sentence to be calculated, wherein the sentence vector of the source language sentence to be calculated and the sentence vector of the target language sentence to be calculated include semantic information of corresponding sentences.

In implementations, the apparatus further includes a sentence vector generation unit for generating the sentence vector of the source language sentence to be calculated and the sentence vector of the target language sentence to be calculated.

In implementations, the sentence vector generation unit includes:
a sample construction subunit for constructing respective neural net language model samples corresponding to N-gram phrases included in the source language sentence to be calculated and respective neural net language model samples corresponding to N-gram phrases included in the target language sentence to be calculated based on pre-generated correspondence relationships between words and word vectors, a neural net language model corresponding to a source language and a neural net language model corresponding to a target language;
a learning subunit for learning and obtaining the sentence vector of the source language sentence to be calculated and the sentence vector of the target language sentence to be calculated by maximizing a sum of likelihood probabilities of the respective neural net language model samples corresponding to the N-gram phrases included in the source language sentence to be calculated and a sum of likelihood probabilities of the respective neural net language model samples corresponding to the N-gram phrases included in the target language sentence to be calculated, and minimizing a distance between the sentence vector of the source language sentence to be calculated and the sentence vector of the target language sentence to be calculated as a training goal, wherein an input layer of the neural net language model includes sentence vectors corresponding to sentences where the N-gram phrases is located.

In implementations, the sample construction subunit includes:
a parsing subunit for parsing the source language sentence to be calculated and the target language sentence to be calculated, and obtaining words included in the source language sentence to be calculated and the target language sentence to be calculated;
a mapping subunit for obtaining word vectors corresponding to the words included in the source language sentence to be calculated and the target language sentence to be calculated based on the correspondence relationships between the words and the word vectors;
a setting subunit for randomly setting the sentence vector of the source language sentence to be calculated and the sentence vector of the target language sentence to be calculated;
a first construction subunit for constructing the respective neural net language model samples corresponding to the N-gram phrases for the N-gram phrases included in the source language sentence to be calculated based on word vectors corresponding to the words included in the N-gram phrases, the sentence vector of the source language sentence to be calculated, and the neural net language model corresponding to the source language; and
a second construction subunit for constructing the respective neural net language model samples corresponding to the N-gram phrases for the N-gram phrases included in the target language sentence to be calculated based on the word vectors corresponding to the words included in the N-gram phrases, the sentence vector of the target language sentence to be calculated, and the neural net language model corresponding to the target language.

In implementations, the learning subunit includes:
a calculation subunit for calculating a value of a first objective function based on the constructed neural net language model samples; and
a determination subunit for determining whether the value of the first objective function is greater than a previous value of the first objective function; adopting an optimization algorithm to update the sentence vector of the source language sentence to be calculated and the sentence vector of the target language sentence to be calculated, and returning to the calculating of the value of the first objective function based on the constructed neural net language model samples if affirmative, wherein the first objective function refers to a difference between a sum of a first average value and a second average value and the distance between the sentence vector of the source language sentence to be calculated and the sentence vector of the target language sentence to be calculated, the first average value refers to an average value of the likelihood probabilities of the neural net language model samples corresponding to the N-gram phrases included in the source language sentence to be calculated, and the second average value refers to an average value of the likelihood probabilities of the neural net language model samples corresponding to the N-gram phrases included in the target language sentence to be calculated.

In implementations, the apparatus further includes:
a training unit for generating the correspondence relationships between the words and the word vectors, the neural net language model corresponding to the source language and the neural net language model corresponding to the target language.

In implementations, the training unit includes:
an acquisition subunit for obtaining a parallel corpus;
a parsing subunit for parsing sentences included in the parallel corpus, and obtaining all words included in the parallel corpus;
a setting subunit for setting word vectors in a first preset dimension for the words included in the parallel corpus to form the correspondence relationships between the words and the word vectors, and randomly setting sentence vectors in a second preset dimension for the sentences;
a construction subunit for constructing respective neural net language model samples corresponding to N-gram phrases included in source language sentences and target language sentences in the parallel corpora for each pair of parallel corpora in the parallel corpus based on the correspondence relationships between the words and the word vectors, respective sentence vectors corresponding to the source language sentences and target language sentences in the parallel corpora, the preset neural net language model corresponding to the source language and the preset neural net language model corresponding to the target language; and
a learning subunit for learning and obtaining the correspondence relationships between the words and the word vectors, the neural net language model corresponding to the source language and the neural net language model corresponding to the target language by maximizing a sum of likelihood probabilities of respective neural net language model samples corresponding to the N-gram phrases included in all source language sentences in the parallel corpus and a sum of likelihood probabilities of respective neural net language model samples corresponding to the N-gram phrases included in all target language sentences in the parallel corpus, and minimizing a sum of distances between sentence vectors of source language sentences and target language sentences of all pairs in the parallel corpus as a training goal.

In implementations, the construction subunit includes:

a parsing subunit for parsing the source language sentences and the target language sentences in the parallel corpora, and obtaining words included in the source language sentences and the target language sentences in the parallel corpora;

a mapping subunit for obtaining word vectors corresponding to the words included in the source language sentences and the target language sentences in the parallel corpora based on the correspondence relationships between the words and the word vectors;

a first construction subunit for constructing the neural net language model samples corresponding to the N-gram phrases for the N-gram phrases included in the source language sentences in the parallel corpora based on the word vectors corresponding to the words included in the N-gram phrases, the sentence vectors of the source language sentences in the parallel corpora and the neural net language model corresponding to the source language; and a second construction subunit for constructing the neural net language model samples corresponding to the N-gram phrases for the N-gram phrases included in the target language sentences in the parallel corpora based on the word vectors corresponding to the words included in the N-gram phrases, the sentence vectors of the target language sentences in the parallel corpora and the neural net language model corresponding to the target language.

In implementations, the learning subunit includes:

a calculation subunit for calculating a value of a second objective function based on the constructed neural net language model samples; and a determination subunit for determining whether the value of the second objective function is greater than a previous value of the second objective function; adopting an optimization algorithm to update the word vectors, the sentence vectors of the source language sentences and the sentence vectors of the target language sentences in the parallel corpora, the neural net language model corresponding to the source language and the neural net language model corresponding to the target language, and returning to the calculating of the value of the second objective function based on the constructed neural net language model samples if affirmative, wherein the second objective function refers to a difference between a sum of a third average value and a fourth average value and a sum of distances between the sentence vectors of the source language sentences and target language sentences of all the pairs in the parallel corpus, the third average value refers to an average value of the likelihood probabilities of the neural net language model samples corresponding to the N-gram phrases included in all source language sentences in the parallel corpus, and the fourth average value refers to an average value of the likelihood probabilities of the neural net language model samples corresponding to the N-gram phrases included in all target language sentences in the parallel corpus.

Correspondingly, the present disclosure further provides an electronic device, which may include:

a display;

processor(s); and memory storing a semantic similarity calculation apparatus, wherein the semantic similarity calculation apparatus, when executed by the processor(s), performs acts including: obtaining a sentence vector of a source language sentence to be calculated and a sentence vector of a target language sentence to be calculated; and calculating a distance between the sentence vector of the source language sentence to be calculated and the sentence vector of the target language sentence to be calculated to serve as a degree of semantic similarity between the source language sentence to be calculated and the target language sentence to be calculated, wherein the sentence vector of the source language sentence to be calculated and the sentence vector of the target language sentence to be calculated include semantic information of corresponding sentences.

Moreover, the present disclosure further provides a word quantization method, which may include:

obtaining a parallel corpus;

parsing sentences included in the parallel corpus, and obtaining all words included in the parallel corpus;

setting word vectors in a first preset dimension for the words included in the parallel corpus to form correspondence relationships between the words and the word vectors;

randomly setting sentence vectors in a second preset dimension for the sentences;

constructing respective neural net language model samples corresponding to N-gram phrases included in source language sentences and target language sentences in the parallel corpora for each pair of parallel corpora in the parallel corpus based on the correspondence relationships between the words and the word vectors, sentence vectors corresponding to the source language sentences and target language sentences in the parallel corpora, a preset neural net language model corresponding to a source language and a preset neural net language model corresponding to a target language; and training the neural net language model corresponding to the source language and the neural net language model corresponding to the target language by maximizing a sum of likelihood probabilities of the respective neural net language model samples corresponding to the N-gram phrases included in the source language sentences in the parallel corpus and a sum of likelihood probabilities of the respective neural net language model samples corresponding to the N-gram phrases included in the target language sentences in the parallel corpus, and minimizing a sum of distances between sentence vectors of the source language sentences and the target language sentences of all pairs in the parallel corpus as a training goal to obtain the correspondence relationships between the words and the word vectors, wherein an input layer of the neural net language model includes sentence vectors corresponding to sentences where the N-gram phrases are located.

In implementations, constructing the respective neural net language model samples corresponding to the N-gram phrases included in the source language sentences and the target language sentences in the parallel corpora based on the correspondence relationships between the words and the word vectors, the sentence vectors corresponding to the source language sentences and the target language sentences in the parallel corpora, the preset neural net language model corresponding to the source language and the preset neural net language model corresponding to the target language includes:

- parsing the source language sentences and the target language sentences in the parallel corpora, and obtaining words included in the source language sentences and the target language sentences in the parallel corpora;
- obtaining word vectors corresponding to the words included in the source language sentences and the target language sentences in the parallel corpora based on the correspondence relationships between the words and the word vectors;
- constructing neural net language model samples corresponding to N-gram phrases for the N-gram phrases included in the source language sentences in the parallel corpora, based on the word vectors corresponding to the words included in the N-gram phrases and the sentence vectors of the source language sentences in the parallel corpora, and the neural net language model corresponding to the source language; and
- constructing neural net language model samples corresponding to N-gram phrases for the N-gram phrases included in the target language sentences in the parallel corpora, based on the word vectors corresponding to the words included in the N-gram phrases and the sentence vectors of the target language sentences in the parallel corpora, and the neural net language model corresponding to the target language.

In implementations, training the neural net language model corresponding to the source language and the neural net language model corresponding to the target language by maximizing the sum of likelihood probabilities of the neural net language model samples corresponding to the N-gram phrases included in the source language sentences in the parallel corpus and the sum of likelihood probabilities of the neural net language model samples corresponding to the N-gram phrases included in the target language sentences in the parallel corpus while minimizing the sum of distances between the sentence vectors of the source language sentences and the target language sentences of all the pairs in the parallel corpus as the training goal to obtain the correspondence relationships between the words and the word vectors includes:

- calculating a value of a second objective function based on the constructed neural net language model samples;
- determining whether the value of the second objective function is greater than a previous value of the second objective function; and
- adopting an optimization algorithm to update the word vectors, the sentence vectors of the source language sentences and the sentence vectors of the target language sentences in the parallel corpora, and the neural net language model corresponding to the source language and the neural net language model corresponding to the target language, and returning to the calculating of the value of the second objective function based on the constructed neural net language model samples if affirmative, wherein the second objective function refers to a difference between a sum of a third average value and a fourth average value and a sum of distances between sentence vectors of the source language sentences and the target language sentences of all the pairs in the parallel corpus, the third average value refers to an average value of the likelihood probabilities of the neural net language model samples corresponding to the N-gram phrases included in the source language sentences in the parallel corpus, and the fourth average value refers to an average value of the likelihood probabilities of the neural net language model samples corresponding to the N-gram phrases included in the target language sentences in the parallel corpus.

In implementations, the optimization algorithm adopts a random gradient algorithm, and adopting the optimization algorithm to update the word vectors, the sentence vectors of the source language sentences and the sentence vectors of the target language sentences in the parallel corpora, and the neural net language model corresponding to the source language and the neural net language model corresponding to the target language includes:

- calculating gradients of connection weights of the word vectors, the sentence vectors of the source language sentences and the sentence vectors of the target language sentences in the parallel corpora, the neural net language model corresponding to the source language and the neural net language model corresponding to the target language, according to a preset learning rate and the second objective function; and
- updating the word vectors, the sentence vectors of the source language sentences and the sentence vectors of the target language sentences in the parallel corpora, the neural net language model corresponding to the source language and the neural net language model corresponding to the target language based on the gradients of the connection weights of the word vectors, the sentence vectors of the source language sentences and the sentence vectors of the target language sentences in the parallel corpora, the neural net language model corresponding to the source language and the neural net language model corresponding to the target language.

In implementations, the distance between the sentence vectors includes an included angle cosine distance or a Euclidean distance.

In implementations, the neural net language model includes a feed-forward neural net algorithm language model or a recurrent neural net language model.

In implementations, connection weights from the input layer to a hidden layer of the neural net language model are all the same, and connection weights from the input layer to an output layer of the neural net language model are zeros.

In implementations, an excitation function of the hidden layer of the neural net language model is a linear function.

In implementations, a vector value of the hidden layer of the neural net language model is a sum average value or a combination and splicing of vector values of the input layer.

Correspondingly, the present disclosure further provides a word quantization apparatus, which may include:

- an acquisition unit for obtaining a parallel corpus;
- a parsing unit for parsing sentences included in the parallel corpus, and obtaining all words included in the parallel corpus;
- a setting unit for setting word vectors in a first preset dimension for the words included in the parallel corpus to form correspondence relationships between the words and the word vectors, and randomly setting sentence vectors in a second preset dimension for the sentences;

a construction unit for constructing respective neural net language model samples corresponding to N-gram phrases included in source language sentences and target language sentences in the parallel corpora for each pair of parallel corpora in the parallel corpus based on the correspondence relationships between the words and the word vectors, sentence vectors corresponding to the source language sentences and target language sentences in the parallel corpora, a preset neural net language model corresponding to a source language and a preset neural net language model corresponding to a target language; and a learning unit for training the neural net language model corresponding to the source language and the neural net language model corresponding to the target language by maximizing a sum of likelihood probabilities of the respective neural net language model samples corresponding to the N-gram phrases included in the source language sentences in the parallel corpus and a sum of likelihood probabilities of the respective neural net language model samples corresponding to the N-gram phrases included in the target language sentences in the parallel corpus, and minimizing a sum of distances between sentence vectors of the source language sentences and the target language sentences of all pairs in the parallel corpus as a training goal to obtain the correspondence relationships between the words and the word vectors, wherein an input layer of the neural net language model includes sentence vectors corresponding to sentences where the N-gram phrases are located.

In implementations, the construction unit includes:

a parsing subunit for parsing the source language sentences and the target language sentences in the parallel corpora, and obtaining words included in the source language sentences and the target language sentences in the parallel corpora;

a mapping subunit for obtaining word vectors corresponding to the words included in the source language sentences and the target language sentences in the parallel corpora based on the correspondence relationships between the words and the word vectors;

a first construction subunit for constructing neural net language model samples corresponding to N-gram phrases for the N-gram phrases included in the source language sentences in the parallel corpora, based on the word vectors corresponding to the words included in the N-gram phrases and the sentence vectors of the source language sentences in the parallel corpora, and the neural net language model corresponding to the source language; and a second construction subunit for constructing neural net language model samples corresponding to N-gram phrases for the N-gram phrases included in the target language sentences in the parallel corpora, based on the word vectors corresponding to the words included in the N-gram phrases and the sentence vectors of the target language sentences in the parallel corpora, and the neural net language model corresponding to the target language.

In implementations, the learning unit includes:

a calculation subunit for calculating a value of a second objective function based on the constructed neural net language model samples; and a determination subunit for determining whether the value of the second objective function is greater than a previous value of the second objective function, and adopting an optimization algorithm to update the word vectors, the sentence vectors of the source language sentences and the sentence vectors of the target language sentences in the parallel corpora, and the neural net language model corresponding to the source language and the neural net language model corresponding to the target language, and returning to the calculating of the value of the second objective function based on the constructed neural net language model samples if affirmative, wherein the second objective function refers to a difference between a sum of a third average value and a fourth average value and a sum of distances between sentence vectors of the source language sentences and the target language sentences of all the pairs in the parallel corpus, the third average value refers to an average value of the likelihood probabilities of the neural net language model samples corresponding to the N-gram phrases included in the source language sentences in the parallel corpus, and the fourth average value refers to an average value of the likelihood probabilities of the neural net language model samples corresponding to the N-gram phrases included in the target language sentences in the parallel corpus.

Correspondingly, the present disclosure further provides an electronic device, which may include:

a display;

processor(s); and memory storing a word quantization apparatus, wherein the word quantization apparatus, when executed by the processor(s), performs acts including: obtaining a parallel corpus; parsing sentences included in the parallel corpus and obtaining all words included in the parallel corpus; setting word vectors in a first preset dimension for the words included in the parallel corpus to form correspondence relationships between the words and the word vectors; and randomly setting sentence vectors in a second preset dimension for the sentences; constructing respective neural net language model samples corresponding to N-gram phrases included in source language sentences and target language sentences in the parallel corpora for each pair of parallel corpora in the parallel corpus based on the correspondence relationships between the words and the word vectors, sentence vectors corresponding to the source language sentences and target language sentences in the parallel corpora, a preset neural net language model corresponding to a source language and a preset neural net language model corresponding to a target language; and training the neural net language model corresponding to the source language and the neural net language model corresponding to the target language by maximizing a sum of likelihood probabilities of the respective neural net language model samples corresponding to the N-gram phrases included in the source language sentences in the parallel corpus and a sum of likelihood probabilities of the respective neural net language model samples corresponding to the N-gram phrases included in the target language sentences in the parallel corpus, and minimizing a sum of distances between sentence vectors of the source language sentences and the target language sentences of all pairs in the parallel corpus as a training goal to obtain the correspondence relationships between the words and the word vectors, wherein an input layer of the neural net language model includes sentence vectors corresponding to sentences where the N-gram phrases are located.

FIG. 1 shows a flowchart of a statistics-based machine translation method 100 according to an embodiment of the present disclosure. The method includes the following method blocks:

S102 decodes/paraphrases a sentence to be translated according to pre-generated translation rule(s) to generate candidate translated texts of the sentence to be translated.

The statistics-based machine translation method 100 refers to selecting a preset number of candidate translated texts with high ranks of probabilities of translation to serve as a final translation result from among multiple candidate translated texts associated with the sentence to be translated based on statistical information. Therefore, the sentence to be translated needs to be decoded/paraphrased first to generate candidate translated texts of the sentence to be translated.

In implementations, a translation rule refers to a translation rule that is obtained in advance by learning from a parallel corpus given. The translation rule is a basic conversion unit of a machine translation process. In implementations, a process of obtaining the translation rule by learning from the parallel corpus may include the following phases: 1) data preprocessing; 2) word alignment; and 3) phrase extraction. These phases are described in brief herein.

1) Data Preprocessing

The data preprocessing phase first needs to gather or download a parallel corpus. In implementations, the parallel corpus may include a large amount of parallel corpora. Each pair of parallel corpora may include a source language sentence and a target language sentence, with these sentences being translations of each other. Currently, a large amount of parallel corpus can be downloaded from the Internet. Searching for a parallel corpus of a suitable target field (such as medical field, news, etc.) is an important method of improving the performance of a statistical machine translation system in particular fields.

After the parallel corpus is obtained, a certain text normalization processing needs to be performed on parallel corpora. For example, morpheme segmentation may be performed on English language, such as separating "'s" as a single word, and isolating a symbol connected to a word. Processing such as word segmentation needs to be performed on Chinese language. When the normalization processing is performed on the text, sentences including error codes, overly long sentences or sentences with unmatched lengths (a difference therebetween is too large) need be filtered as much as possible. Furthermore, processing such as identification, translation and generalization may be performed on non-enumerable type strings to relief the problem of data sparseness/scarcity during a process of word alignment.

During the process of statistics-based machine translation, the obtained parallel corpora may be divided into three parts. The first part may be used for word alignment and phrase extraction, the second part may be used for minimum error rate training, and the third part may be used for system evaluation. For data in the second part and the third part, each source language sentence may preferably have multiple reference translations.

2) Word Alignment

By means of word alignment, a position correspondence relationship between a word included in the source language and a word included in the target language in each pair of parallel corpora can be obtained. In a real application, the parallel corpora may be aligned using GIZA++. It is noted that the GIZA++ is a "one-way" word alignment, and therefore the word alignment needs to be performed twice. The first one is a word alignment from the source language to the target language, and the second one is a word alignment from the target language to the source language. IBM Model 2 has a poor alignment effect, and IBM Model 5 is time consuming and does not contribute much to the performance. Therefore, generally speaking, GIZA++ needs to perform word alignments of IBM Model 1, HMM, IBM Model 3 and IBM Model 4 sequentially.

A training time for the word alignment phase depends on the number of parallel corpora and the set number of iterations. The training time of the word alignment phase may be very long according to the number of parallel corpora and the set number of iterations. As data for reference, the time of running ten million pairs of Chinese-English parallel corpora (about 0.3 billion words) on an Inter Xeon 2.4 GHz server is about six days. In a real application, if training for a word alignment phase is too time-consuming, parallel word alignment may be performed through MGIZA++ and PGIZA++ (where PGIZA++ supports distributed word alignment). Then, GIZA++ alignment results in two directions are integrated for phrase extraction.

3) Phrase Extraction

A basic standard for the phrase extraction is that at least one word pair between two phrases has a connection, and no word connected to a word outside the phrase(s) exists. In a real application, a phrase extraction program of a Moses software package may be adopted to perform processing of phrase extraction. It is noted that an extraction result may occupy a large amount of disk space. Generally, if the size of a parallel corpora reaches ten million pairs, the maximum length of a phrase is greater than or equal to seven, and a storage space of at least 500 GB needs to be prepared.

After the phrase extraction is finished, extraction of phrase features, i.e., calculation of a translation probability of a phrase and a translation probability of a word, also needs to be performed, which may include, for example, a forward phrase translation probability, a backward phrase translation probability, a forward word translation probability, a backward word translation probability, etc. The forward phrase translation probability refers to a probability of phrase translation from a source language phrase to a target language phrase The backward phrase translation probability refers to a probability of phrase translation from a target language phrase to a source language phrase. The forward word translation probability refers to a probability of word translation from a target language phrase to a source language word. The backward word translation probability refers to a probability of word translation from a target language phrase to a source language phrase.

During the process of phrase feature extraction, all extracted phrases need to be sorted twice. Generally speaking, a medium-sized (parallel corpora of the order of a million pairs) system also needs to perform external sorting, and read and write speeds of a magnetic disk greatly affect the processing time thereof. Generally, extraction of phrase features is performed on a fast disk. As a reference for an operation time and disk space consumption, for parallel corpora of the order of ten million pairs, with a phrase length being limited to seven and an external sorting running on an SCSI Raid 0+1 disk array, a running time is 3 days and 11 hours, and the peak disk space consumption is 813 GB.

In implementations, translation rule(s) may include translation rule(s) using phrases as basic translation units without including syntactic information, and/or translation rule(s)

including syntactic information that is obtained by modeling a translation model based on syntactic structures. Different approaches of the translation rules are variations of exemplary implementations without departing from the core of the present disclosure, and therefore all fall within the scope of protection of the present disclosure.

It is noted that candidate translated texts that are generated according to the translation rule(s) without including syntactic information generally do not conform to syntactic rules. Therefore, these candidate translated texts are difficult to understand. On the other hand, candidate translated texts generated according to the translation rule(s) including syntactic information generally conform to syntactic rules. As can be seen, generating candidate translated texts of sentence to be translated according to translation rule(s) including syntactic information can achieve the effect of improving the quality of translation.

In implementations, translation rule(s) extracted from the parallel corpora may include syntactic information, and the translation rule(s) may be presented using a context free grammar, as shown in Table 1:

TABLE 1

Translation rule table

| Rule Number | Translation Rule |
|---|---|
| 1 | 他 --> NP(PRP(he)) |
| 2 | 对 $NP_1$ --> PP(IN(with)$NP_1$) |
| 3 | 回答 --> NP(DT(the)NNS(answers)) |
| 4 | 表示 --> VBZ(was) |
| 5 | 满意 --> VBZ(satisfied)) |
| 6 | $PP_1$ $VBZ_2$ $VBN_3$ --> VP($VBZ_2$ VP($VBZ_3$ $PP_1$)) |
| 7 | $NP_1$ $VP_2$ --> $NP_1$ $VP_2$ |

In Table 1, rules corresponding to serial numbers 1, 3, 4 and 5 are basic translation rules, and rules corresponding to serial numbers 2, 6 and 7 are combined translation rules.

In implementations, the sentence to be translated is decoded/paraphrased through a CYK algorithm to generate candidate translated texts of the sentence to be translated. The CYK algorithm is an algorithm researched together by John Cocke, Younger, and Kasami, and is issued in about 1965, being used for determining whether a randomly given string belongs to a context free grammar. The CYK algorithm uses an idea of dynamic planning. A common backtracking can solve problems in exponential time in the worst case, and the CYK algorithm can solve problems in polynomial time only. The complexity of the CYK algorithm is $O(n^3)$, where n is the length of a string.

Figure 2:
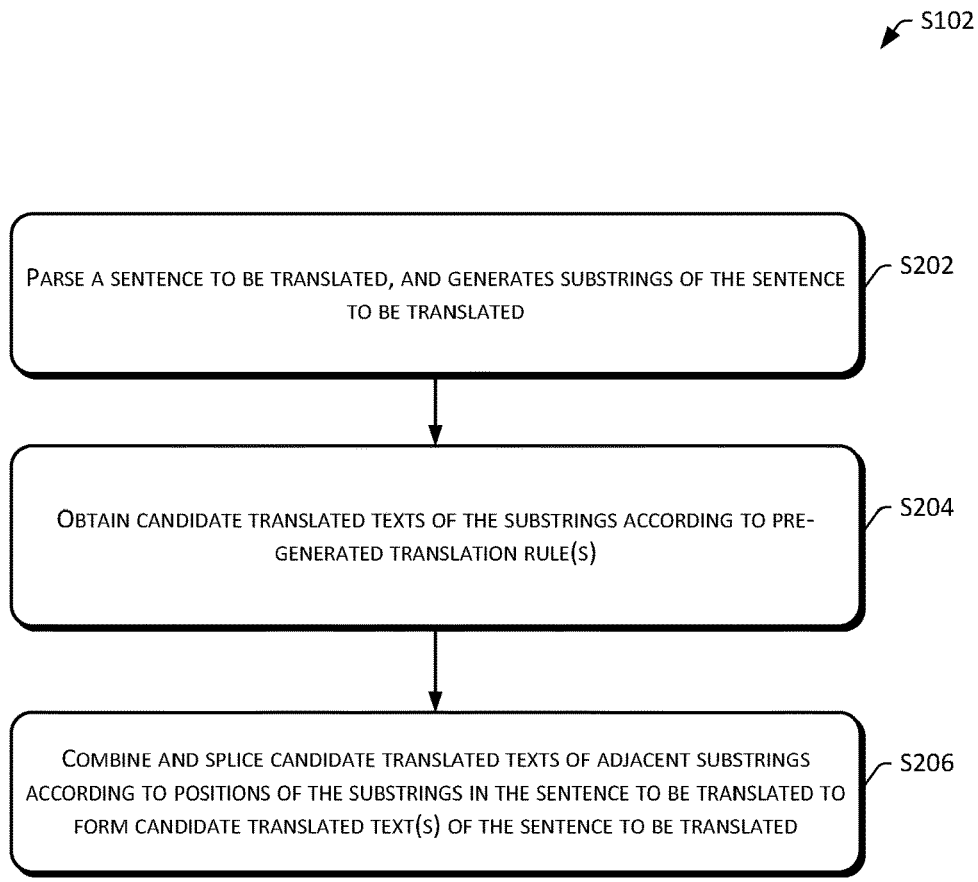
FIG. 2 is a flowchart of S102 in the statistics-based machine translation method according to an embodiment of the present disclosure.

FIG. 2 shows a flowchart of S102 in the statistics-based machine translation method 100 according to an embodiment of the present disclosure. In implementations, a sentence to be translated is decoded through a CYK algorithm to generate candidate translated texts of the sentence to be translated, which may include the following method blocks:

S202 parses a sentence to be translated, and generates substrings of the sentence to be translated.

In implementations, the substrings refer to substrings of the sentence to be translated having different spans. For example, if a sentence to be translated is "我在公园里散步。", substrings thereof may include: substrings including only one character such as "我" and "在", substrings including two characters such as "我在" and "公园", substrings including three characters such as "在公园" and "公园里", substrings including four characters such as "我在 公园", a substring of "我在公园里散步。", and the like.

S204 obtains candidate translated texts of the substrings according to pre-generated translation rule(s).

In implementations, obtaining the candidate translated texts of the substrings according to the pre-generated translation rule(s) may include: 1) traversing a translation rule for each substring of the substrings and determining whether the respective substring belongs to the translation rule; 2) using translated text(s) generated according to the translation rule as the candidate translated texts of the respective substring if a determination result is affirmative.

For each substring of the sentence to be translated, each translation rule is needed to be traversed in order to determine whether the respective substring belongs to translation rule(s). In response to determining that a substring belongs to a translation rule, a translated text in a target language is generated according to that translation rule, and the translated text is used as a candidate translated text of the substring. A substring may belong to multiple translation rules. Therefore, one substring may correspond to multiple candidate translated texts.

S206 combines and splices candidate translated texts of adjacent substrings according to positions of the substrings in the sentence to be translated to form candidate translated text(s) of the sentence to be translated.

In implementations, an adjacent substring refer to a substring that is arranged before or after another substring. For example, if a sentence to be translated is "One tablet will purify a litre of water.", substrings may include "One tablet", "will", "purify a litre of water" and the like. "One tablet" and "purify a litre of water" are both adjacent substrings of "will", and "One tablet" is not an adjacent substring of "purify a litre of water".

After candidate translated texts corresponding to the substrings of the sentence to be translated are obtained at S204, candidate translated texts of adjacent substrings are spliced to generate multiple candidate translated texts of the sentence to be translated. For example, for the sentence to be translated as "One tablet will purify a litre of water.", candidate translated texts of the substring "One tablet" may include "一颗药丸" and "一部平板电脑", a candidate translated text of "will" may include "即可", and a candidate translated text of "purify a litre of water" may include "净化一升水". The substrings "One tablet", "will" and "purify a litre of water" are adjacent to each other. After the candidate translated texts of the substrings are combined and spliced, candidate translated texts that are generated may include "一颗药丸即可净化 一升水。", "一部平板电脑即 可净化一升水。", etc.

In a real application, decoding a sentence to be translated can use not only the CYK decoding algorithm, but also a stack-based decoding algorithm or shift-reduce decoding algorithm. These decoding algorithms have different advantages and disadvantages with respect to translation performance and decoding speed. The stack-based decoding algorithm and the CYK decoding algorithm generally have high translation performance and low decoding speed thereof. The shift-reduce decoding algorithm generally may reach a high decoding speed, with low translation performance. These different decoding methods are variations of exemplary implementations without departing from the core of the present disclosure, and therefore all fall within the scope of protection of the present disclosure.

S104 generates probabilities of translation from the sentence to be translated to the candidate translated texts based on features of the candidate translated texts that affect the probabilities of translation and a pre-generated translation probability prediction model.

In implementations, the features that affect the probabilities of translation may correspond to statistical type information that affects a probability of translation from the sentence to be translated to each candidate translated text. For example, a translation model and a language model in a noise channel model may both be used as features that affect the probabilities of translation. Moreover, the features that affect the probabilities of translation may further include a reordering model. Specifically, in a translation model, features that affect a probability of translation may include a probability of phrase translation from a sentence to be translated to a candidate translated text, a probability of phrase translation from the candidate translated text to the sentence to be translated, a probability of word translation from the sentence to be translated to the candidate translated text, a probability of word translation from the candidate translated text to the sentence to be translated. In a language model, statistical type information may refer to a sentence probability of the candidate translated text. In a reordering model, statistical type information may refer to a classification probability of whether the sentence to be translated and the candidate translated text are reordered or not. The features that affect the probabilities of translation, such as the translation model, the language model and the reordering model, are successively described hereinafter.

1) Translation Model

The translation model is a correspondence from one language to another language, and a language model embodies a certain property of the language itself. The translation model ensures the meaning of translation, and the language model ensures the fluency of the translation. In terms of conventional requirements of "faithfulness, expressiveness and elegance" on translation in China, the translation model embodies faithfulness and expressiveness, and the elegance is reflected in the language model.

During the process of phrase feature extraction at S102, information such as a forward phrase translation probability, a backward phrase translation probability, a forward word translation probability and a backward word translation probability corresponding to each translation rule is obtained by learning from the parallel corpora. Relevant descriptions of the probabilities of translation may be obtained with reference to related descriptions at S102, and are not repeatedly described herein.

Based on the forward phrase translation probability, the backward phrase translation probability, the forward word translation probability and the backward word translation probability obtained by the phrase feature extraction, the features that affect the probabilities of translation in the translation model can be calculated, and a specific calculation formula is described as follows:

1) A probability of phrase translation from a sentence to be translated to a candidate translated text
Calculation formula:

$$P(\bar{t}|\bar{s}) = \frac{\operatorname{count}(\bar{s}, \bar{t})}{\operatorname{count}(\bar{s})}$$

wherein, $\bar{s}$ is the sentence to be translated, $\bar{t}$ is the candidate translated text, and $\bar{s}=s_1, \ldots s_J, \bar{t}=t_1, \ldots t_{J'}$.

2) A probability of phrase translation from the candidate translated text to the sentence to be translated Calculation formula:

$$P(\bar{s}|\bar{t}) = \frac{\operatorname{count}(\bar{t}, \bar{s})}{\operatorname{count}(\bar{t})}$$

wherein, $\bar{s}$ is the sentence to be translated, $\bar{t}$ is the candidate translated text, and $\bar{s}=s_1, \ldots s_J, \bar{t}=t_1, \ldots t_{J'}$.

3) A probability of word translation from the sentence to be translated to the candidate translated text
Calculation formula:

$$P_{lex}(\bar{t}|\bar{s}) = \prod_{j=1}^{J} \frac{1}{|\{i|a(j,i)=1\}|} \sum_{V(j,i):a(j,i)=1} w(t_i|s_i)$$

wherein, $\bar{s}$ is the sentence to be translated, $\bar{t}$ is the candidate translated text, and $\bar{s}=s_1, \ldots s_J, \bar{t}=t_1, \ldots t_{J'}$. In the formula, a is an implicit variable (that is, word alignment). The so-called word alignment refers to which word in a source language that a word in a target language sentence is translated from. One word may be translated into one or more words, or even not be translated. As can be seen, a problem of obtaining a translation probability may be converted into a problem of word alignment. IBM series models, HMM and Model 6 are parametric models of word alignment. Differences therebetween lie in different numbers and types of model parameters. For example, the only parameter in the IBM Model 1 is a word translation probability, which is not related to a position of a word in a sentence. In the formula, (j, i) is a connection in word alignment, indicating that the $j^{th}$ word in the source language is translated to the $i^{th}$ word in the target language.

4) A word translation probability from the candidate translated text to the sentence to be translated
Calculation formula:

$$P_{lex}(\bar{s}|\bar{t}) = \prod_{i=1}^{I} \frac{1}{|\{j|a(i,j)=1\}|} \sum_{V(i,j):a(i,j)=1} w(s_i|t_i)$$

wherein, $\bar{s}$ is the sentence to be translated, $\bar{t}$ is the candidate translated text, $\bar{s}=s_1, \ldots s_J, \bar{t}=t_1, \ldots t_{J'}$, and a is word alignment information, which is not repeatedly described herein.

2) Language Model

The language model (LM for short) is a basic problem in the field of natural language processing, and plays an important role in tasks such as part-of-speech tagging, syntactic analysis, machine translation and information retrieval. In brief, the statistical language model may be represented as a probability of occurrence of a word sequence in which a word and all words in the context are given. In general, the language model is to determine whether a sentence is said by a normal person. For example, an English translation of a phrase "今晚有 大风" may be "high winds tonight" or "large winds tonight". A probability associated with "high winds tonight" is higher than a probability associated with "high winds tonight", i.e., P(high winds tonight)>P(large winds tonight).

A formalized description of the language model is to give a string and to calculate a probability $P(w_1, w_2, \ldots, w_t)$ of the string being a natural language. In other words, $P(w_1,$ $w_2, \ldots, w_t$) is referred to as the language model, i.e., a model used for calculating a sentence probability. $w_1$ to $w_t$ sequentially present words in the string. A simple deduction may include $P(w_1, w_2, \ldots, w_t) = P(w_1) \times P(w_2|w_1) \times P(w_3|w_1, w_2) \times \ldots \times P(w_t|w_1, w_2, \ldots, w_{t-1})$. In theory, the most simple and direct method of calculating $P(w_t|w_1, w_2, \ldots, w_{t-1})$ is direct counting for division, and a formula thereof is $P(w_t|w_1, w_2, \ldots, w_{t-1}) = p(w_1, w_2, \ldots, w_{t-1}, w_t)/p(w_1, w_2, \ldots, w_{t-1})$. However, this method may cause the problem of severe data sparseness, and has a low practicability due to an overly large parameter space.

A method of solving the above problem may include approximately solving $P(w_t|w_1, w_2, \ldots, w_{t-1})$. For example, a commonly used N-Gram language model uses $P(w_t-w_{t-n+1}, \ldots, w_{t-1})$ to approximately present $P\ w_t|w_1, w_2, \ldots, w_{t-1}$). The N-Gram language model is referred to as a Markov Chain. The model is based on the Markov assumption, i.e., an appearance of a $N^{th}$ word being related to previous (N−1) words only and not related to any other word, with a probability of an entire sentence being a product of appearance probabilities of words thereof. The appearance probabilities of the words may be obtained by making statistics on the number of simultaneous appearance of N words directly from the parallel corpora.

In a real application, a larger value of N indicates more constraint information on appearance of the next word, and therefore a larger discriminability is provided. A smaller value of N indicates a higher number of times of appearance in the parallel corpora, and therefore more reliable statistical information is provided, i.e., higher reliability is provided. In theory, the larger value of N the better it is. However, in a real application, the value of N cannot be too large, or the calculation is still too extensive otherwise. Commonly used models include a bigram (i.e., a Bi-Gram language model) and a trigram (i.e., a Tri-Gram language model). Empirically, the trigram is used most of the time. Nevertheless, in principle, those that can be solved by the bigram will not use the trigram.

While being simple and efficient, a N-Gram language model merely considers position relationships among words, and does not consider degree of similarity among the words, grammar of the words and semantic meanings of the words. Moreover, the problem of data sparseness/scarcity still exists. Therefore, more language models are gradually proposed, such as a Class-based N-Gram Model, a topic-based N-Gram Model, a cache-based N-Gram Model, a skipping N-Gram Model, and an exponential language model (a maximum entropy model, a conditional random field model), etc.

Along with the rise of deep learning, a neural net language model is further proposed. A neural net is used to train a language model. First, each word of $w_{t-n+1}, \ldots, w_{t-1}$ is mapped to a word vector space, and word vectors of the words are combined to form a larger vector to serve as a neural net input, with an output as $P(w_t)$. Currently, the neural net language model includes a Feed-forward Neural Net Language Model (ffnnlm for short) and a Recurrent Neural Net Language Model (rnnlm for short). The neural net language model solves two defects of the conventional N-Gram language model: (1) a degree of similarity between words may be embodied by a word vector; and (2) a smooth function is provided. In a real application, one or more language models may be selected according to specific requirements.

It is noted that, under a discriminative training frame i.e., a supervised training is performed with reference to a parallel corpora), multiple language models are allowed to be used, and therefore a desirable effect can be achieved by using an infinite field language model obtained by large-scale parallel corpora training in combination with a field-related language model.

3) Reordering Model

Word orders of many language pairs are greatly different. For example, word orders of Chinese and English are greatly different. The above process of word alignment processing includes a word reordering model, and a desirable reordering model is also needed in discriminative training. The reordering model may be based on positions, i.e., describing a reordering probability of phrases at different positions of each sentence in two languages. The reordering model may also be based on phrases. For example, the reordering model in Moses is based on phrases, and given a current phrase pair, describes whether positions of phrase pairs before and after need to be exchanged.

The foregoing description provides a description of currently commonly used features that affect the probabilities of translation. In implementations, besides applying these commonly used features that affect the probabilities of translation, the statistics-based machine translation method 100 may further apply feature(s) that affect(s) the probabilities of translation in a semantic model, e.g., a degree of semantic similarity between a sentence to be translated and a candidate translated text, and use this feature as a strong feature of machine translation to affect a process of generating a final translation result, thus placing a bias to a translation having a high semantic consistency.

Figure 3:
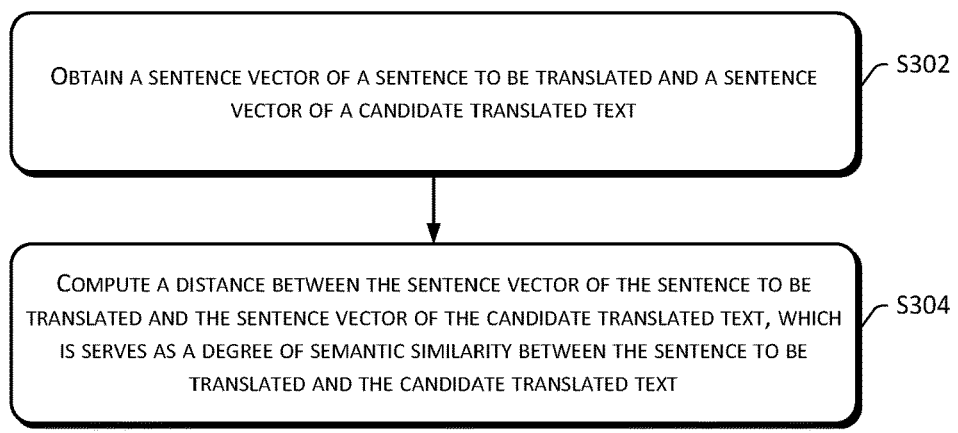
FIG. 3 is a flowchart of calculating a degree of semantic similarity in a statistics-based machine translation method according to an embodiment of the present disclosure.

FIG. 3 shows a flowchart 300 of calculating a degree of semantic similarity in the statistics-based machine translation method 100 according to an embodiment of the present disclosure. In implementations, a degree of semantic similarity between a sentence to be translated and a candidate translated text may be obtained by method blocks as follows.

S302 obtains a sentence vector of a sentence to be translated and a sentence vector of a candidate translated text.

As a new concept proposed in the embodiments of the present disclosure, a sentence vector can reflect basic semantic information of a sentence in a natural language. Specifically, for related or similar sentences, a distance between sentence vectors thereof is closer. For example, a distance between respective sentence vectors corresponding to "One tablet will purify a litre of water." and "一颗药丸即可 净化一升水。" is shorter than a distance between respective sentence vectors corresponding to "One tablet will purify a litre of water." and "— 部平板电脑即可 净化一升水。". In an ideal case, expressions of the sentence vectors of "One tablet will purify a litre of water." and "一颗药丸即可 净化一升水。" need to be completely the same. However, due to reasons such as a clerical error, the sentence vectors thereof may not be completely consistent, but a distance between these sentence vectors is closer. In a real application, a distance between sentence vectors may be measured by an Euclidean distance, and/or an included angle cosine. A sentence vector is a real vector in a fixed dimension, and is a class of parameter of the neural net language model described in the embodiments of the present disclosure. For example, a sentence vector may be expressed as [0.312, −0.187, −0.529, 0.109, −0.542, . . . ].

Figure 4:
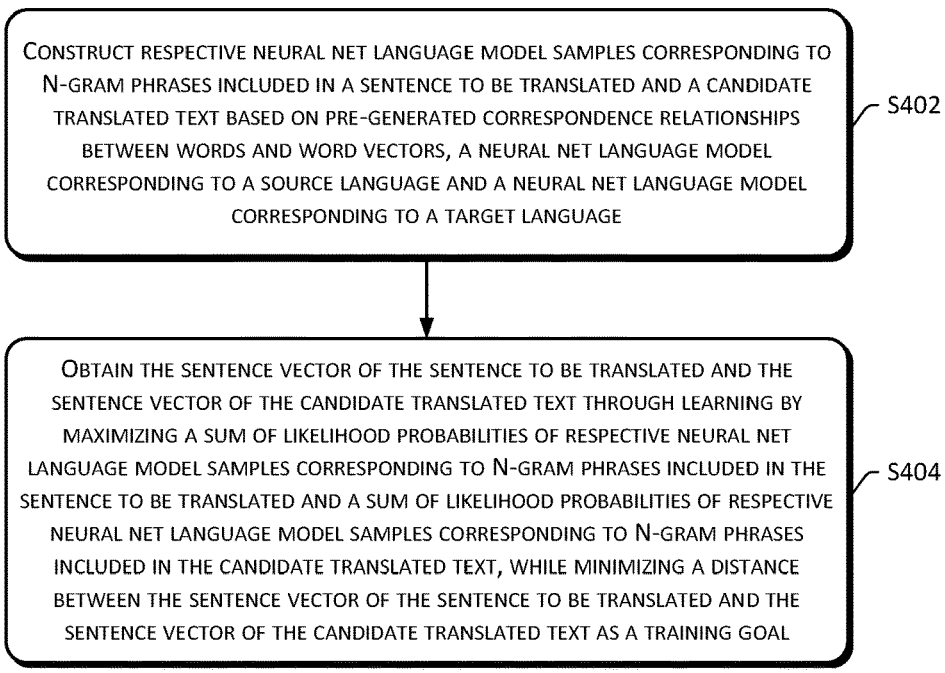
FIG. 4 is a flowchart of generating a sentence vector in a statistics-based machine translation method according to an embodiment of the present disclosure.

FIG. 4 is a flowchart 400 of generating a sentence vector in the statistics-based machine translation method 100 according to an embodiment of the present disclosure. In implementations, a sentence vector of a sentence to be translated and a sentence vector of a candidate translated text may be generated by the following method blocks.

S402 constructs respective neural net language model samples corresponding to N-gram phrases included in a sentence to be translated and a candidate translated text based on pre-generated correspondence relationships between words and word vectors, a neural net language model corresponding to a source language and a neural net language model corresponding to a target language.

In implementations, a source language refers to a language to which a sentence to be translated belongs, and a target language refers to a language to which a candidate translated text belongs. In implementations, a N-gram phrase refers to a phrase that is constructed by N words in a N-GRAM language model. For example, if a source language sentence is "我在公 园里散步。" and a 4-gram language model is adopted, 4-gram phrases of the sentence include: "我 在 公园 里", "在 公园 里 散步" and "公园 里 散步 。". When model samples of the neural net language model are constructed, respective model samples of the neural net language model for each N-gram phrase are needed to be constructed.

It is noted that a larger value of N of a N-gram phrase indicates more constraint information on an appearance of a Nth word, and therefore provides a larger discriminability. A smaller value of N indicates a higher number of times of appearance in a parallel corpus, and therefore provides more reliable statistical information, that is, provides a higher reliability. In theory, the larger value of N is, the better it will be. Empirically, the trigram is used most of the time. Nevertheless, in principle, those that are can be solved by the bigram will not use the trigram.

In implementations, a word vector (or Distributed Representation) is a real vector in a fixed dimension, and is a class of parameter of the neural net language model. For example, a word vector may be expressed as [0.792, −0.177, −0.107, 0.109, −0.542, . . . ]. As a by-product of the neural net language model, the word vector is obtained incidentally at the same time when the neural net language model is trained. A word vector can reflect basic semantic information of basic unit words in a natural language. Specifically, for related or similar words, a distance between word vectors thereof is closer. For example, a distance between respective word vectors corresponding to "麦克" and "话筒" is shorter than a distance between respective word vectors corresponding to "麦克" and "天气". In an ideal case, expressions of the word vectors of "麦克" and "话筒" need to be completely the same. However, some persons may write the English name of "迈克" as "麦克". The word "麦克" may therefore have a semantic meaning of a human name, and may not be completely the same as the word vector of "话筒". A distance between word vectors may be measured in terms of an Euclidean distance and/or an included angle cosine.

In implementations, the neural net language model may include a neural net language model corresponding to a source language and a neural net language model corresponding to a target language. Different from existing neural net language models, an input layer of the neural net language model in the embodiments of the present disclosure may further include sentence vectors corresponding to sentences where the N-gram phrases are located. Furthermore, during a process of training the neural net language model, an entire net may be formed by neural net language model samples related to source language sentences and neural net language model samples related to target language sentences, and a training goal of the entire net includes maximizing a sum of likelihood probabilities of the neural net language model samples related to the source language sentences and a sum of likelihood probabilities of the neural net language model samples related to the target language sentences, while minimizing a sum of distances between sentence vectors of source language sentences and target language sentences of all pairs.

When a likelihood probability of the neural net language model is calculated, a sentence where a N-gram phrase is located is used as a reference background, and a training goal of the entire net includes minimizing a distance between sentence vectors of a pair of sentences. Therefore, a word vector described in the embodiments of the present disclosure can not only reflect basic semantic information of a basic word unit in a natural language, but also have semantic information included in the word vector to be cross-lingual. In other words, a geometrical distance between word vectors of two words in different languages having consistent semantic meanings is very short, for example, "苹果" and "Apple".

It is noted that an expression of a word vector is not unique, and different training methods may result in different word vectors of the same word. Moreover, a dimension of a word vector is used as a super parameter of the neural net language model. Generally, the higher dimension is better, but word vectors in an excessively high dimension may cause the problem of complicated computation. In a real application, the dimensions of a word vector are commonly of 200 dimensions.

In implementations, neural net language model samples refer to examples of a neural net language model. In implementations, the neural net language model may be a universal model, and a net topology structure thereof is the same for every neural net language model sample. In other words, a relationship between a neural net language model and a neural net language model sample is similar to a relationship between a class and an object.

A topology structure (or system structure) of a neural net are determined by implicit layer(s), respective numbers of nodes contained therein, and connection means among the nodes. In order to design a neural net from the beginning, a number of implicit layers, a number of nodes, a form of an excitation function, restrictions on connection weights, etc., need to be determined. In a number of types of neural nets, the most commonly used one is a feed-forward propagation neural net. Specifically, a data process from input to output is a propagation process from the front to the back, a value of a next node is transmitted via a previous node connected thereto, with the value being weighted according to each connection weight and then inputted to the excitation function to obtain a new value, which is further propagated to another node.

In implementations, the neural net language model may be a feed-forward neural net language model, or a recurrent neural net language model. The computation complexity of the feed-forward neural net language model is less than that of the recurrent neural net language model, and the precision of the recurrent neural net language model is higher than the feed-forward neural net language model. In a real application, one of the above neural net language models may be selected according to specific requirements. Different approaches of the above neural net language models are variations of exemplary implementations without departing from the core of the present disclosure, and therefore all fall within the scope of protection of the present disclosure. To reduce the complexity of computation, a feed-forward neural net language model is adopted in the embodiments of the present disclosure.

Figure 5:
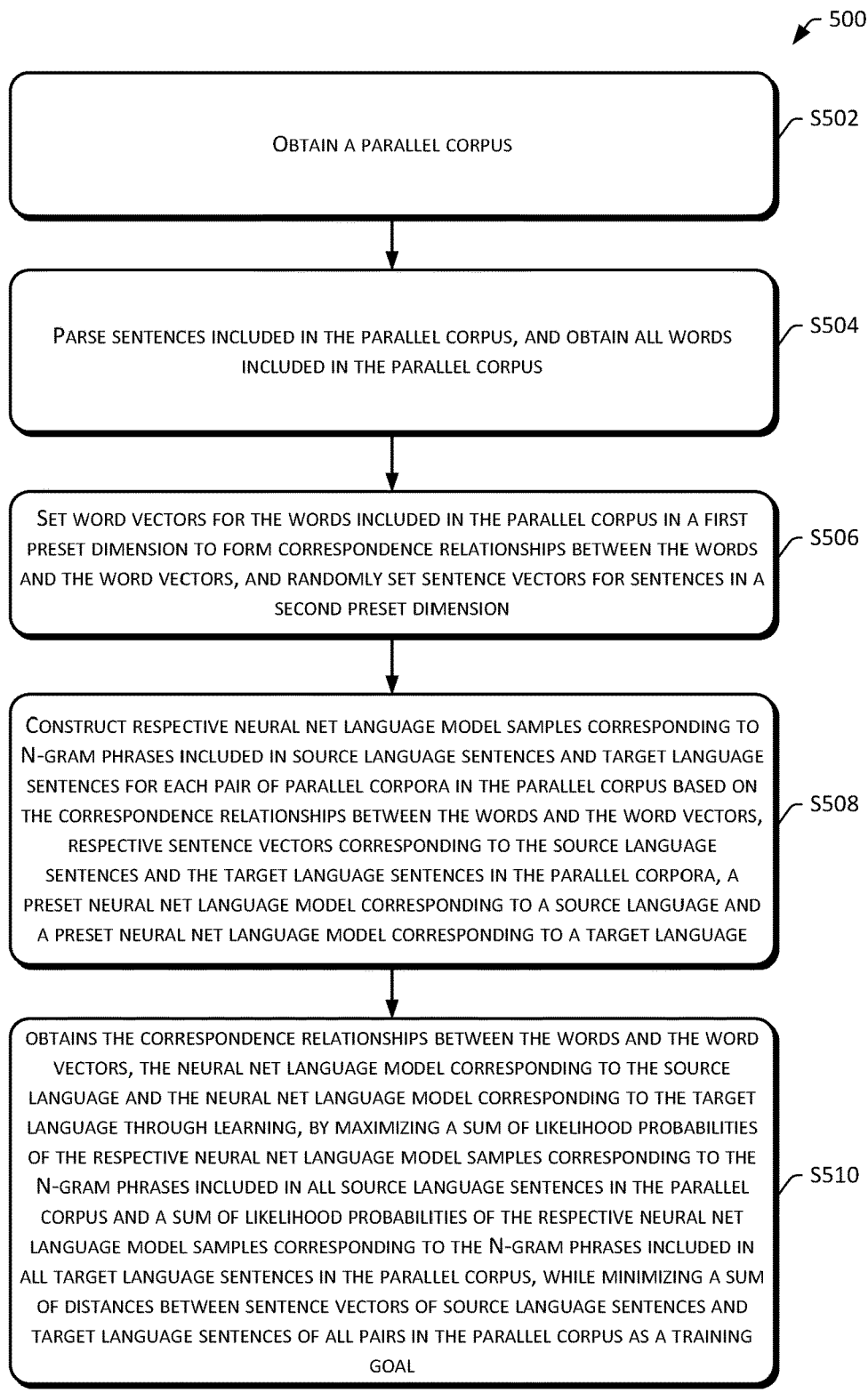
FIG. 5 is a flowchart of training a neural net language model in a statistics-based machine translation method according to an embodiment of the present disclosure.

FIG. 5 is a flowchart 500 of training a neural net language model in the statistics-based machine translation method 100 according to an embodiment of the present disclosure. As a by-product of the neural net language model, word vectors are obtained when the neural net language model is trained. In implementations, correspondence relationships between words and word vectors, a neural net language model corresponding to a source language and a neural net language model corresponding to a target language may be generated using the following method blocks.

S502 obtains a parallel corpus.

Relevant descriptions of the parallel corpus may be obtained with reference to related descriptions of the data preprocessing phase at S102, and are not repeatedly described herein.

S504 parses sentences included in the parallel corpus, and obtains all words included in the parallel corpus.

To obtain correspondence relationships between words and word vectors, each sentence in the parallel corpora needs to be parsed to obtain each word included in the parallel corpus. For example, morpheme or lexicon segmentation may be performed on the English language, such as separating "'s" as a single word, and isolating a symbol from a word connected thereto, etc. Processing such as word segmentation needs to be performed on the Chinese language. After S502 is performed, each word included in a source language and each word included in a target language in the parallel corpus are obtained.

S506 sets word vectors for the words included in the parallel corpus in a first preset dimension to form correspondence relationships between the words and the word vectors, and randomly sets sentence vectors for sentences in a second preset dimension.

In an initial phase of training the neural net language model, an initial word vector for each word included in the parallel corpus needs to be set up first to form an initial correspondence relationship between the respective word and the word vector, i.e., a dictionary. In a real application, an initial word vector may be set for each word randomly, or a word vector that is obtained by another training method may be used as an initial word vector.

In implementations, an input layer of the neural net language model may further include sentence vectors corresponding to a sentence where a N-gram phrase is located, and therefore an initial sentence vector for each sentence in the parallel corpus is further needed to be set up at the initial phase of training the neural net language model. In implementations, initial sentence vectors for sentences are set randomly.

In implementations, the first preset dimension and the second preset dimension may be the same or different. The second preset dimension corresponds to the dimension of a sentence vector, and therefore, the second preset dimension is greater than or equal to the first preset dimension. Generally, the higher dimension of the vector results in more accurate semantic meaning that is expressed, but also leads to a higher computation complexity. In a real application, the first preset dimension and the second preset dimension may be set according to specific requirements. In implementations, the first preset dimension and the second preset dimension are set to have the same dimension value to reduce the computation complexity. Experiments show that word vectors and sentence vectors in 200 dimensions can obtain word vectors having strong cross-lingual features and can also reduce the computation complexity.

S508 constructs respective neural net language model samples corresponding to N-gram phrases included in source language sentences and target language sentences for each pair of parallel corpora in the parallel corpus based on the correspondence relationships between the words and the word vectors, respective sentence vectors corresponding to the source language sentences and the target language sentences in the parallel corpora, a preset neural net language model corresponding to a source language and a preset neural net language model corresponding to a target language.

Figure 6:
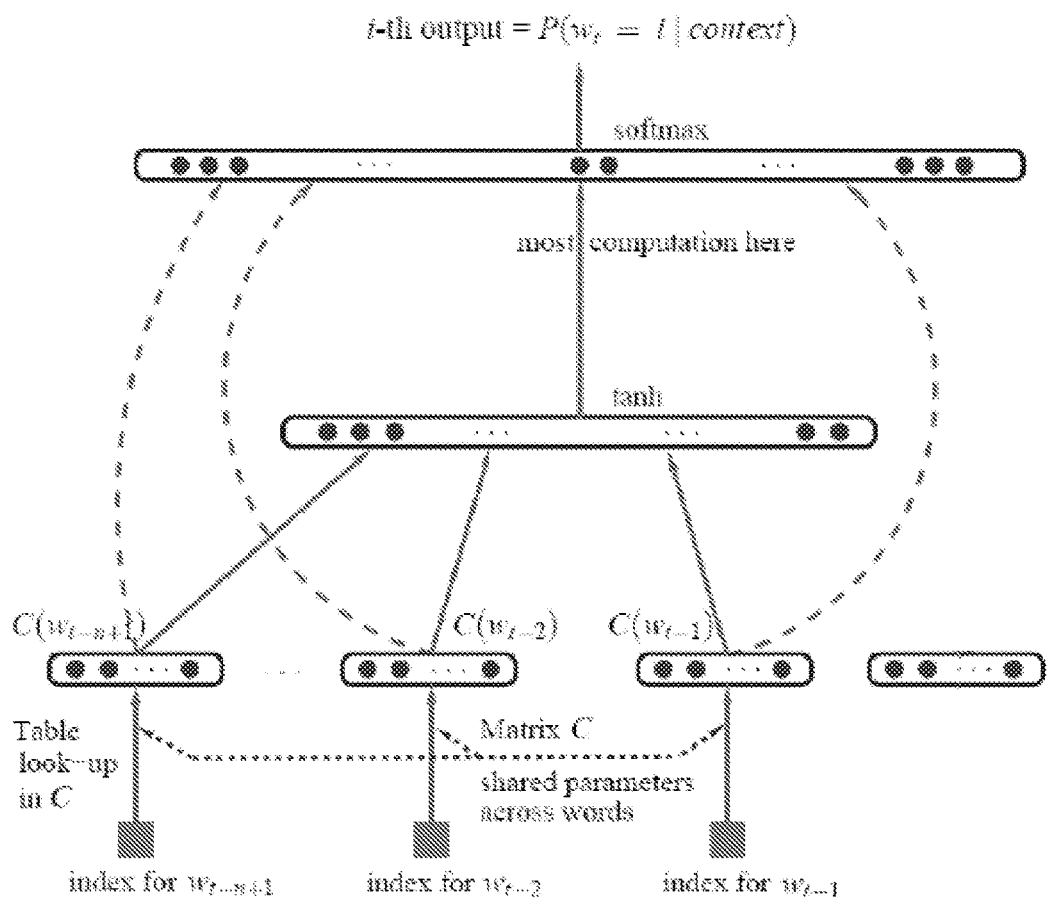
FIG. 6 is a schematic diagram of a neural net language model in a statistics-based machine translation method according to an embodiment of the present disclosure.

FIG. 6 is a schematic diagram of a neural net language model in the statistics-based machine translation method 100 according an embodiment of to the present disclosure. In implementations, a neural net language model may include an input layer, a hidden layer and an output layer. The neural net language model may be an N-GRAM language model constructed using a neural net. Therefore, input layer variables of the neural net language model are word vectors corresponding to first (N−1) words of the N-GRAM language model, that is: $C(w_{t-n+1})$, $C(w_{t-n+1})$, . . . , $C(w_{t-1})$, and an output layer variable is a likelihood probability corresponding to a $N^{th}$ word (that is, a tail word) of the N-GRAM language model. As can be seen from FIG. 6, the input layer includes not only the respective word vectors corresponding to the first (N−1) words of a N-gram phrase, but also a sentence vector D corresponding to a sentence where the N-gram phrase is located.

In FIG. 6, a function of the hidden layer is to integrate the word vectors of the first (N−1) words and the sentence vector corresponding to the sentence where the N-gram phrase is located as a context background to predict the next word by fully utilizing information of the sentence where the N-gram phrase is located. In a real application, a vector value of the hidden layer may be a sum average value of the variables of the input layer, or a combination and splicing of variables of the input layer. In implementations, the vector value of the hidden layer is set to the sum average value of the variables (including the word vectors of the first (N−1) words and the sentence vector) of the input layer to reduce the vector dimension of the hidden layer, thereby achieving the effect of reducing the computation complexity.

It is noted that tail words of the output layer of the neural net language model described in the embodiments of the present disclosure may include a correct tail word (that is, a positive sample) and at least one incorrect tail word (that is, a negative sample) that are connected to the first (N−1) words. Generally, the output layer of the neural net language model includes tail words of all possible combinations of the context, with a sum of probabilities of all the possible combinations as one. In a real application, to reduce the computation complexity and improve the computation efficiency, a preset number of tail words may be selected randomly from all possible tail words to serve as negative samples. In implementations, 25 tail words may be selected randomly to form the negative samples.

In FIG. 6, each input word is mapped into a vector, and the mapping is represented by C, so that $C(w_{t-n+1})$ is a word vector of $w_{t-n+1}$, and an output is also a vector, with the $i^{th}$ element in the vector indicating a probability $P(w_t=i|w_{t-n+1}, \ldots, w_{t-1})$. The output layer is calculated by using a Softmax function, and a calculation formula is shown as follows:

$$P(w_t | w_{t-n+1}, \ldots, w_{t-1}) = \frac{e^{y_{w_t}}}{\sum_{i=1}^{M} e^{y_i}}$$

where M is the dimension of the output layer vector, $y_{w_t}$ is a non-normalized log probability of an output word $w_t$, $y_i$ is a non-normalized log probability of an output word i, and a formula for y is:

$$y = b + Wx + U\tanh(d + Hx)$$

where parameters include: b, W, U, d, and H. b is a bias factor from the input layer to the output layer. W is a transformation matrix formed by connection weights from the input layer to the output layer. U is a translation matrix formed by connection weights from the hidden layer to the output layer. tanh is an excitation function of the hidden layer. d is a bias factor from the input layer to the hidden layer. H is a translation matrix formed by connection weights from the input layer to the hidden layer. $x = (C(w_{t-n+1}), C(w_{t-n+1}), \ldots, C(w_{t-1}), D)$. $\tanh(d+Hx)$ is a vector value of the hidden layer. $U \tanh(d+Hx)$ indicates performing multiplicative integration on a vector value of the hidden layer and the connection weights from the hidden layer to the output layer. It is noted that x is also a parameter that needs to be trained. After the training is completed, the language model can be obtained, and the word vectors can also be obtained.

In a real application, an excitation function of nodes in a neural net may be a symbol function, a sigmoid function, a hyperbolic tangent function or a linear function. In reality, if no excitation function exists, the neural net is equivalent to a linear regression function. If the excitation function is a specific non-linear function, the neural net is equivalent to a logistic regression.

In implementations, in order to reduce the computation complexity and improve the computation efficiency, in the neural net language model corresponding to the source language and the neural net language model corresponding to the target language, the connection weights (that is, element values in the H matrix in FIG. 6) from the input layer to the hidden layer of the model are set to ones, the connection weights (that is, element values in the W matrix in FIG. 6) from the input layer to the output layer of the model are set to zeros, and the implicit layer does not use the excitation function. Therefore, in implementations, a calculation formula of the output layer y is given as follows:

$$y = b + Uh(w_{t-n+1}, \ldots, w_{t-1}; W, D).$$

where $h(w_{t-n+1}, \ldots, w_{t-1}; W, D)$ is a vector value of the hidden layer, with the vector value of the hidden layer being a sum average value of variables (including the word vectors of the first (N−1) words and the sentence vector) of the input layer, W is word vectors corresponding to all words, and D is a sentence vector of the input layer.

The preset neural net language model corresponding to the source language and the preset neural net language model corresponding to the target language described in the embodiment of the present disclosure are neural net language models having respective topology structures and node excitation functions designed in advance. The connection weights are used as a class of parameters of the neural net language model, and are continuously adjusted during the process of training, until final connection weights are obtained when the training goal(s) is/are achieved to be used for real prediction. It is noted that an initial value needs to be preset for each connection weight in an initial phase of the training. In implementations, a manner of randomly presetting an initial value for each connection weight is adopted.

In view of the above, during a process of training a neural net language model, parameters that need to be adjusted include word vectors, sentence vectors, and connection weights of the neural net language model.

Figure 7:
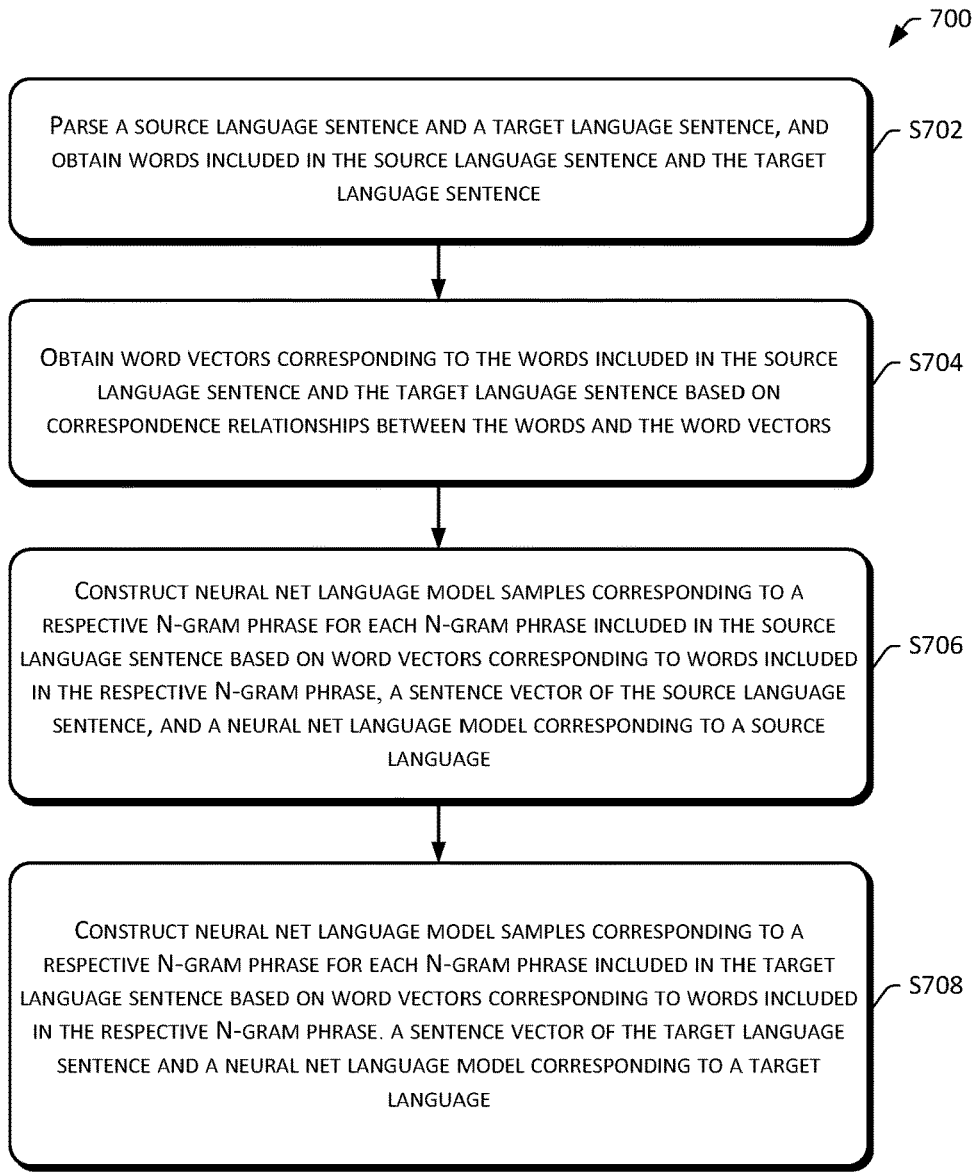
FIG. 7 is a flowchart of constructing a neural net language model sample in a statistics-based machine translation method according to an embodiment of the present disclosure.

FIG. 7 is a flowchart 700 of constructing a neural net language model sample in the statistics-based machine translation method 100 according to an embodiment of the present disclosure. Specifically, constructing respective neural net language model samples corresponding to N-gram phrases included in source language sentence and target language sentence for each pair of parallel corpora based on correspondence relationships between words and word vectors, respective sentence vectors corresponding to the source language sentences and target language sentences in the parallel corpora, a preset neural net language model corresponding to a source language and a preset neural net language model corresponding to a target language may include the following method blocks.

S702 parses a source language sentence and a target language sentence, and obtains words included in the source language sentence and the target language sentence.

To construct all neural net language model samples corresponding to an N-gram phrase in a pair of parallel corpora, a source language sentence and a target language sentence in the parallel corpora need to be parsed to obtain words included in the sentences. The words are used as input layer variables or output layer variables for the neural net language model samples. For example, morpheme/lexicon segmentation is performed on the English language, such as separating "'s" as a single word, and isolating a symbol from a word connected thereto. Processing such as word segmentation needs to be performed on the Chinese language. After S702 is performed, all words included in the source language sentence and all words included in the target language sentence in the parallel corpora are obtained.

S704 obtains word vectors corresponding to the words included in the source language sentence and the target language sentence based on correspondence relationships between the words and the word vectors.

A neural net requires all input variables to be a real number between 0 and 1 (or between −1 and +1). Therefore, this data cannot be used as an input for the neural net. S704 implements mapping from a word to a word vector, uses the word as a search condition to perform a query on correspondence relationships between words and word vectors, and obtains the word vector corresponding to the word to serve as an input for the neural net. It is noted that the word vector at S704 is an initial word vector.

S706 constructs neural net language model samples corresponding to a respective N-gram phrase for each N-gram phrase included in the source language sentence based on word vectors corresponding to words included in the respective N-gram phrase, a sentence vector of the source language sentence, and a neural net language model corresponding to a source language.

In implementations, the neural net language model may include a neural net language model corresponding to a source language and a neural net language model corresponding to a target language. The neural net language model samples corresponding to the N-gram phrase included in the source language sentence are constructed according to the neural net language model corresponding to the source language. The neural net language model samples corresponding to the N-gram phrases included in the target language sentence are constructed according to the neural net language model corresponding to the target language.

S708 constructs neural net language model samples corresponding to a respective N-gram phrase for each N-gram phrase included in the target language sentence based on word vectors corresponding to words included in the respective N-gram phrase, a sentence vector of the target language sentence and a neural net language model corresponding to a target language.

A difference between S708 and S706 is that the two types of neural net language model samples that are constructed are directed to different sentences. S708 is directed to the target language sentence, and S706 is directed to the source language sentence.

Figure 8:
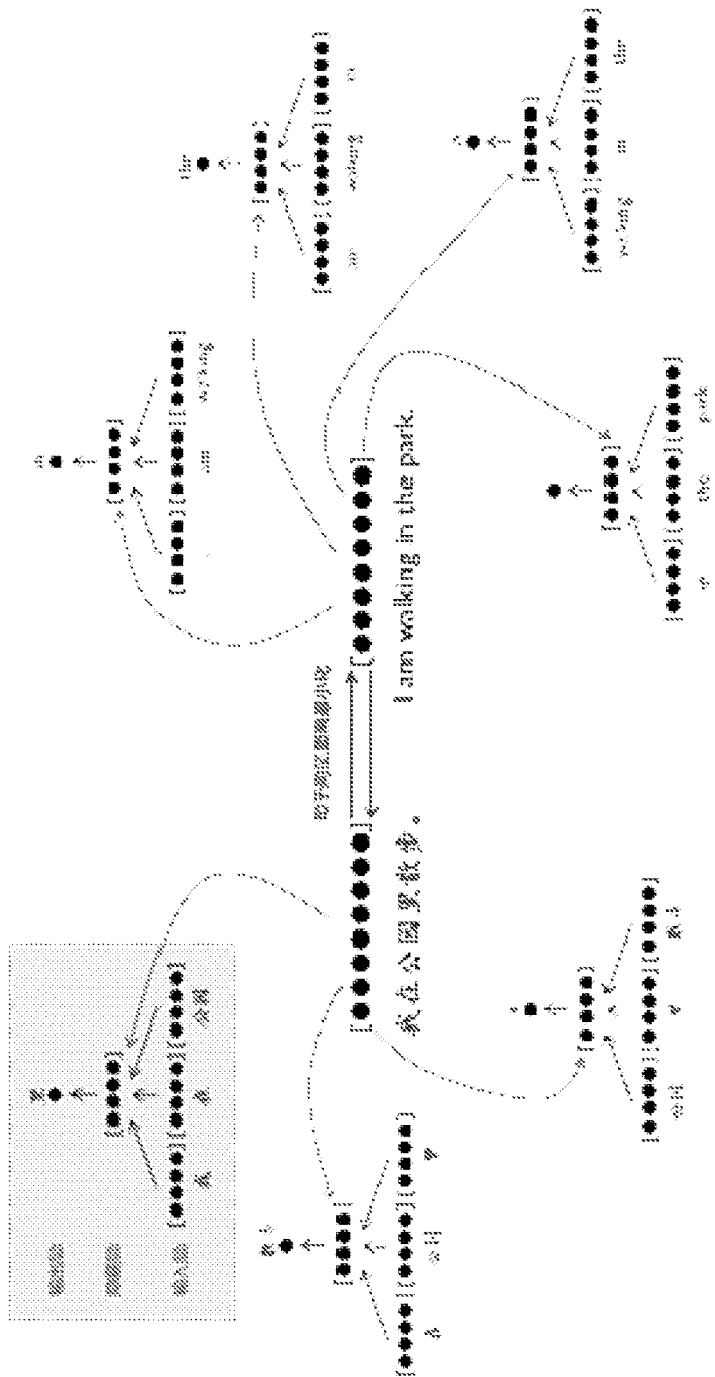
FIG. 8 is a schematic diagram of a neural net language model sample related to a pair of parallel corpora in a statistics-based machine translation method according to an embodiment of the present disclosure.

FIG. 8 is a schematic diagram of a neural net language model sample related to a pair of parallel corpora in the statistics-based machine translation method 100 according to an embodiment of the present disclosure. A source language sentence in the parallel corpora of FIG. 8 is "我在公园里散步。", and a target language sentence is "I am walking in the park."

In implementations, a neural net language model adopts a 4-gram language model, and the dimension of a word vector is 200 dimensions. As can be seen from FIG. 8, neural net language model samples that are related to this pair of parallel corpora include three neural net language model samples corresponding to a source language and four neural net language model samples corresponding to a target language. An input layer of each neural net language model sample includes a sentence vector corresponding to a sentence where a N-gram phrase is located.

S510 obtains the correspondence relationships between the words and the word vectors, the neural net language model corresponding to the source language and the neural net language model corresponding to the target language through learning, by maximizing a sum of likelihood probabilities of the respective neural net language model samples corresponding to the N-gram phrases included in all source language sentences in the parallel corpus and a sum of likelihood probabilities of the respective neural net language model samples corresponding to the N-gram phrases included in all target language sentences in the parallel corpus, while minimizing a sum of distances between sentence vectors of source language sentences and target language sentences of all pairs in the parallel corpus as a training goal.

During the process of training the neural net language model, various parameters in the model, for example, word vectors, sentence vectors and connection weights, are adjusted gradually. When the training goal is achieved, final correspondence relationships between the words and the word vectors, the neural net language model corresponding to the source language and the neural net language model corresponding to the target language are obtained.

Figure 9:
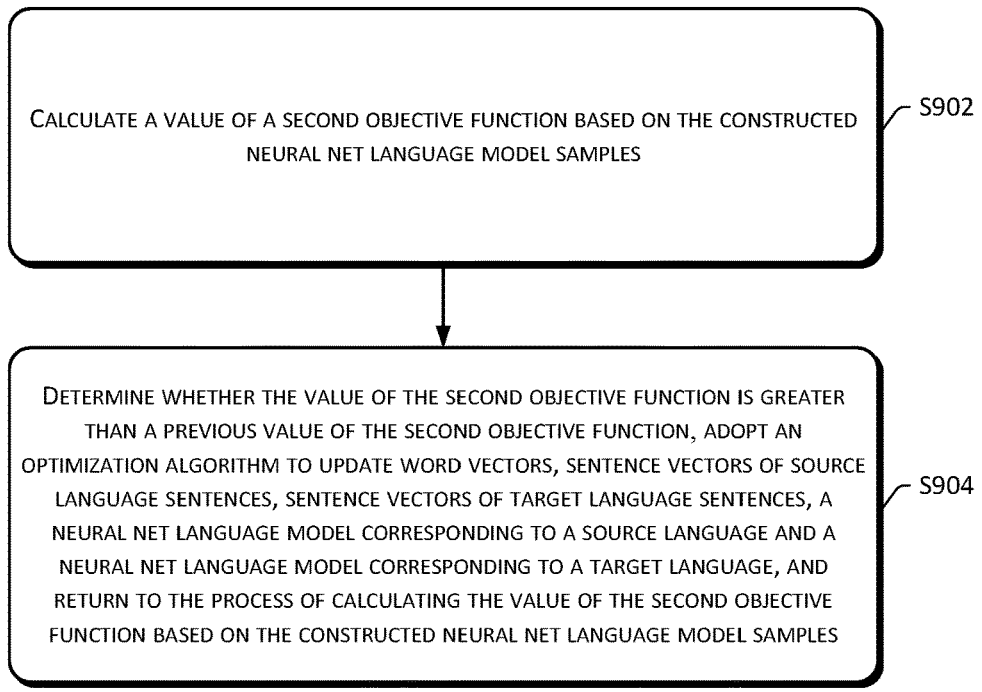
FIG. 9 is a flowchart of S510 in the statistics-based machine translation method according to an embodiment of the present disclosure.

FIG. 9 is a flowchart of S510 in the statistics-based machine translation method 100 according to an embodiment of the present disclosure. In implementations, S510 may include the following method blocks.

S902 calculates a value of a second objective function based on the constructed neural net language model samples.

The second objective function refers to a difference between a sum of a third average value and a fourth average value, and a sum of distances between sentence vectors of source language sentences and target language sentences of all pairs in the parallel corpus. The third average value refers to an average value of likelihood probabilities of respective neural net language model samples corresponding to N-gram phrases included in all source language sentences in the parallel corpus. The fourth average value refers to an average value of likelihood probabilities of respective neural net language model samples corresponding to N-gram phrases included in all target language sentences in the parallel corpus.

A formalized expression of the third average value is represented as:

$$J_{LM_{src}} = \frac{1}{N}\sum_{t=n}^{N} \log P(w_t | w_{t-n+1}, \ldots, w_{t-1}, d_{src})$$

wherein, $J_{LM_{src}}$ is the third average value, N is the number of neural net language model samples corresponding to N-gram phrases included in all source language sentences in the parallel corpus, and $d_{src}$ is a source language sentence where an N-gram phrase is located. A formalized expression of the fourth average value is the same as the formalized expression of the third average value, and is not redundantly described herein.

After the neural net language model samples are constructed, a likelihood probability of each neural net language model sample and a distance between sentence vectors of a pair of a source language sentence and a target language sentence may be calculated according to input layer variables of the neural net language model sample and parameters in the net, and the value of the second objective function is calculated.

S904 determines whether the value of the second objective function is greater than a previous value of the second objective function, adopts an optimization algorithm to update word vectors, sentence vectors of source language sentences, sentence vectors of target language sentences, a neural net language model corresponding to a source language and a neural net language model corresponding to a target language, and returns to the process of calculating the value of the second objective function based on the constructed neural net language model samples.

S902 is a training cycle. A large number (often hundreds) of training cycles may be needed to complete the training of a neural net language model. A condition of terminating the training is that the training goal is achieved, i.e., the value of the second objective function reaches the maximum value. The value of the second objective function obtained in this training is compared with a value of the second objective function obtained in the previous training. If the value of the second objective function obtained in this training is greater than the value of the second objective function obtained in the previous training, this indicates that the model parameters may be further optimized, and training needs to be continued to achieve the training goal. In contrast, if the value of the second objective function obtained in this training is less than the value of the second objective function obtained in the previous training, this indicates that the model parameters have achieved the training goal, and the training may be terminated. The neural net language model obtained after the training is completed is a model found from the parallel corpus, which describes patterns or ruled of change that response variables (that is, variables of the output layer) are affected by prediction variables (that is, variables of the input layer) in the parallel corpus.

The most basic algorithm of adjusting parameters in a neural net language model is an error feedback method. Currently, relatively new methods include a gradient algorithm, a Newton-like algorithm, a Levenberg-Marquardt algorithm, and a genetic algorithm, etc. Different approaches of optimization algorithms are variations of exemplary implementations without departing from the core of the present disclosure, and therefore all fall within the scope of protection of the present disclosure.

In implementations, the optimization algorithm adopts a random gradient algorithm. In implementations, updating the word vectors, the sentence vectors of the source language sentences, the sentence vectors of the target language sentences, the neural net language model corresponding to the source language and the neural net language model corresponding to the target language through the random gradient algorithm may include: 1) calculating gradients of the connection weights of the word vectors, the sentence vectors of the source language sentences, the sentence vectors of the target language sentences, the neural net language model corresponding to the source language and the neural net language model corresponding to the target language based on a preset learning rate and the second objective function; and 2): updating the word vectors, the sentence vectors of the source language sentences, the sentence vectors of the target language sentences, the neural net language model corresponding to the source language and the neural net language model corresponding to the target language based on the gradients of the connection weights of the word vectors, the sentence vectors of the source language sentences, the sentence vectors of the target language sentences, the neural net language model corresponding to the source language and the neural net language model corresponding to the target language.

By using the random gradient algorithm, the rule of gradient update is:

$$\theta \leftarrow \theta + \epsilon \frac{\partial (\log P(w_t \mid w_{t-n+1}^{t-1}, d_{src}) + \log P(w_t \mid w_{t-n+1}^{t-1}, d_{tgt}) - sim_{cos}(d_{src}, d_{tgt}))}{\partial \theta}$$

where $\theta$ is various parameter values, $\epsilon$ is a learning rate, $d_{src}$ is a source language sentence, $d_{tgt}$ is a target language sentence, and $sim_{cos}(d_{src}, d_{tgt})$ is a distance between sentence vectors of the source language sentence and the target language sentence.

In implementations, the learning rate determines amounts of changes of parameters generated in each cycle of training. A large learning rate may cause instability of the system. A small learning rate may cause a long training time, and may have a slow convergence. However, a small learning rate may ensure that a value of an objective function can finally tend to the maximum value of the objective function. Therefore, in a general case, a small learning rate is preferably selected to ensure the stability of the system. A selection range of the learning rate is between 0.01 and 0.8.

In a real application, for complicated network such as neural net language models, different learning rates may be needed in different portions of a curved surface of an objective function. In order to reduce the number of trainings and a training time for finding a learning rate, a suitable method is to use a variable self-adaptive learning rate, so that learning rates of different magnitudes are set in different phases of the training of the net.

Through S502 to S510, after the neural net language model corresponding to the source language, the neural net language model corresponding to the target language and the correspondence relationships between the words and the word vectors are generated by training, respective neural net language model samples corresponding to the N-gram phrases included in the sentence to be translated and the candidate translated texts may be constructed.

Figure 10:
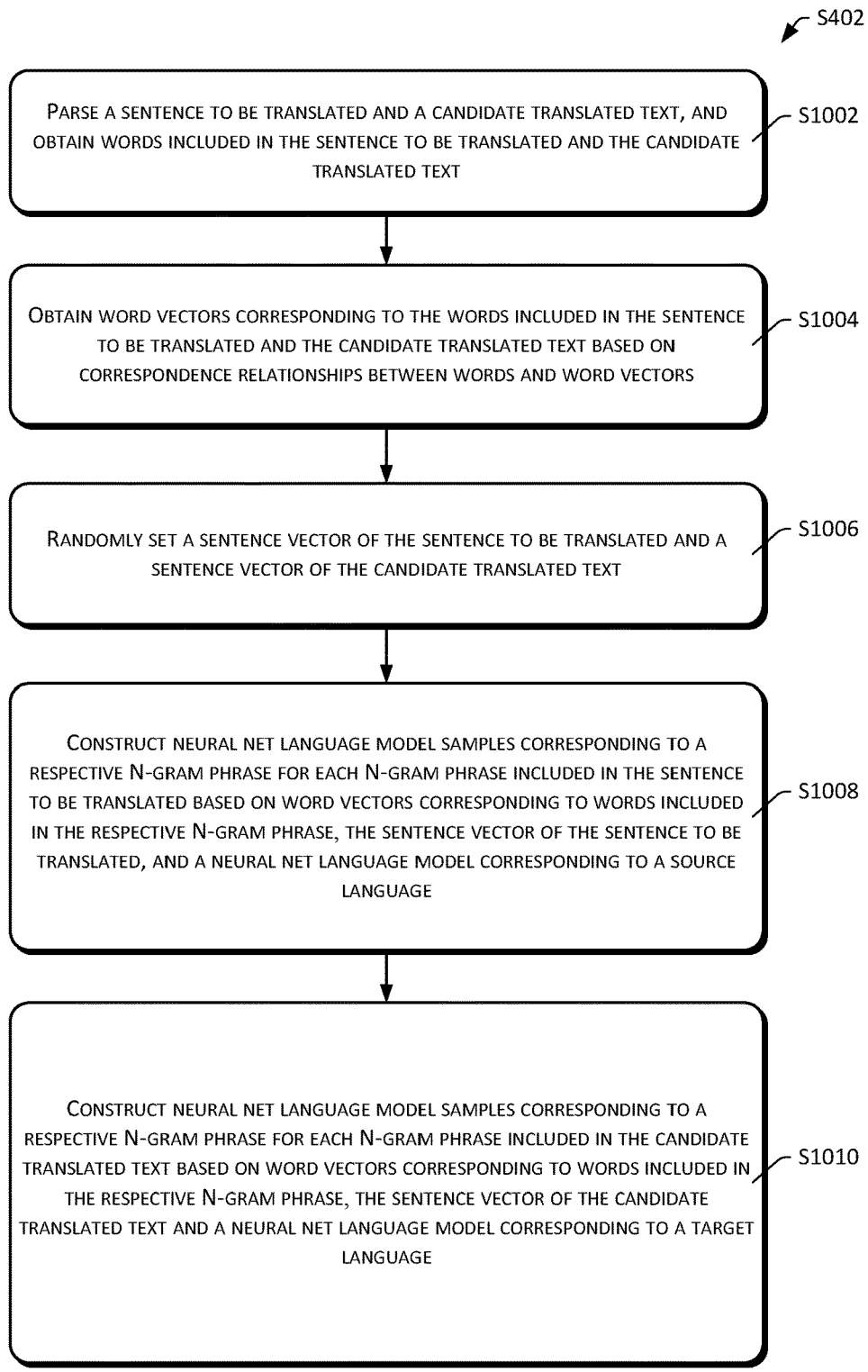
FIG. 10 is a flowchart of S402 in the statistics-based machine translation method an embodiment of according to the present disclosure.

FIG. 10 is a flowchart of S402 in the statistics-based machine translation method 100 according to an embodiment of the present disclosure. In implementations, S402 may include the following method blocks.

S1002 parses a sentence to be translated and a candidate translated text, and obtains words included in the sentence to be translated and the candidate translated text.

The processing method of S1002 corresponds to that of S702. A difference therebetween is that they are directed to different sentences. S702 is directed to a source language sentence and a target language sentence in parallel corpora, whereas S1002 is directed to a sentence to be translated and a candidate translated text. Identical parts of them are not redundantly described herein, and related descriptions may be obtained with reference to respective parts of S702.

S1004 obtains word vectors corresponding to the words included in the sentence to be translated and the candidate translated text based on correspondence relationships between words and word vectors.

The processing method of S1004 corresponds to that of S704. A difference therebetween is that: a word vector at S704 is an initial word vector, and a word vector at S1004 is a trained word vector. Identical parts of them are not redundantly described herein, and related descriptions may be obtained with reference to respective parts of S704.

S1006 randomly sets a sentence vector of the sentence to be translated and a sentence vector of the candidate translated text.

The sentence vector of the sentence to be translated and the sentence vector of the candidate translated text are learned by using respective neural net language model samples corresponding to N-gram phrases included in the sentence to be translated and the candidate translated text constructed at S402. Therefore, when the samples are constructed, respective initial sentence vectors are needed to be set for the sentence to be translated and the candidate translated text.

S1008 constructs neural net language model samples corresponding to a respective N-gram phrase for each N-gram phrase included in the sentence to be translated based on word vectors corresponding to words included in the respective N-gram phrase, the sentence vector of the sentence to be translated, and a neural net language model corresponding to a source language.

The processing method of S1008 corresponds to that of S706. A difference therebetween is that they are directed to different sentences. S706 is directed to a source language sentence in parallel corpora, and S1008 is directed to a sentence to be translated. Identical parts thereof are not redundantly described herein, and related descriptions may be obtained with reference to respective portions of S706.

S1010 constructs neural net language model samples corresponding to a respective N-gram phrase for each N-gram phrase included in the candidate translated text based on word vectors corresponding to words included in the respective N-gram phrase, the sentence vector of the candidate translated text and a neural net language model corresponding to a target language.

The processing method of S1010 corresponds to that of S708. A difference therebetween is that they are directed to different sentences. S708 is directed to a target language sentence in parallel corpora, and S1008 is directed to a candidate translated text.

Identical parts thereof are not redundantly described herein, and related descriptions may be obtained with reference to respective portions of S708.

After respective neural net language model samples corresponding to N-gram phrases included in the sentence to be translated and the candidate translated text are constructed at S402, the neural net language model is trained.

S404 obtains the sentence vector of the sentence to be translated and the sentence vector of the candidate translated text through learning by maximizing a sum of likelihood probabilities of respective neural net language model samples corresponding to N-gram phrases included in the sentence to be translated and a sum of likelihood probabilities of respective neural net language model samples corresponding to N-gram phrases included in the candidate translated text, while minimizing a distance between the sentence vector of the sentence to be translated and the sentence vector of the candidate translated text as a training goal.

S404 corresponds to S510, and differences therebetween include: 1) different neural net language model samples that are directed to; and 2) different adjusted parameters.

1) Different neural net language model samples that are directed to

S510 is directed to respective neural net language model samples corresponding to N-gram phrases included in all sentences in parallel corpus, and S404 is directed to respective neural net language model samples corresponding to N-gram phrases included in a sentence to be translated and a candidate translated text.

2) Different adjusted parameters

Parameters adjusted at S510 include word vectors, sentence vectors, and connection weights in a neural net language model corresponding to a source language and a neural net language model corresponding to a target language. S404 merely adjusts sentence vectors corresponding to a sentence to be translated and a candidate translated text.

In view of the above, a training goal of S510 is to obtain correspondence relationships between words and word vectors, a neural net language model corresponding to a source language and a neural net language model corresponding to a target language. A training goal of S404 is to obtain a sentence vector of a sentence to be translated and a sentence vector of a candidate translated text. Identical parts of S404 and S510 are not redundantly described herein, and related descriptions may be obtained with reference to respective portions of S510.

Figure 11:
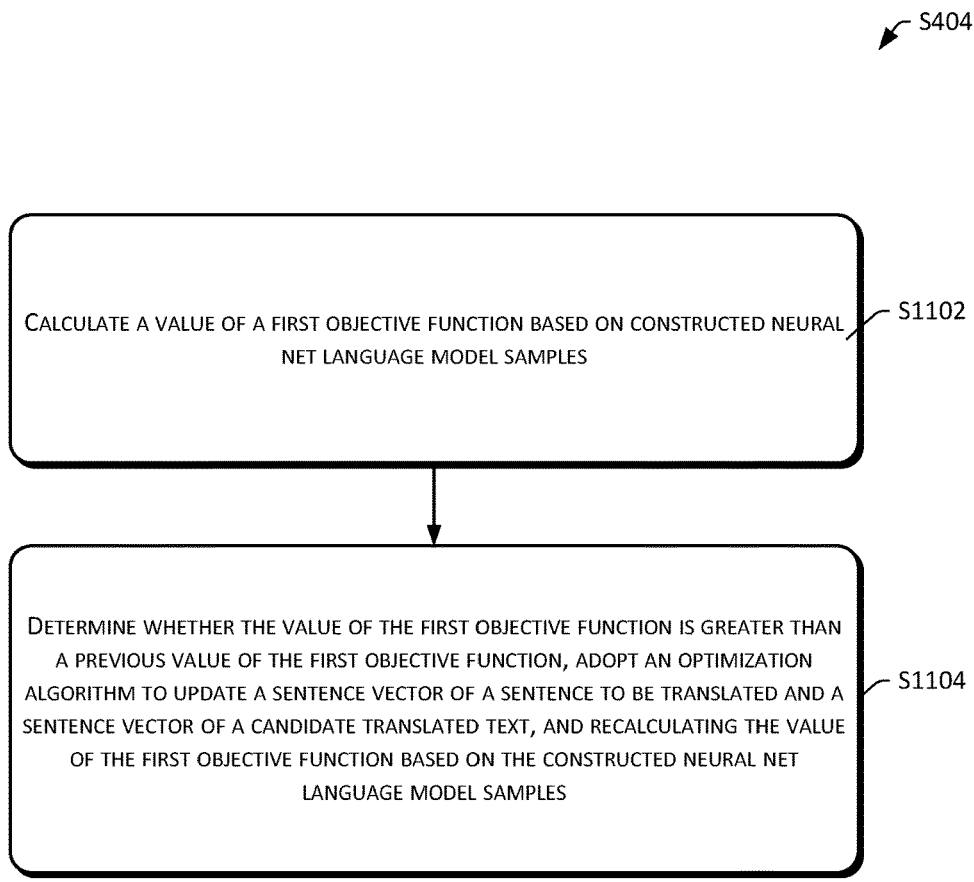
FIG. 11 is a flowchart of S404 in the statistics-based machine translation method according an embodiment of to the present disclosure.

FIG. 11 is a flowchart of S404 in the statistics-based machine translation method 100 according to an embodiment of the present disclosure. In implementations, S404 includes:

S1102 calculates a value of a first objective function based on constructed neural net language model samples.

In implementations, the first objective function refers to a difference between a sum of a first average value and a second average value, and a distance between a sentence vector of a sentence to be translated and a sentence vector of a candidate translated text. The first average value refers to an average value of likelihood probabilities of neural net language model samples corresponding to N-gram phrases included in the sentence to be translated. The second average value refers to an average value of likelihood probabilities of neural net language model samples corresponding to N-gram phrases included in the candidate translated text.

After neural net language model samples of a sentence to be translated and a candidate translated text are constructed, a likelihood probability of each neural net language model sample may be calculated according to input layer variables of the respective neural net language model sample and parameters in the net, a distance between a sentence vector of the sentence to be translated and a sentence vector of the candidate translated text is also calculated, and a value of the first objective function is calculated.

S1104 determines whether the value of the first objective function is greater than a previous value of the first objective function, adopts an optimization algorithm to update a sentence vector of a sentence to be translated and a sentence vector of a candidate translated text, and returns to the method block of calculating the value of the first objective function based on the constructed neural net language model samples.

S1104 corresponds to S904, and respective training processes are the same and are not redundantly described herein. Related descriptions may be obtained with reference to corresponding portions of S904. Method blocks described herein are merely schematic.

In implementations, the optimization algorithm adopts a random gradient algorithm. Adopting the optimization algorithm to update the sentence vector of the sentence to be translated and the sentence vector of the candidate translated text may include: 1) calculating gradients of the sentence vector of the sentence to be translated and the sentence vector of the candidate translated text based on a preset learning rate and the first objective function; and 2) updating the sentence vector of the sentence to be translated and the sentence vector of the candidate translated text based on the gradients of the sentence vector of the sentence to be translated and the sentence vector of the candidate translated text.

S304 computes a distance between the sentence vector of the sentence to be translated and the sentence vector of the candidate translated text, which is serves as a degree of semantic similarity between the sentence to be translated and the candidate translated text.

After the sentence vector of the sentence to be translated and the sentence vector of the candidate translated text are obtained at S302, a distance between the two sentence vectors may be calculated. The distance is used as a degree of semantic similarity between the sentence to be translated and the candidate translated text.

After the features of the candidate translated texts that affect the probabilities of translation are obtained, the probabilities of translation from the text to be translated to the candidate translated texts are generated based on the features of the candidate translated texts that affect the probabilities of translation and a pre-generated translation probability prediction model.

In implementations, the pre-generated translation probability prediction model refers to a translation probability prediction model hat is learned from pre-stored parallel corpora through a machine learning algorithm. In implementations, the machine learning algorithm that can be adopted may include algorithms such as linear regression, regression decision tree, or iteration decision tree, etc. Probabilities of translation generated by different algorithms have different accuracies, and computation complexities of different algorithms are also different. In a real application, a translation probability prediction model may be generated by selecting any machine learning algorithm according to specific application requirements.

In implementations, the translation probability prediction model is learned from pre-stored parallel corpora by adopting a linear regression algorithm. In the translation probability prediction model based on linear regression, each feature that affects a translation probability has a weight of its own, and weights are used to control influences of different features on the probabilities of translation from the text to be translated to the candidate translated text.

During the process of statistics-based machine translation, the obtained parallel corpora may be divided into three parts. The first part is used for word alignment and phrase extraction. The second part is used for training of the translation probability prediction model. The third part is used for system evaluation. For data of the second part and the third part, each source language sentence preferably has multiple reference translations.

In implementations, a minimized error rate training algorithm is adopted. By optimizing weights of translation features on the second part of data that is prepared (Tuning Set), a given optimization criterion is optimized. Common optimization criteria include information entropy, BLEU, TER, etc. This phase needs to perform multiple times of decoding on the tuning set using a decoder. M results having the highest scores are generated in each decoding, and the weights of the translation features are adjusted. When the weights are adjusted, the order of N results may be changed, and the one with the highest score, that is, the decoding result, is used to calculate a BLEU score or TER. When a new group of weights is obtained and the scores of the entire tuning set are improved, the next round of decoding is performed. This process is repeated until no new improvement can be observed.

In a real application, a training time may take hours or days according to different selected M values, the size of the tuning set, the size of the model, and the speed of the decoder. Through the weights of the translation features, the scores of the translation system on an objective evaluation criteria become increasingly high, and at the same time, the objective evaluation criteria needs to be improved continuously, so that the objective evaluation criteria is increasingly closer to a subjective evaluation criteria.

In a process of a real translation, any combination of features that affect probabilities of translation may be selected according to specific requirements. After weights of the features are determined, a probability of translation from a sentence to be translated to each candidate translation is calculated.

S106 selects a preset number of candidate translated texts having respective probabilities of translation in high ranking positions to serve as translated texts of the sentence to be translated.

After the probabilities of translation from the sentence to be translated to the candidate translation texts are obtained at S104, a preset number of candidate translated texts having respective probabilities of translation in high ranking positions are selected to serve as candidate translated texts of the sentence to be translated.

In implementations, a candidate translated text corresponding to the maximum value in the probabilities of translation is selected to serve as a translated text of the sentence to be translated, and the following calculation formula is adopted:

$$t^* = \mathrm{argmax} P(t|s) = \mathrm{argmax} \frac{\exp\left(\sum_{i=1}^{I} \lambda_i \cdot h_i(s, t)\right)}{\sum_{t=1}^{T} \exp\left(\sum_{i=1}^{T} \lambda_i \cdot h_i(s, t)\right)}$$

where $t^*$ is a final translated text of a sentence to be translated, $h_i(s, t)$ is the $i^{th}$ feature that affects a translation probability, $\lambda_i$ is a weight corresponding to the $i^{th}$ feature that affects the translation probability, I is a number of features that affect the translation probability, T is a number of candidate translated texts, s is the sentence to be translated, and t is a candidate translated text.

In implementations, a statistics-based machine translation method 100 is provided. Correspondingly, the present disclosure further provides a statistics-based machine translation apparatus. The apparatus corresponds to the foregoing method embodiment.

Figure 12:
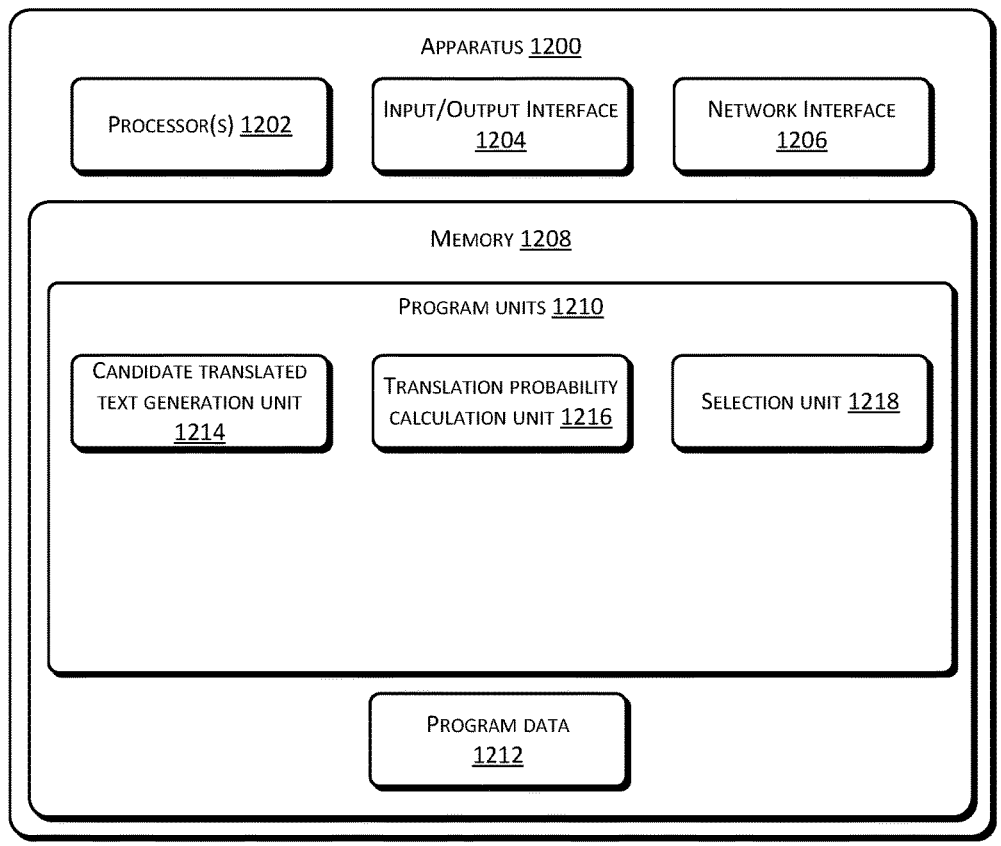
FIG. 12 is a schematic diagram of a statistics-based machine translation apparatus according to an embodiment of the present disclosure.

FIG. 12 is a schematic diagram of a statistics-based machine translation apparatus 1200 according to an embodiment of the present disclosure. The apparatus embodiment is basically similar to the method embodiment, and therefore a description thereof is relatively simple. Related parts may be obtained with reference to the description of corresponding portions in the method embodiment. The apparatus embodiment described herein is merely schematic.

In implementations, the statistics-based machine translation apparatus 1200 may include one or more computing devices. In a typical configuration, a computing device includes one or more processors, I/O interfaces, network interfaces and memory. By way of example and not limitations, the apparatus 1200 may include one or more processors 1202, an input/output (I/O) interface 1204, a network interface 1206 and memory 1208.

The memory 1208 may include a form of computer-readable media, e.g., a non-permanent storage device, random-access memory (RAM) and/or a nonvolatile internal storage, such as read-only memory (ROM) or flash RAM. The memory 1208 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 1208 may include program units 1210 and program data 1212. The program units 1210 may include a candidate translated text generation unit 1214 for decoding a sentence to be translated according to a pre-generated translation rule to generate candidate translated texts of the sentence to be translated; a translation probability calculation unit 1216 for generating probabilities of translation from the sentence to be translated to the candidate translated texts based on features of the candidate translated texts that affect the probabilities of translation and a pre-generated translation probability prediction model, the features that affect the probabilities of translation including at least respective degrees of semantic similarity between the sentence to be translated and the candidate translated texts; and a selection unit 1218 for selecting a preset number of candidate translated texts having respective probabilities of translation in high ranking positions to serve as translated texts of the sentence to be translated.

Figure 13:
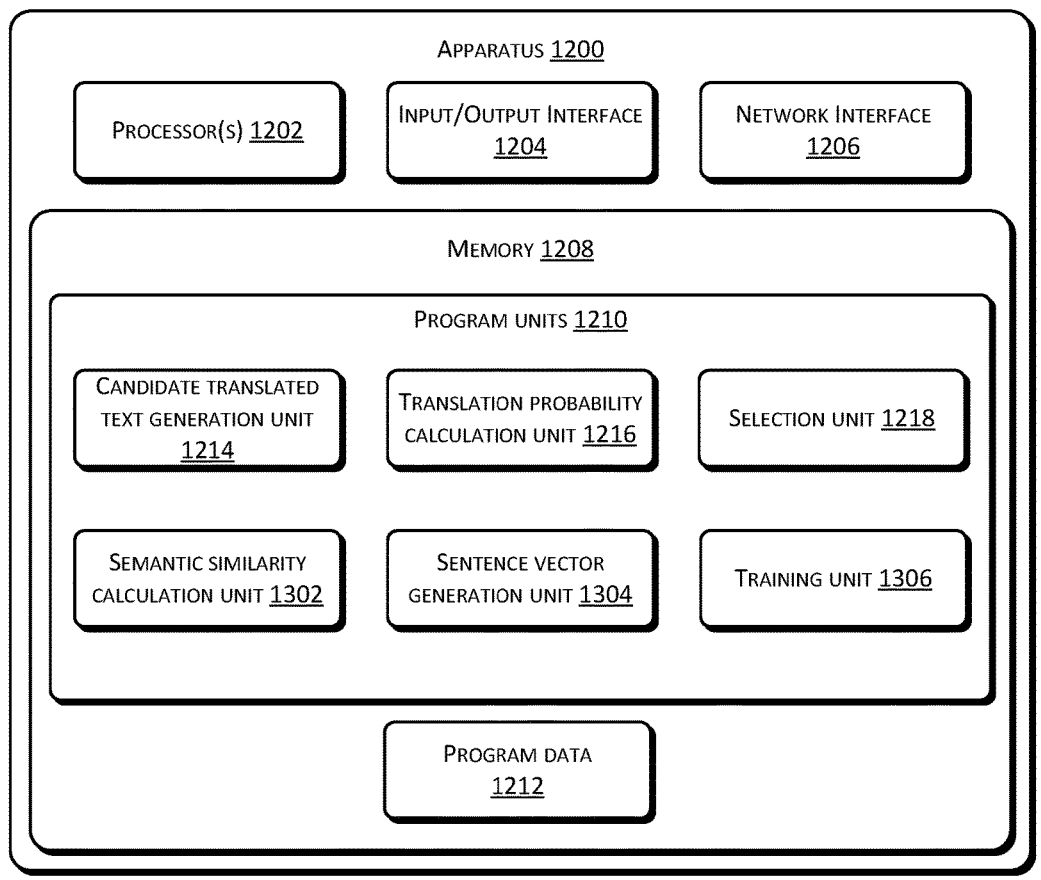
FIG. 13 is a schematic diagram of a statistics-based machine translation apparatus according to an embodiment of the present disclosure.

FIG. 13 is a schematic diagram of the statistics-based machine translation apparatus 1200 according to an embodiment of the present disclosure. In implementations, the apparatus 1200 may further include a semantic similarity calculation unit 1302 for calculating a degree of semantic similarity between the sentence to be translated and a candidate translated text.

Figure 14:
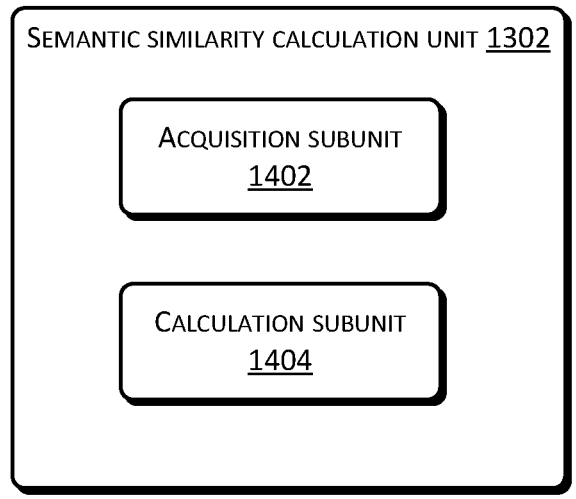
FIG. 14 is a schematic diagram of a semantic similarity calculation unit in the statistics-based machine translation apparatus according to an embodiment of the present disclosure.

FIG. 14 is a schematic diagram of a semantic similarity calculation unit 1302 of the statistics-based machine translation apparatus 1200 according to an embodiment of the present disclosure. In implementations, the semantic similarity calculation unit 1302 includes an acquisition subunit 1402 to obtain a sentence vector of the sentence to be translated and a sentence vector of the candidate translated text; and a calculation subunit 1404 to calculate a distance between the sentence vector of the sentence to be translated and the sentence vector of the candidate translated text, which is served as the degree of semantic similarity between the sentence to be translated and the candidate translated text, wherein the sentence vector of the sentence to be translated and the sentence vector of the candidate translated text include semantic information of corresponding sentences.

In implementations, the apparatus 1200 may further include a sentence vector generation unit 1304 to generate the sentence vector of the sentence to be translated and the sentence vector of the candidate translated text, as shown in FIG. 13.

Figure 15:
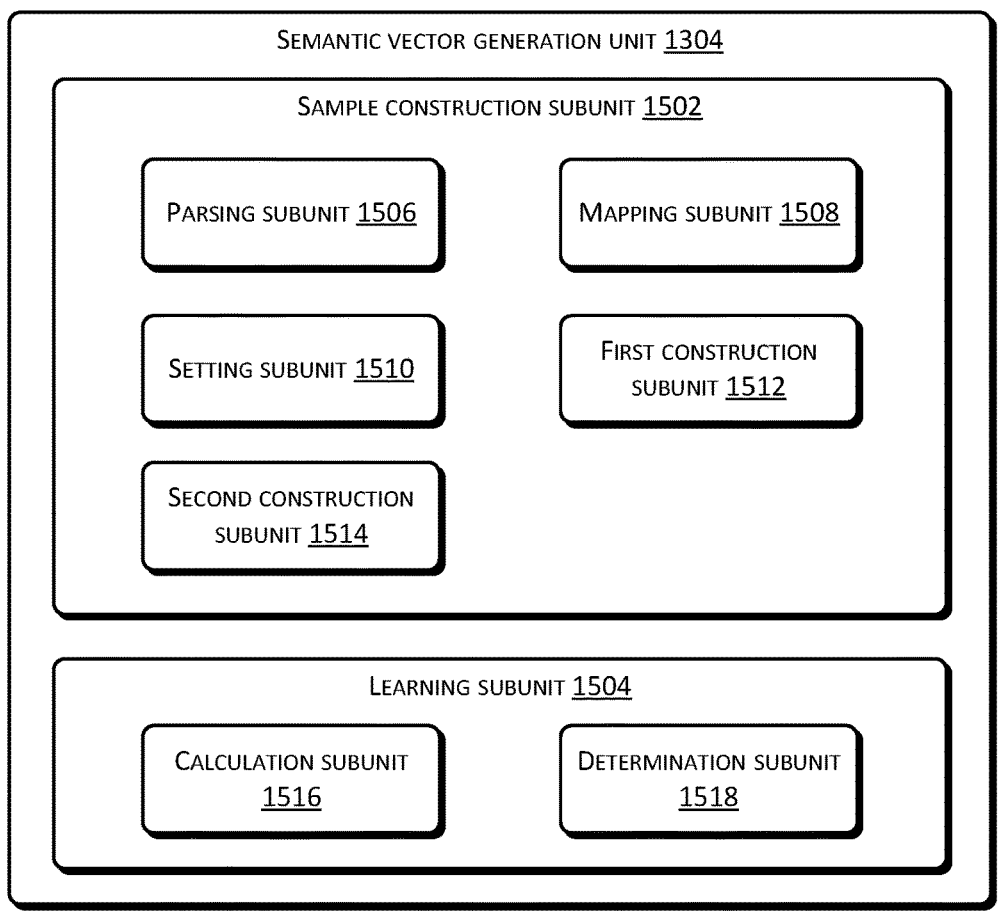
FIG. 15 is a schematic diagram of a sentence vector generation unit in the statistics-based machine translation apparatus according to an embodiment of the present disclosure.

FIG. 15 is a schematic diagram of a sentence vector generation unit 1304 of the statistics-based machine translation apparatus 1200 according to an embodiment of the present disclosure. In implementations, the sentence vector generation unit 1304 includes a sample construction subunit 1502 to construct respective neural net language model samples corresponding to N-gram phrases included in the sentence to be translated and the candidate translated text based on pre-generated correspondence relationships between words and word vectors, a neural net language model corresponding to a source language and a neural net language model corresponding to a target language; and a learning subunit 1504 for learning and obtaining the sentence vector of the sentence to be translated and the sentence vector of the candidate translated text by maximizing a sum of likelihood probabilities of the respective neural net language model samples corresponding to the N-gram phrases included in the sentence to be translated and a sum of likelihood probabilities of the respective neural net language model samples corresponding to the N-gram phrases included in the candidate translated text while minimizing the distance between the sentence vector of the sentence to be translated and the sentence vector of the candidate translated text as a training goal, where the source language is a language to which the sentence to be translated belongs, the target language is a language to which the candidate translated text belongs, and an input layer of the neural net language model includes sentence vectors corresponding to respective sentences where the N-gram phrases are located.

In implementations, the sample construction subunit 1502 may include:

a parsing subunit 1506 to parses the sentence to be translated and the candidate translated text, and obtain words included in the sentence to be translated and the candidate translated text;

a mapping subunit 1508 to obtain word vectors corresponding to the words included in the sentence to be translated and the candidate translated text based on the correspondence relationships between the words and the word vectors;

a setting subunit 1510 to randomly set the sentence vector of the sentence to be translated and the sentence vector of the candidate translated text;

a first construction subunit 1512 to construct the respective neural net language model samples corresponding to the N-gram phrases for the N-gram phrases included in the sentence to be translated based on the word vectors corresponding to the words included in the N-gram phrases, the sentence vector of the sentence to be translated and the neural net language model corresponding to the source language; and a second construction subunit 1514 to construct the respective neural net language model samples corresponding to the N-gram phrases for the N-gram phrases included in the candidate translated text based on the word vectors corresponding to the words included in the N-gram phrases, the sentence vector of the candidate translated text and the neural net language model corresponding to the target language.

In implementations, the learning subunit 1504 includes:

a calculation subunit 1516 to calculate a value of a first objective function based on the constructed neural net language model samples; and a determination subunit 1518 to determine whether the value of the first objective function is greater than a previous value of the first objective function, adopt an optimization algorithm to update the sentence vector of the sentence to be translated and the sentence vector of the candidate translated text, and return to the operation of calculating the value of the first objective function based on the constructed neural net language model samples, where the first objective function refers to a difference between a sum of a first average value and a second average value and the distance between the sentence vector of the sentence to be translated and the sentence vector of the candidate translated text, the first average value is an average value of the likelihood probabilities of the neural net language model samples corresponding to the N-gram phrases included in the sentence to be translated, and the second average value is an average value of the likelihood probabilities of the neural net language model samples corresponding to the N-gram phrases included in the candidate translated text.

In implementations, the apparatus 1200 may further include a training unit 1306 to generate the correspondence relationships between the words and the word vectors, the neural net language model corresponding to the source language and the neural net language model corresponding to the target language, as shown in FIG. 13.

Figure 16:
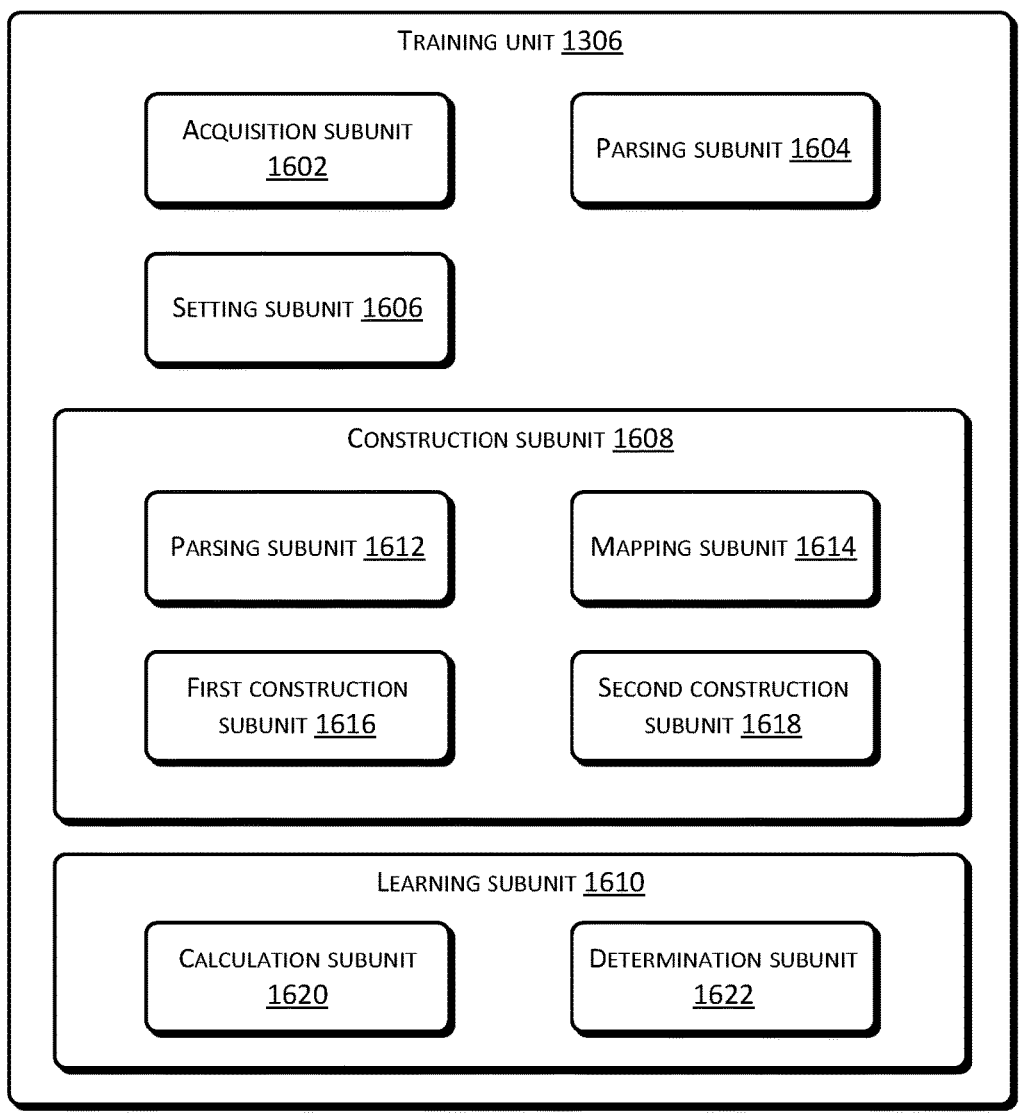
FIG. 16 is a schematic diagram of a training unit in the statistics-based machine translation apparatus according to an embodiment of the present disclosure.

FIG. 16 is a schematic diagram of the training unit 1306 of the statistics-based machine translation apparatus 1200 according to an embodiment of the present disclosure. In implementations, the training subunit 1306 may include:

an acquisition subunit 1602 to obtain a parallel corpus;

a parsing subunit 1604 to parse sentences included in the parallel corpus, and obtain words included in the parallel corpus;

a setting subunit 1606 to set word vectors for the words included in the parallel corpus in a first preset dimension to form correspondence relationships between the words and the word vectors, and randomly set sentence vectors for the sentences in a second preset dimension;

a construction subunit 1608 to construct respective neural net language model samples corresponding to N-gram phrases included in source language sentences and target language sentences for each pair of parallel corpora in the parallel corpus based on the correspondence relationships between the words and the word vectors, respective sentence vectors corresponding to the source language sentences and the target language sentences in the parallel corpora, a preset neural net language model corresponding to a source language and a preset neural net language model corresponding to a target language; and a learning subunit 1610 for learning and obtaining the correspondence relationships between the words and the word vectors, the neural net language model corresponding to the source language and the neural net language model corresponding to the target language by maximizing a sum of likelihood probabilities of the respective neural net language model samples corresponding to the N-gram phrases included in the source language sentences in the parallel corpus and a sum of likelihood probabilities of the respective neural net language model samples corresponding to the N-gram phrases included in the target language sentences in the parallel corpus while minimizing a sum of distances between sentence vectors of the source language sentences and the target language sentences of all pairs in the parallel corpus as a training goal.

In implementations, the construction subunit 1608 may include:

a parsing subunit 1612 to parse the source language sentences and the target language sentences, and obtain words included in the source language sentences and the target language sentences;

a mapping subunit 1614 to obtain respective word vectors corresponding to the words included in the source language sentences and the target language sentences based on the correspondence relationships between the words and the word vectors;

a first construction subunit 1616 construct neural net language model samples corresponding to the N-gram phrases for the N-gram phrases included in the source language sentences based on the word vectors corresponding to the words included in the N-gram phrases, sentence vectors of the source language sentences, and the neural net language model corresponding to the source language; and a second construction subunit 1618 to construct neural net language model samples corresponding to the N-gram phrases for the N-gram phrases included in the target language sentences based on the word vectors corresponding to the words included in the N-gram phrases, sentence vectors of the target language sentences, and the neural net language model corresponding to the target language.

In implementations, the learning subunit 1610 may include:

a calculation subunit 1620 to calculate a value of a second objective function based on the constructed neural net language model samples; and a determination subunit 1622 to determine whether the value of the second objective function is greater than a previous value of the second objective function, adopt an optimization algorithm to update the word vectors, the sentence vectors of the source language sentences, the sentence vectors of the target language sentences, the neural net language model corresponding to the source language and the neural net language model corresponding to the target language, and return to the operation of calculating the value of the second objective function based on the constructed neural net language model samples, where the second objective function is a difference between a sum of a third average value and a fourth average value and a sum of distances between sentence vectors of all pairs of source language sentences and target language sentences in the parallel corpus, the third average value is an average value of likelihood probabilities of respective neural net language model samples corresponding to the N-gram phrases included in the source language sentences in the parallel corpus, and the fourth average value is an average value of the likelihood probabilities of respective neural net language model samples corresponding to the N-gram phrases included in the target language sentences in the parallel corpus.

Figure 17:
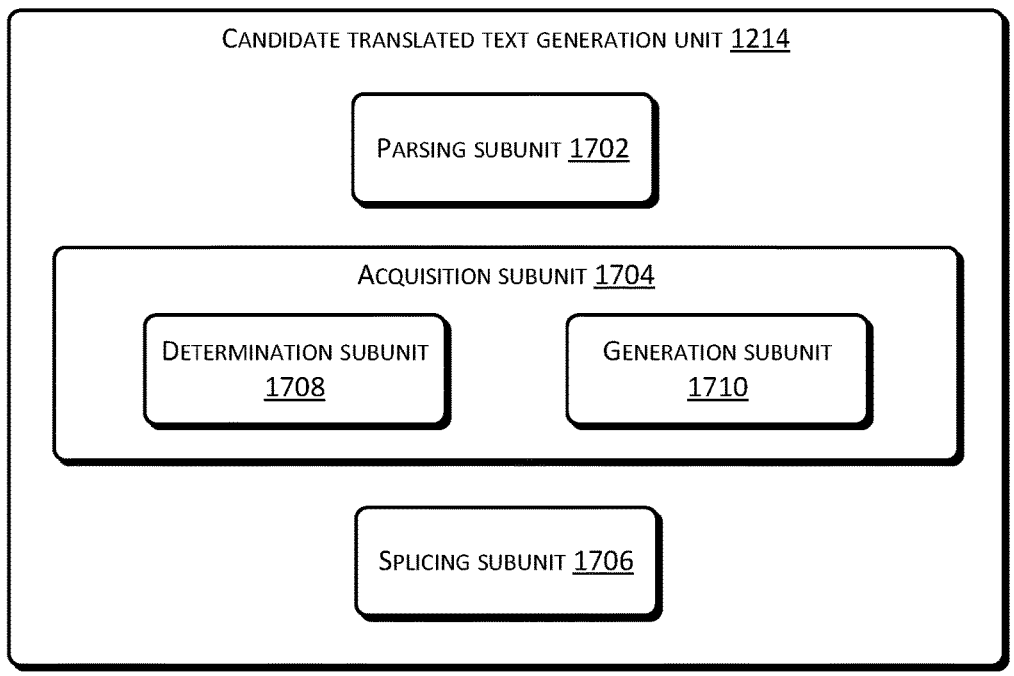
FIG. 17 is a schematic diagram of a candidate translated text generation unit in a statistics-based machine translation apparatus according to an embodiment of the present disclosure.

FIG. 17 is a schematic diagram of the candidate translated text generation unit 1214 of the statistics-based machine translation apparatus 1200 according to an embodiment of the present disclosure. In implementations, the candidate translated text generation unit 1214 may include a parsing subunit 1702 to parse a sentence to be translated, and generate substrings of the sentence to be translated; an acquisition subunit 1704 to obtain candidate translated texts of the substrings based on pre-generated translation rule(s); and a splicing subunit 1706 to combine and splice respective candidate translated texts of adjacent substrings according to positions of the substrings in the sentence to be translated to form candidate translated text(s) of the sentence to be translated.

In implementations, the acquisition subunit 1704 may include a determination subunit 1708 to determine whether a substring belongs to a respective translation rule for each translation rule; and a generation subunit 1710 to generate a candidate translated text of the substring according to the respective translation rule if affirmative.

Figure 18:
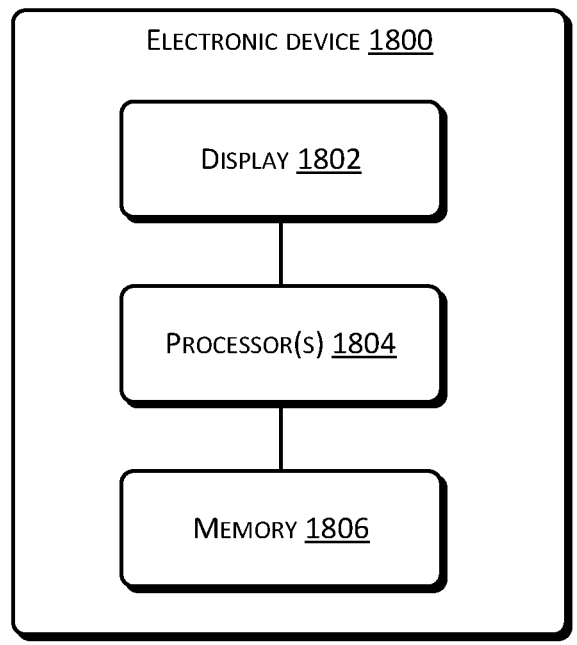
FIG. 18 is a schematic diagram of an electronic device according to an embodiment of the present disclosure.

FIG. 18 is a schematic diagram of another electronic device 1800 according to an embodiment of the present disclosure. The device embodiment is basically similar to the method embodiment, and a description thereof is relatively simple. Related parts may be obtained with reference to the description of corresponding portions in the method embodiment. The device embodiment described herein is merely schematic.

In implementations, the electronic device 1800 may include a display 1802, processor(s) 1804, and memory 1806, where the memory 1806 is used for storing a statistics-based machine translation apparatus. The statistics-based machine translation apparatus, when executed by the processor(s) 1804, performs operations including: decoding a sentence to be translated according to pre-generated translation rule(s) to generate candidate translated texts of the sentence to be translated; generating probabilities of translation from the sentence to be translated to the candidate translated texts according to features of the candidate translated texts that affect the probabilities of translation and a pre-generated translation probability prediction model, the features that affect the probabilities of translation including at least respective degrees of semantic similarity between the sentence to be translated and the candidate translated texts; and selecting a preset number of candidate translated texts having highly ranked probabilities of translation to serve as translated texts of the sentence to be translated.

The method, the apparatus and the electronic device for statistics-based machine translation, as provided in the present disclosure, generate probabilities of translation of a sentence to be translated to various candidate translated texts based on features of the candidate translated texts that affect the probabilities of translation and a pre-generated translation probability prediction model. The features that affect the probabilities of translation include at least respective degrees of semantic similarity between the sentence to be translated and the candidate translated texts. A preset number of candidate translated texts with highly ranked probabilities of translation are selected to serve as translated texts of the sentence to be translated. Accordingly, when a machine translation model is constructed, a semantic level of a natural language is investigated deeply to avoid a semantic deviation of a translated text from an original text, thereby achieving the effect of improving the quality of translation.

The present disclosure further provides a semantic similarity calculation method, which employs a vector distance between sentence vectors having semantic information of a source language sentence and a target language sentence as a degree of semantic similarity of the source language sentence and the target language sentence. Semantic information presented by a sentence vector is cross-lingual. The sentence vector has cross-lingual semantic information, so that a degree of semantic similarity between sentences in different languages can be calculated.

Figure 19A:
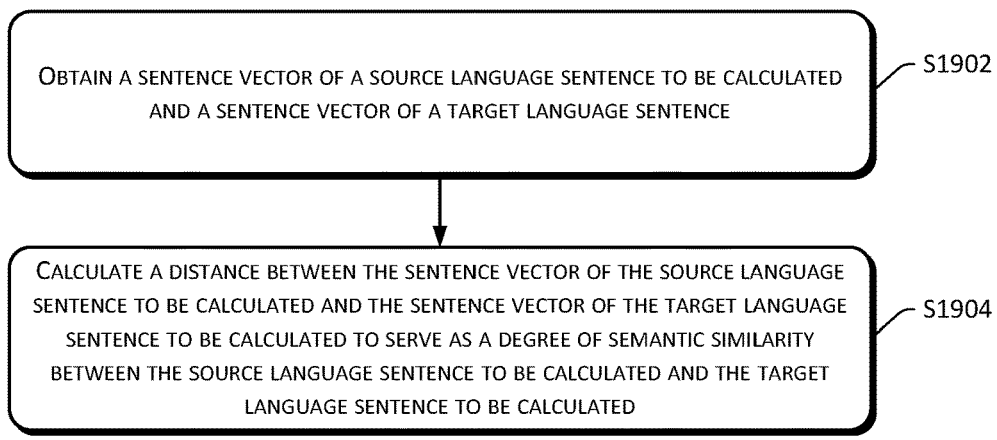

FIG. 19A is a schematic flow chart of a semantic similarity calculation method 1900 provided in an embodiment of the present disclosure. Portions of implementations that are the same as those of the first embodiment are not redundantly described herein, and may be obtained with reference to corresponding portions of the first embodiment. In implementations, the semantic similarity calculation method 1900 may include the following operations.

S1902 obtains a sentence vector of a source language sentence to be calculated and a sentence vector of a target language sentence to be calculated.

S1902 corresponds to S302 of the first embodiment. The source language sentence to be calculated in the present embodiment corresponds to the sentence to be translated in the first embodiment. The target language sentence to be calculated corresponds to the candidate translated text in the first embodiment. Identical parts of these two operations are not redundantly described herein, and related descriptions may be obtained with reference to respective portions of S302.

In implementations, the sentence vector of the source language sentence to be calculated and the sentence vector of the target language sentence to be calculated include semantic information of respective sentences.

S1904 calculates a distance between the sentence vector of the source language sentence to be calculated and the sentence vector of the target language sentence to be calculated to serve as a degree of semantic similarity between the source language sentence to be calculated and the target language sentence to be calculated.

S1904 corresponds to S304 in the first embodiment. Identical parts are not repeatedly described herein, and related descriptions may be obtained with reference to respective portions of S304.

In implementations, the sentence vector of the source language sentence to be calculated and the sentence vector of the target language sentence to be calculated are generated using the following operations as shown in FIG. 19B.

S1906 constructs respective neural net language model samples corresponding to N-gram phrases included in the source language sentence to be calculated and the target language sentence to be calculated based on pre-generated correspondence relationships between words and word vectors, a neural net language model corresponding to a source language and a neural net language model corresponding to a target language.

Figure 19C:
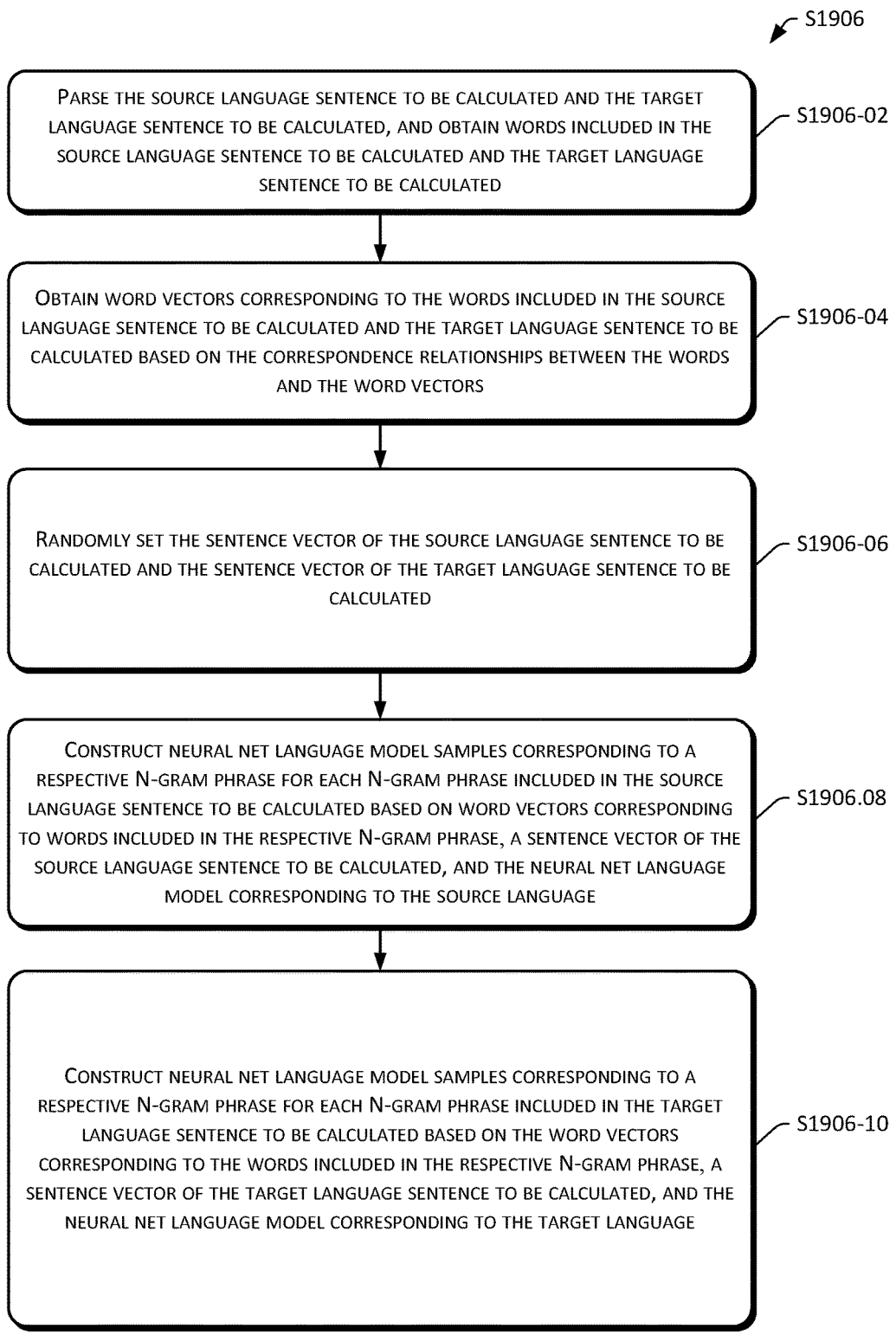

In implementations, S1906 may include the following operations as shown in FIG. 19C.

S1906-02 parses the source language sentence to be calculated and the target language sentence to be calculated, and obtains words included in the source language sentence to be calculated and the target language sentence to be calculated.

S1906-04 obtains word vectors corresponding to the words included in the source language sentence to be calculated and the target language sentence to be calculated based on the correspondence relationships between the words and the word vectors.

S1906-06 randomly sets the sentence vector of the source language sentence to be calculated and the sentence vector of the target language sentence to be calculated.

S1906-08 constructs neural net language model samples corresponding to a respective N-gram phrase for each N-gram phrase included in the source language sentence to be calculated based on word vectors corresponding to words included in the respective N-gram phrase, a sentence vector of the source language sentence to be calculated, and the neural net language model corresponding to the source language.

S1906-10 constructs neural net language model samples corresponding to a respective N-gram phrase for each N-gram phrase included in the target language sentence to be calculated based on the word vectors corresponding to the words included in the respective N-gram phrase, a sentence vector of the target language sentence to be calculated, and the neural net language model corresponding to the target language.

S1908 obtains the sentence vector of the source language sentence to be calculated and the sentence vector of the target language sentence to be calculated through learning, by maximizing a sum of likelihood probabilities of respective neural net language model samples corresponding to the N-gram phrases included in the source language sentence to be calculated and a sum of likelihood probabilities of respective neural net language model samples corresponding to the N-gram phrases included in the target language sentence to be calculated, while minimizing a distance between the sentence vector of the source language sentence to be calculated and the sentence vector of the target language sentence to be calculated as a training goal.

Figure 19D:
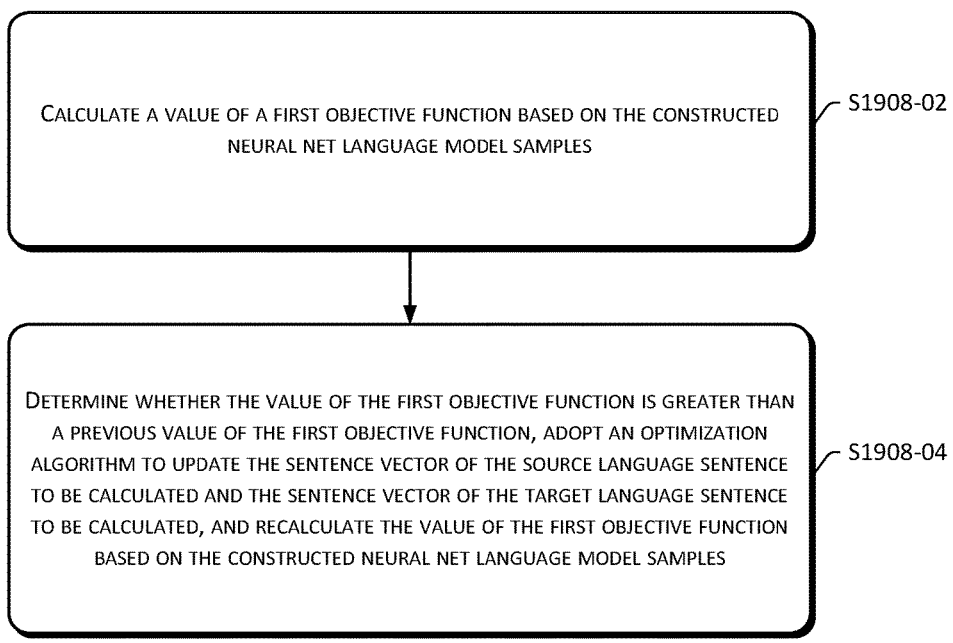

In implementations, S1908 may include the following operations as shown in FIG. 19D.

S1908-02 calculates a value of a first objective function based on the constructed neural net language model samples.

The first objective function refers to a difference between a sum of a first average value and a second average value and the distance between the sentence vector of the source language sentence to be calculated and the sentence vector of the target language sentence to be calculated. The first average value refers to an average value of the likelihood probabilities of the respective neural net language model samples corresponding to the N-gram phrases included in the source language sentence to be calculated. The second average value refers to an average value of the likelihood probabilities of the respective neural net language model samples corresponding to the N-gram phrases included in the target language sentence to be calculated.

S1908-04 determines whether the value of the first objective function is greater than a previous value of the first objective function, adopts an optimization algorithm to update the sentence vector of the source language sentence to be calculated and the sentence vector of the target language sentence to be calculated. The process returns to the operation of calculating the value of the first objective function based on the constructed neural net language model samples.

In implementations, the optimization algorithm adopts a random gradient algorithm. Adopting the optimization algorithm to update the sentence vector of the source language sentence to be calculated and the sentence vector of the to-be-calculated source sentence may include: 1) calculating gradients of the sentence vector of the source language sentence to be calculated and the sentence vector of the target language sentence to be calculated according to a preset learning rate and the first objective function; and 2) updating the sentence vector of the source language sentence to be calculated and the sentence vector of the target language sentence to be calculated based on the gradients of the source language sentence to be calculated and the sentence vector of the target language sentence to be calculated.

Figure 19E:
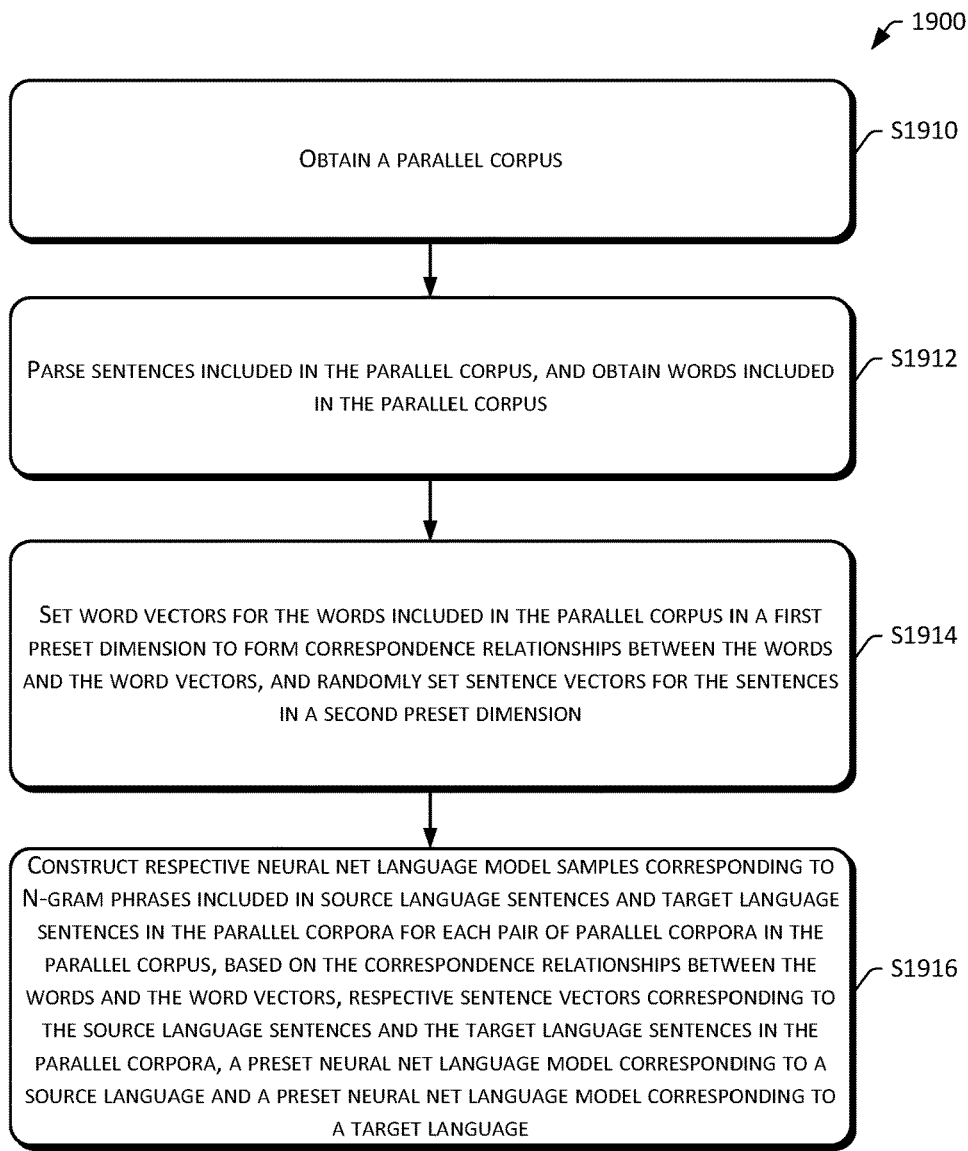

In implementations, the correspondence relationships between the words and the word vectors, the neural net language model corresponding to the source language and the neural net language model corresponding to the target language are generated using the following operations as shown in FIG. 19E.

S1910 obtains a parallel corpus.

S1912 parses sentences included in the parallel corpus, and obtains words included in the parallel corpus.

S1914 sets word vectors for the words included in the parallel corpus in a first preset dimension to form correspondence relationships between the words and the word vectors, and randomly sets sentence vectors for the sentences in a second preset dimension.

S1916 constructs respective neural net language model samples corresponding to N-gram phrases included in source language sentences and target language sentences in the parallel corpora for each pair of parallel corpora in the parallel corpus, based on the correspondence relationships between the words and the word vectors, respective sentence vectors corresponding to the source language sentences and the target language sentences in the parallel corpora, a preset neural net language model corresponding to a source language and a preset neural net language model corresponding to a target language.

Figure 19F:
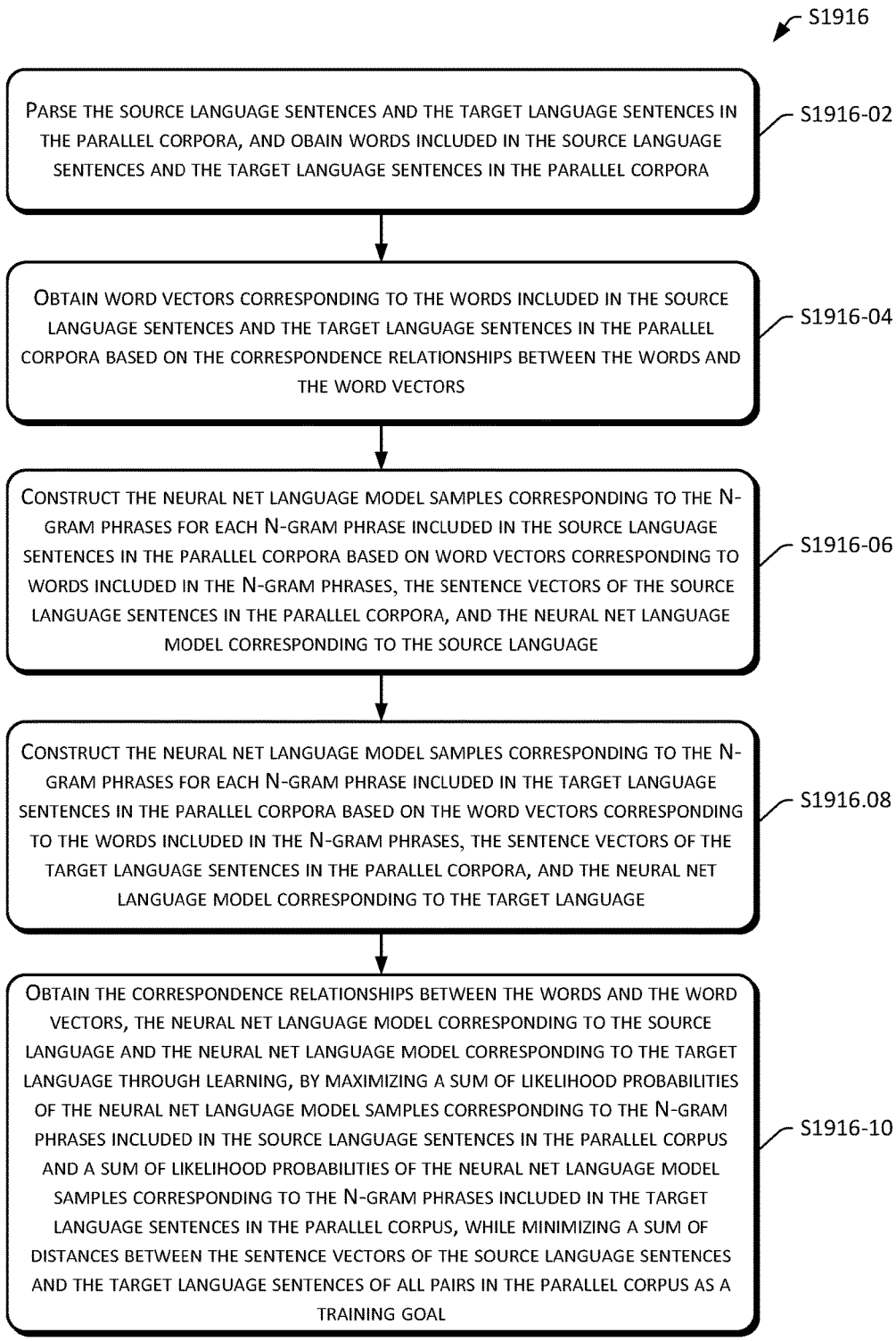

In implementations, constructing the respective neural net language model samples corresponding to the N-gram phrases included in source language sentences and the target language sentences in the parallel corpora based on the correspondence relationships between the words and the word vectors, the respective sentence vectors corresponding to the source language sentences and the target language sentences in the parallel corpora, the preset neural net language model corresponding to the source language and the preset neural net language model corresponding to the target language may include the following operations as shown in FIG. 19F.

S1916-02 parses the source language sentences and the target language sentences in the parallel corpora, and obtains words included in the source language sentences and the target language sentences in the parallel corpora.

S1916-04 obtains word vectors corresponding to the words included in the source language sentences and the target language sentences in the parallel corpora based on the correspondence relationships between the words and the word vectors.

S1916-06 constructs the neural net language model samples corresponding to the N-gram phrases for each N-gram phrase included in the source language sentences in the parallel corpora based on word vectors corresponding to words included in the N-gram phrases, the sentence vectors of the source language sentences in the parallel corpora, and the neural net language model corresponding to the source language.

S1916-08 constructs the neural net language model samples corresponding to the N-gram phrases for each N-gram phrase included in the target language sentences in the parallel corpora based on the word vectors corresponding to the words included in the N-gram phrases, the sentence vectors of the target language sentences in the parallel corpora, and the neural net language model corresponding to the target language.

S1916-10 obtains the correspondence relationships between the words and the word vectors, the neural net language model corresponding to the source language and the neural net language model corresponding to the target language through learning, by maximizing a sum of likelihood probabilities of the neural net language model samples corresponding to the N-gram phrases included in the source language sentences in the parallel corpus and a sum of likelihood probabilities of the neural net language model samples corresponding to the N-gram phrases included in the target language sentences in the parallel corpus, while minimizing a sum of distances between the sentence vectors of the source language sentences and the target language sentences of all pairs in the parallel corpus as a training goal.

Figure 19G:
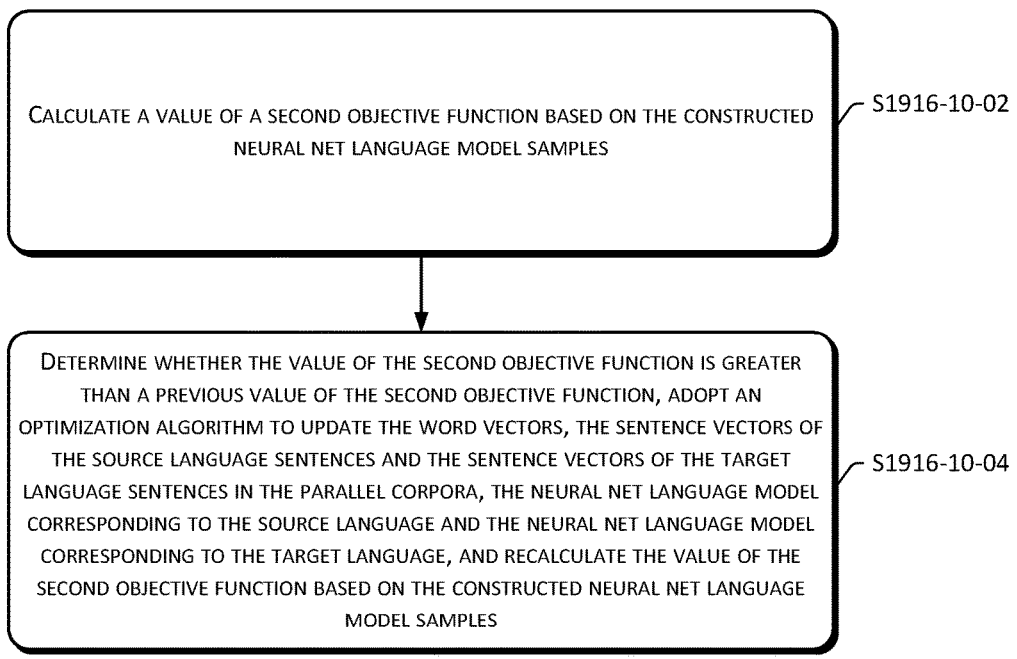

In implementations, S1916-10 may include the following operations as shown in FIG. 19G.

S1916-10-02 calculates a value of a second objective function based on the constructed neural net language model samples.

The second objective function refers to a difference between a sum of a third average value and a fourth average value and a sum of distances between the sentence vectors of the source language sentences and the target language sentences of all pairs in the parallel corpus. The third average value refers to an average value of the likelihood probabilities of the neural net language model samples corresponding to the N-gram phrases included in the source language sentences in the parallel corpus. The fourth average value refers to an average value of the likelihood probabilities of the neural net language model samples corresponding to the N-gram phrases included in the target language sentences in the parallel corpus.

S1916-10-04 determines whether the value of the second objective function is greater than a previous value of the second objective function, adopts an optimization algorithm to update the word vectors, the sentence vectors of the source language sentences and the sentence vectors of the target language sentences in the parallel corpora, the neural net language model corresponding to the source language and the neural net language model corresponding to the target language. The process returns to the operation of calculating the value of the second objective function based on the constructed neural net language model samples.

In implementations, the optimization algorithm adopts a random gradient algorithm. Adopting the optimization algorithm to update the word vectors, the sentence vectors of the source language sentences and the sentence vectors of the target language sentences in the parallel corpora, the neural net language model corresponding to the source language and the neural net language model corresponding to the target language may include: 1) calculating gradients of connection weights of the word vectors, the sentence vectors of the source language sentences and the sentence vectors of the target language sentences in the parallel corpora, and the neural net language model corresponding to the source language and the neural net language model corresponding to the target language; and 2): updating the word vectors, the sentence vectors of the source language sentences and the sentence vectors of the target language sentences in the parallel corpora, and the neural net language model corresponding to the source language and the neural net language model corresponding to the target language based on the gradients of the connection weights of the word vectors, the sentence vectors of the source language sentences and the sentence vectors of the target language sentences in the parallel corpora, and the neural net language model corresponding to the source language and the neural net language model corresponding to the target language.

In the foregoing embodiments, a semantic similarity calculation method has been provided. Correspondingly, the present disclosure further provides a semantic similarity calculation apparatus. The apparatus corresponds to the forgoing method embodiment.

Figure 20:
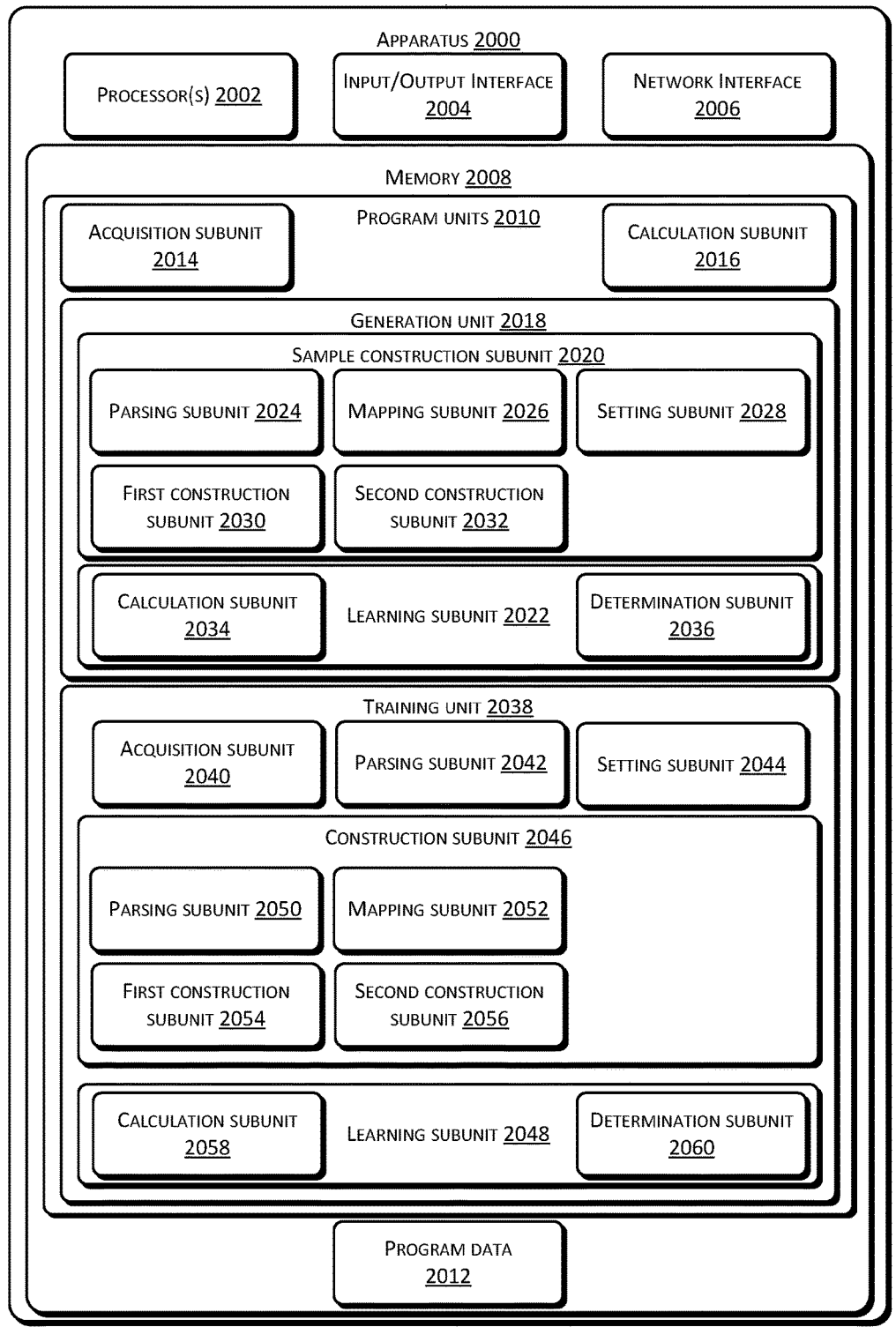
FIG. 20 is a schematic diagram of a semantic similarity calculation apparatus according to an embodiment of the present disclosure.

FIG. 20 is a schematic diagram of a semantic similarity calculation apparatus 2000 according to an embodiment of the present disclosure. The apparatus embodiment is basically similar to the method embodiment, and so a description thereof is relatively simple. Related parts may be obtained with reference to the description of corresponding portions in the method embodiment. The apparatus embodiment described herein is merely schematic.

In implementations, the semantic similarity calculation apparatus 2000 may include one or more computing devices. By way of example and not limitations, the apparatus 2000 may include one or more processors 2002, an input/output (I/O) interface 2004, a network interface 2006 and memory 2008.

The memory 2008 may include a form of computer-readable media, e.g., a non-permanent storage device, random-access memory (RAM) and/or a nonvolatile internal storage, such as read-only memory (ROM) or flash RAM. The memory 2008 is an example of computer-readable media as described in the foregoing description.

In implementations, the memory 2008 may include program units 2010 and program data 2012. The program units 2010 may include an acquisition unit 2014 to obtain a sentence vector of a source language sentence to be calculated, and a sentence vector of a target language sentence to be calculated; and a calculation subunit 2016 to calculate a distance between the sentence vector of the source language sentence to be calculated and the sentence vector of the target language sentence to be calculated, for serving as a degree of semantic similarity of the source language sentence to be calculated and the target language sentence to be calculated, where the sentence vector of the source language sentence to be calculated and the sentence vector of the target language sentence to be calculated include semantic information of respective sentences.

In implementations, the apparatus 2000 may further include a sentence vector generation unit 2018 to generate the sentence vector of the source language sentence to be calculated and the sentence vector of the target language sentence to be calculated.

In implementations, the sentence vector generation unit 2018 may include a sample construction subunit 2020 to construct respective neural net language model samples corresponding to N-gram phrases included in the source language sentence to be calculated and the target language sentence to be calculated based on pre-generated correspondence relationships between words and word vectors, a neural net language model corresponding to a source language and a neural net language model corresponding to a target language; a learning subunit 2022 to learn and obtain the sentence vector of the source language sentence to be calculated and the sentence vector of the target language sentence to be calculated by maximizing a sum of likelihood probabilities of the neural net language model samples corresponding to the N-gram phrases included in the source language sentence to be calculated and a sum of likelihood probabilities of the neural net language model samples corresponding to the N-gram phrases included in the target language sentence to be calculated, while minimizing the distance between the sentence vector of the source language sentence to be calculated and the sentence vector of the target language sentence to be calculated as a training goal, where an input layer of the neural net language model includes sentence vectors corresponding to respective sentences where the N-gram phrases are located.

In implementations, the sample construction subunit 2020 may include:

a parsing subunit 2024 to parse the source language sentence to be calculated and the target language sentence to be calculated, and obtain words included in the source language sentence to be calculated and the target language sentence to be calculated;

a mapping subunit 2026 to obtain word vectors corresponding to the words included in the source language sentence to be calculated and the target language sentence to be calculated based on the correspondence relationships between the words and the word vectors;

a setting subunit 2028 to randomly set the sentence vector of the source language sentence to be calculated and the sentence vector of the target language sentence to be calculated;

a first construction subunit 2030 to construct the neural net language model samples corresponding to the N-gram phrases for each N-gram phrase included in the source language sentence to be calculated based on word vectors corresponding to words included in the N-gram phrases, the sentence vector of the source language sentence to be calculated, and the neural net language model corresponding to the source language; and a second construction subunit 2032 to construct the neural net language model samples corresponding to the N-gram phrases for each N-gram phrase included in the target language sentence to be calculated based on the word vectors corresponding to the words included in the N-gram phrases, the sentence vector of the target language sentence to be calculated, and the neural net language model corresponding to the target language.

In implementations, the learning subunit 2022 may include:
- a calculation subunit 2034 to calculate a value of a first objective function based on the constructed neural net language model samples; and
- a determination subunit 2036 to determine whether the value of the first objective function is greater than a previous value of the first objective function, adopt an optimization algorithm to update the sentence vector of the source language sentence to be calculated and the sentence vector of the target language sentence to be calculated, and return to calculating the value of the first objective function based on the constructed neural net language model samples, wherein the first objective function is a difference between a sum of a first average value and a second average value and the distance between the sentence vector of the source language sentence to be calculated and the sentence vector of the target language sentence to be calculated, the first average value is an average value of the likelihood probabilities of the neural net language model samples corresponding to the N-gram phrases included in the source language sentence to be calculated, and the second average value is an average value of the likelihood probabilities of the neural net language model samples corresponding to the N-gram phrases included in the target language sentence to be calculated.

In implementations, the apparatus 2000 may further include a training unit 2038 to generate the correspondence relationships between the words and the word vectors, the neural net language model corresponding to the source language and the neural net language model corresponding to the target language.

In implementations, the training unit 2038 may include:
- an acquisition subunit 2040 to obtain a parallel corpus;
- a parsing subunit 2042 to parse sentences included in the parallel corpus, and obtain words included in the parallel corpus;
- a setting subunit 2044 to set word vectors for the words included in the parallel corpus in a first preset dimension to form the correspondence relationships between the words and the word vectors, and randomly set sentence vectors for the sentences in a second preset dimension;
- a construction subunit 2046 to construct respective neural net language model samples corresponding to N-gram phrases included in source language sentences and target language sentences in the parallel corpora for each pair of parallel corpora in the parallel corpus based on the correspondence relationships between the words and the word vectors, respective sentence vectors corresponding to the source language sentences and target language sentences in the parallel corpora, the preset neural net language model corresponding to the source language and the preset neural net language model corresponding to the target language; and
- a learning subunit 2048 to learn and obtain the correspondence relationships between the words and the word vectors, the neural net language model corresponding to the source language and the neural net language model corresponding to the target language, by maximizing a sum of likelihood probabilities of the respective neural net language model samples corresponding to the N-gram phrases included in the source language sentences in the parallel corpus and a sum of likelihood probabilities of the respective neural net language model samples corresponding to the N-gram phrases included in the target language sentences in the parallel corpus, while minimizing a sum of distances between sentence vectors of all pairs of source language sentences and target language sentences in the parallel corpus as a training goal.

In implementations, the construction subunit 2046 may include:
- a parsing subunit 2050 to parse the source language sentences and the target language sentences in the parallel corpora, and obtain the words included in the source language sentences and the target language sentences in the parallel corpora;
- a mapping subunit 2052 to obtain the word vectors corresponding to the words included in the source language sentences and the target language sentences in the parallel corpora based on the correspondence relationships between the words and the word vectors;
- a first construction subunit 2054 to construct the neural net language model samples corresponding to the N-gram phrases for each N-gram phrase included in the source language sentences in the parallel corpora based on the word vectors corresponding to the words included in the N-gram phrases, the sentence vectors of the source language sentences in the parallel corpora, and the neural net language model corresponding to the source language; and
- a second construction subunit 2056 to construct the neural net language model samples corresponding to the N-gram phrases for each N-gram phrase included in the target language sentences in the parallel corpora based on the word vectors corresponding to the words included in the N-gram phrases, the sentence vectors of the target language sentences in the parallel corpora, and the neural net language model corresponding to the target language.

In implementations, the learning subunit 2048 may include:
- a calculation subunit 2058 to calculate a value of a second objective function based on the constructed neural net language model samples; and
- a determination subunit 2060 to determine whether the value of the second objective function is greater than a previous value of the second objective function, adopt an optimization algorithm to update the word vectors, the sentence vectors of the source language sentences, the sentence vectors of the target language sentences in the parallel corpora, the neural net language model corresponding to the source language and the neural net language model corresponding to the target language, and repeat the calculating of the value of the second objective function based on the constructed neural net language model samples, where the second objective function is a difference between a sum of a third average value and a fourth average value and a sum of distances between sentence vectors of all pairs of source language sentences and target language sentences in the parallel corpus, the third average value is an average value of the likelihood probabilities of the respective neural net language model samples corresponding to the N-gram phrases included in the source language sentences in the parallel corpus, and the fourth average value is an average value of the likelihood probabilities of the respective neural net language model samples corresponding to the N-gram phrases included in the target language sentences in the parallel corpus.

Figure 21:
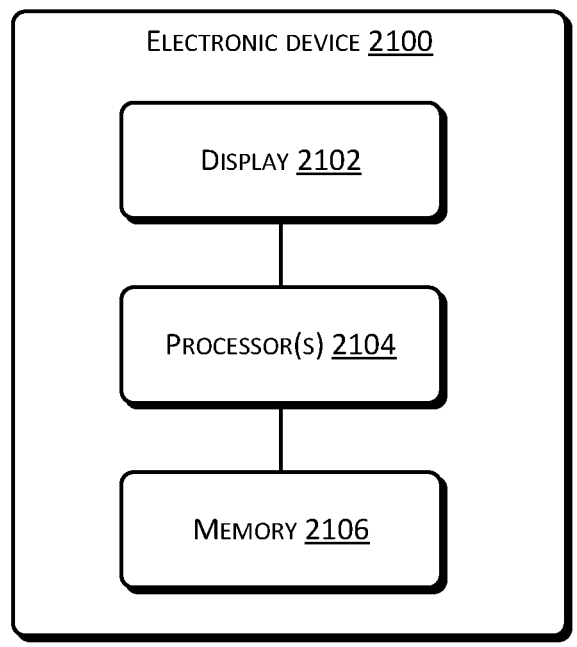
FIG. 21 is a schematic diagram of another electronic device according to an embodiment of the present disclosure.

FIG. 21 is a schematic diagram of another electronic device 2100 according to an embodiment of the present disclosure. The device embodiment is basically similar to the method embodiment, and so a description thereof is relatively brief. Related parts may be obtained with reference to the description of relevant portions in the method embodiment. The device embodiment described herein is merely schematic.

In implementations, the electronic device 2100 may include a display 2102, processor(s) 2104, and memory 2106 storing a semantic similarity calculation apparatus. The semantic similarity calculation apparatus, when executed by the processor(s) 2104, performs operations which include obtaining a sentence vector of a source language sentence to be calculated and a sentence vector of a target language sentence to be calculated; and calculating a distance between the sentence vector of the source language sentence to be calculated and the sentence vector of the target language sentence to be calculated for serving as a degree of semantic similarity between the source language sentence to be calculated and the target language sentence to be calculated, wherein the sentence vector of the source language sentence to be calculated and the sentence vector of the target language sentence to be calculated include semantic information of corresponding sentences.

The semantic similarity calculation method, apparatus and electronic device provided in the present disclosure can calculate a degree of semantic similarity between sentences in different languages. By obtaining a sentence vector of a source language sentence to be calculated and a sentence vector of a target language sentence to be calculated, a distance between the sentence vector of the source language sentence to be calculated and the sentence vector of the target language sentence to be calculated is obtained for serving as a degree of semantic similarity between the source language sentence to be calculated and the target language sentence to be calculated. The sentence vector of the source language sentence to be calculated and the sentence vector of the target language sentence to be calculated include semantic information of corresponding sentences.

The present disclosure further provides a word quantization method. A first example word quantization method is introduced as follows.

A neural net language model may convert basic components "words" of a natural language into a form of mathematical representations, which are more applicable for machine learning, i.e., word vectors. Word vectors can effectively extract semantic information between natural languages. Therefore, the greatest advantage of the word vector is computability. If all word vectors are put together to form a vector space with each vector being a point in the space, a degree of semantic similarity between words may be determined according to a "geometric distance" between corresponding points. For example, after a neural net language model is trained, Chinese words "话筒" and "麦克风" can generate corresponding real vectors in K dimensions, e.g., "话筒"=>[0.123534, −0.34155, 0.256654, . . . , 0.64324], "麦克风"=>[0.120354, −0.34901, 0.256934, . . . , 0.643463]. As can be seen, a geometrical distance between these two word vectors in a vector space is very small.

Currently, a most popular neural net language model in this field is a Word2Vec model that is proposed by Google®. This model constructs a neural net language model for texts, and dedicates to generate vectors for the most basic units "words" of a natural language. In brief, the model constructs a same feed-forward three-layer neural net for each N-gram language model sample. Input layer variables are (N−1) words in a preceding part of an associated text. Each word is represented by a K-dimensional vector, and these (N−1) word vectors are spliced and projected into a hidden layer of the net, and an output layer corresponds to prediction probabilities associated with tail words of the N-gram language model.

Existing neural net language models merely focus on generating word vectors in a single language, and therefore cannot perform learning of cross-lingual semantic knowledge. Accordingly, existing technologies have a problem that semantic information represented by generated word vectors is merely applicable to synonyms in the same language, and cannot be applicable to cross-lingual inter-translated words.

The present disclosure provides a word quantization method. An idea thereof includes constructing a cross-lingual neural net language model based on parallel corpora, an input layer of the model including sentence vectors corresponding to sentences where N-gram language model samples are located, and word vectors being obtained through learning by maximizing a sum of likelihood probabilities of respective neural net language model samples corresponding to the N-gram phrases included in source language sentences in the parallel corpora and a sum of likelihood probabilities of respective neural net language model samples corresponding to the N-gram phrases included in target language sentences in the parallel corpora, while minimizing a sum of distances between sentence vectors of all pairs of source language sentences and target language sentences in the parallel corpora as a training goal. Word vectors of first (N−1) words in the context of an N-gram phrase and a sentence vector corresponding to a sentence where the N-gram phrase is located are integrated to serve as a context background to predict a next word by fully utilizing information of the sentence where the N-gram phrase is located. Accordingly, word vectors learned therefrom are rich in bi-lingual semantic knowledge.

Figure 22:
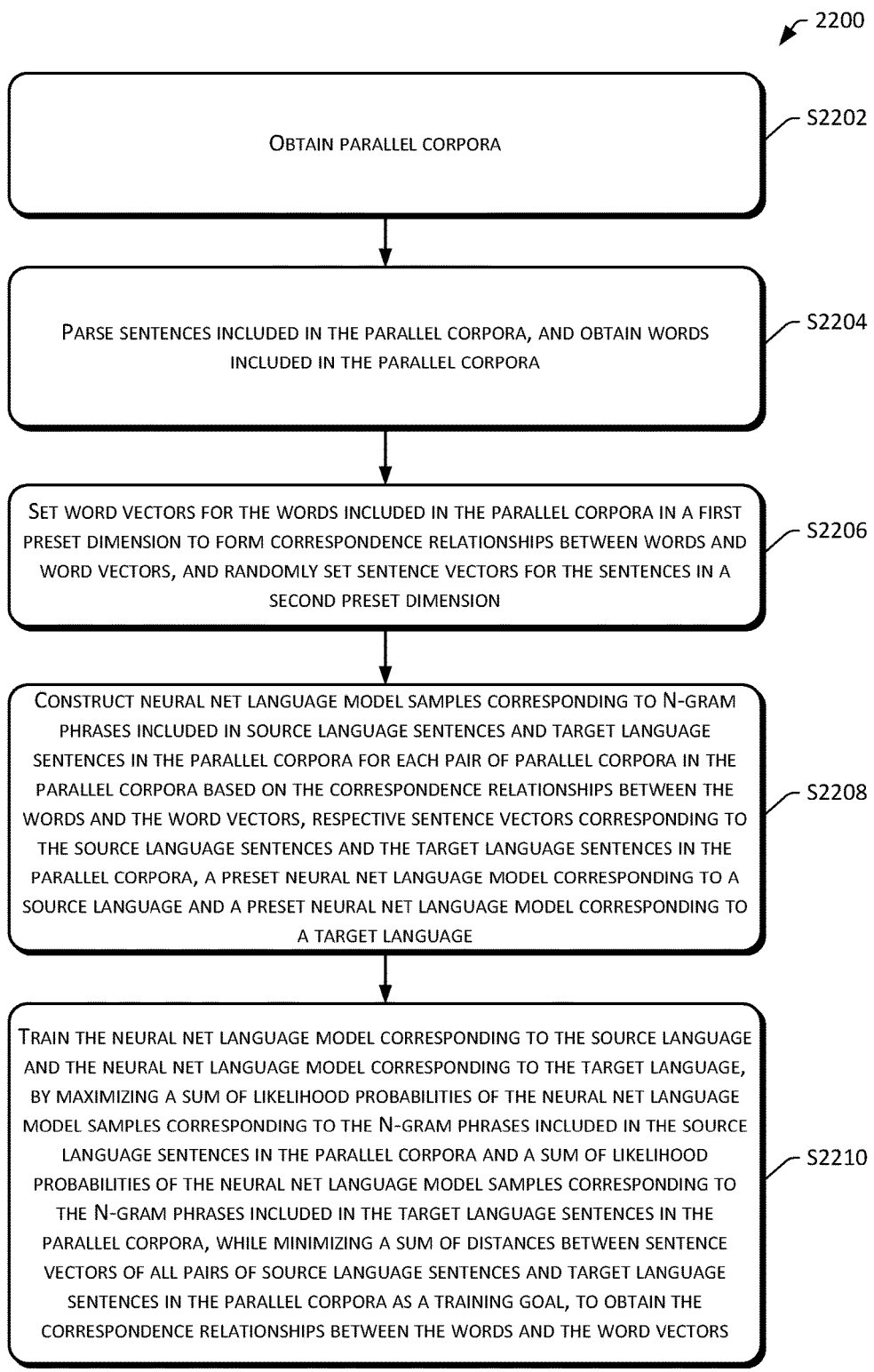
FIG. 22 is a flow chart of a word quantization method according to an embodiment of the present disclosure.

FIG. 22 is a schematic flowchart of a word quantization method 2200 according to an embodiment of the present disclosure. Portions of implementations that are the same as those of the foregoing embodiments are not repeatedly described herein, and the following description focuses on differences. In implementations, the word quantization method 2200 may include the following operations.

S2202 obtains parallel corpora.

S2202 corresponds to S502 in the first embodiment. Identical parts thereof are not repeatedly described herein. Related descriptions may be obtained with reference to respective parts of S502.

S2204 parses sentences included in the parallel corpora, and obtains words included in the parallel corpora.

S2204 corresponds to S502 in the first embodiment. Identical parts thereof are not repeatedly described herein. Related descriptions may be obtained with reference to respective parts of S502.

S2206 sets word vectors for the words included in the parallel corpora in a first preset dimension to form correspondence relationships between words and word vectors, and randomly sets sentence vectors for the sentences in a second preset dimension.

S2206 corresponds to S506 in the first embodiment. Identical parts thereof are not repeatedly described herein. Related descriptions may be obtained with reference to respective parts of S506.

S2208 constructs neural net language model samples corresponding to N-gram phrases included in source language sentences and target language sentences in the parallel corpora for each pair of parallel corpora in the parallel corpora based on the correspondence relationships between the words and the word vectors, respective sentence vectors corresponding to the source language sentences and the target language sentences in the parallel corpora, a preset neural net language model corresponding to a source language and a preset neural net language model corresponding to a target language.

S2208 corresponds to S508 in the first embodiment. Identical parts thereof are not repeatedly described herein. Related descriptions may be obtained with reference to respective parts of S508.

In implementations, constructing the neural net language model samples corresponding to the N-gram phrases included in source language sentences and the target language sentences in the parallel corpora based on the correspondence relationships between the words and the word vectors, the respective sentence vectors corresponding to the source language sentences and the target language sentences in the parallel corpora, the preset neural net language model corresponding to the source language and the preset neural net language model corresponding to the target language, may include:

parsing the source language sentences and the target language sentences in the parallel corpora, and obtaining words included in the source language sentences and the target language sentences in the parallel corpora;

obtaining word vectors corresponding to the words included in the source language sentences and the target language sentences in the parallel corpora based on the correspondence relationships between the words and the word vectors;

constructing the neural net language model samples corresponding to the N-gram phrases for each N-gram phrase included in the source language sentences in the parallel corpora based on word vectors corresponding to words included in the N-gram phrases, the sentence vectors of the source language sentences in the parallel corpora, and the neural net language model corresponding to the source language; and constructing the neural net language model samples corresponding to the N-gram phrases for each N-gram phrase included in the target language sentences in the parallel corpora based on the word vectors corresponding to the words included in the N-gram phrases, the sentence vectors of the target language sentences in the parallel corpora, and the neural net language model corresponding to the target language.

S2210 trains the neural net language model corresponding to the source language and the neural net language model corresponding to the target language, by maximizing a sum of likelihood probabilities of the neural net language model samples corresponding to the N-gram phrases included in the source language sentences in the parallel corpora and a sum of likelihood probabilities of the neural net language model samples corresponding to the N-gram phrases included in the target language sentences in the parallel corpora, while minimizing a sum of distances between sentence vectors of all pairs of source language sentences and target language sentences in the parallel corpora as a training goal, to obtain the correspondence relationships between the words and the word vectors.

S2210 corresponds to S510 in the first embodiment. Identical parts thereof are not repeatedly described herein. Related descriptions may be obtained with reference to respective parts of S510.

In implementations, S2210 may include the following operations.

calculating a value of a second objective function based on the constructed neural net language model samples; and determining whether the value of the second objective function is greater than a previous value of the second objective function, adopting an optimization algorithm to update the word vectors, the sentence vectors of the source language sentences and the sentence vectors of the target language sentences in the parallel corpora, and the neural net language model corresponding to the source language and the neural net language model corresponding to the target language, and returning to the operation of calculating the value of the second objective function based on the constructed neural net language model samples, where the second objective function includes a difference between a sum of a third average value and a fourth average value and the sum of distances between the sentence vectors of all the pairs of source language sentences and target language sentences in the parallel corpora, the third average value includes an average value of the likelihood probabilities of the neural net language model samples corresponding to the N-gram phrases included in the source language sentences in the parallel corpora, and the fourth average value includes an average value of the likelihood probabilities of the neural net language model samples corresponding to the N-gram phrases included in the target language sentences in the parallel corpora.

In implementations, the optimization algorithm adopts a random gradient algorithm. Adopting the optimization algorithm to update the word vectors, the sentence vectors of the source language sentences and the sentence vectors of the target language sentences in the parallel corpora, and the neural net language model corresponding to the source language and the neural net language model corresponding to the target language may include: 1) calculating gradients of connection weights of the word vectors, the sentence vectors of the source language sentences, the sentence vectors of the target language sentences in the parallel corpora, the neural net language model corresponding to the source language and the neural net language model corresponding to the target language; and 2): updating the word vectors, the sentence vectors of the source language sentences, the sentence vectors of the target language sentences in the parallel corpora, the neural net language model corresponding to the source language and the neural net language model corresponding to the target language based on the gradients of the connection weights of the word vectors, the sentence vectors of the source language sentences, the sentence vectors of the target language sentences in the parallel corpora, the neural net language model corresponding to the source language and the neural net language model corresponding to the target language.

It is noted that the embodiments of the present disclosure further provides an exemplary word quantization method. A neural net language model trained in this method has the following characteristics: 1) using a three-layer feed-forward neural net algorithm language model; 2) connection weights from an input layer to a hidden layer of the neural net language model being all the same, and connection weights from the input layer to an output layer being zeros; and 3) an excitation function of the hidden layer of the neural net language model being a linear function, and specifically, a vector value of the hidden layer being a sum average value of vector values of the input layer. The training of the neural net language model having the above characteristics merely needs hours of time to finish learning data of the order of tens of million. However, the training time of large-scale parallel corpora for the neural net language model trained when learning word vectors in existing technologies generally take days. As can be seen, the effect of improving the efficiency of learning can be achieved using the optimization method.

In the foregoing embodiments, a word quantization method is provided. Correspondingly, the present disclosure further provides a word quantization apparatus. The apparatus corresponds to the above method embodiment.

Figure 23:
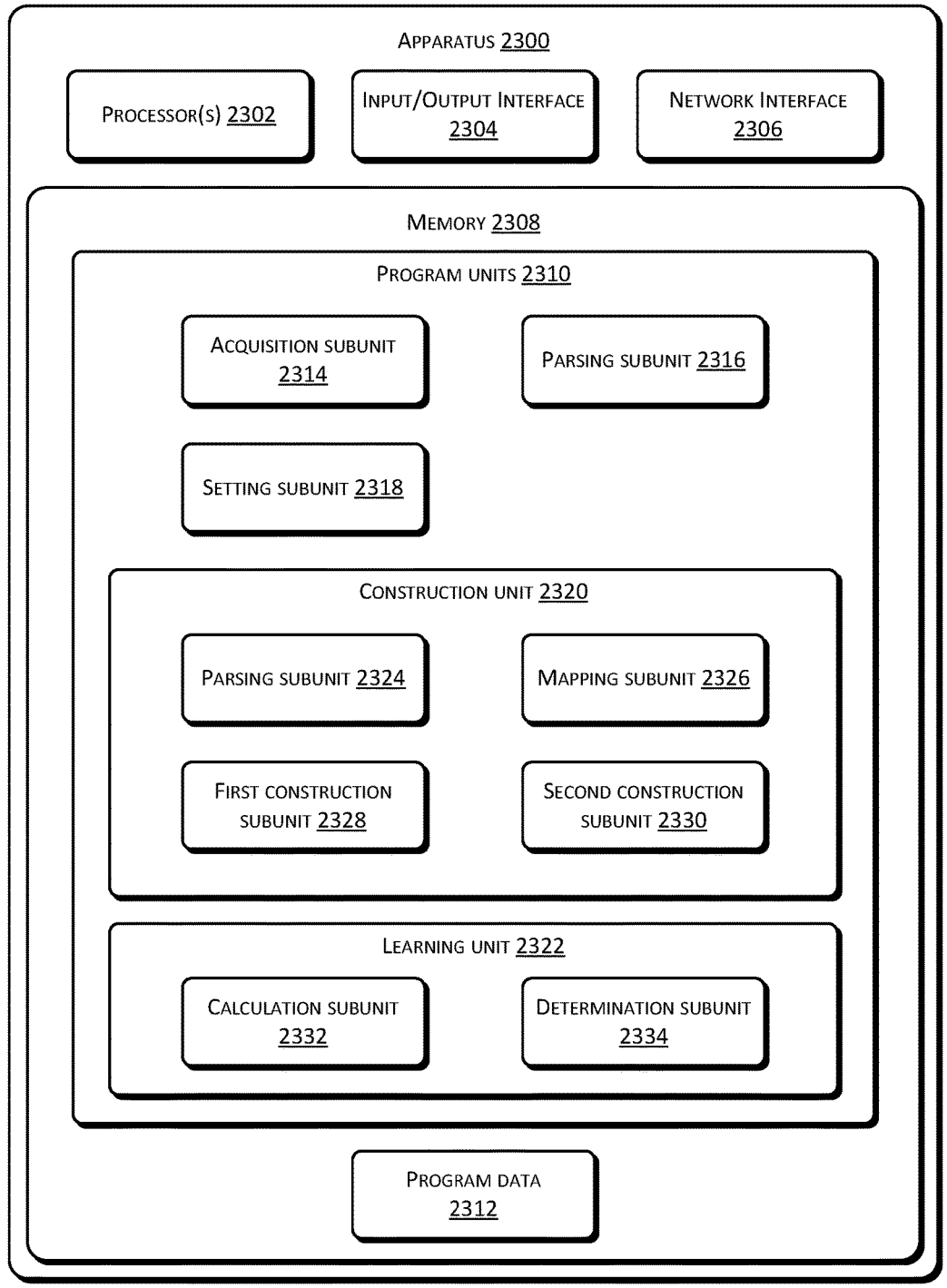
FIG. 23 is a schematic diagram of a word quantization apparatus according to an embodiment of the present disclosure.

FIG. 23 is a schematic diagram of a word quantization apparatus 2300 according to an embodiment of the present disclosure. The apparatus embodiment is basically similar to the method embodiment, and so a description thereof is relatively simple. Related parts may be obtained with reference to the description of relevant parts in the method embodiment. The apparatus embodiment described herein is merely schematic.

In implementations, the word quantization apparatus 2300 may include one or more computing devices. By way of example and not limitations, the apparatus 2300 may include one or more processors 2302, an input/output (I/O) interface 2304, a network interface 2306 and memory 2308.

The memory 2308 may include a form of computer-readable media, e.g., a non-permanent storage device, random-access memory (RAM) and/or a nonvolatile internal storage, such as read-only memory (ROM) or flash RAM. The memory 2308 is an example of computer-readable media as described in the foregoing description.

In implementations, the memory 2308 may include program units 2310 and program data 2312. The program units 2310 may include an acquisition unit 2314 to obtain parallel corpora; a parsing unit 2316 to parse sentences included in the parallel corpora and obtain words included in the parallel corpora; a setting unit 2318 to set word vectors for the words included in the parallel corpora in a first preset dimension to form correspondence relationships between the words and the word vectors and randomly set sentence vectors for the sentences in a second preset dimension; a construction unit 2320 to construct neural net language model samples corresponding to N-gram phrases included in source language sentences and target language sentences in the parallel corpora for each pair of parallel corpora in the parallel corpora the correspondence relationships between the words and the word vectors, sentence vectors corresponding to the source language sentences and the target language sentences in the parallel corpora, a preset neural net language model corresponding to a source language and a preset neural net language model corresponding to a target language; and a learning unit 2322 to train the neural net language model corresponding to the source language and the neural net language model corresponding to the target language by maximizing a sum of likelihood probabilities of respective neural net language model samples corresponding to the N-gram phrases included in the source language sentences in the parallel corpora and a sum of likelihood probabilities of respective neural net language model samples corresponding to the N-gram phrases included in the target language sentences in the parallel corpora, while minimizing a sum of distances between respective sentence vectors of all pairs of source language sentences and target language sentences in the parallel corpora as a training goal to obtain the correspondence relationships between the words and the word vectors, where an input layer of the neural net language model includes sentence vectors corresponding to sentences where the N-gram phrases are located.

In implementations, the construction unit 2320 may include:
a parsing subunit 2324 to parse the source language sentences and the target language sentences in the parallel corpora, and obtain words included in the source language sentences and the target language sentences in the parallel corpora;
a mapping subunit 2326 to obtain the word vectors corresponding to the words included in the source language sentences and the target language sentences in the parallel corpora based on the correspondence relationships between the words and the word vectors;
a first construction subunit 2328 to construct the respective neural net language model samples corresponding to the N-gram phrases for each N-gram phrase included in the source language sentences in the parallel corpora based on the word vectors corresponding to the words included in the N-gram phrases, the sentence vectors of the source language sentences in the parallel corpora, and the neural net language model corresponding to the source language; and
a second construction subunit 2330 to construct the respective neural net language model samples corresponding to the N-gram phrases for each N-gram phrase included in the target language sentences in the parallel corpora based on the word vectors corresponding to the words included in the N-gram phrases, the sentence vectors of the target language sentences in the parallel corpora, and the neural net language model corresponding to the target language.

In implementations, the learning unit 2322 may include:
a calculation subunit 2332 to calculate a value of a second objective function based on the constructed neural net language model samples; and
a determination subunit 2334 to determine whether the value of the second objective function is greater than a previous value of the second objective function, adopt an optimization algorithm to update the word vectors, the sentence vectors of the source language sentences and the sentence vectors of the target language sentences in the parallel corpora, the neural net language model corresponding to the source language and the neural net language model corresponding to the target language, and repeat calculating the value of the second objective function based on the constructed neural net language model samples, where the second objective function includes a difference between a sum of a third average value and a fourth average value and the sum of distances between the respective sentence vectors of all the pairs of source language sentences and target language sentences in the parallel corpora, the third average value includes an average value of the likelihood probabilities of the respective neural net language model samples corresponding to the N-gram phrases included in the source language sentences in the parallel corpora, and the fourth average value includes an average value of the likelihood probabilities of the respective neural net language model samples corresponding to the N-gram phrases included in the target language sentences in the parallel corpora.

Figure 24:
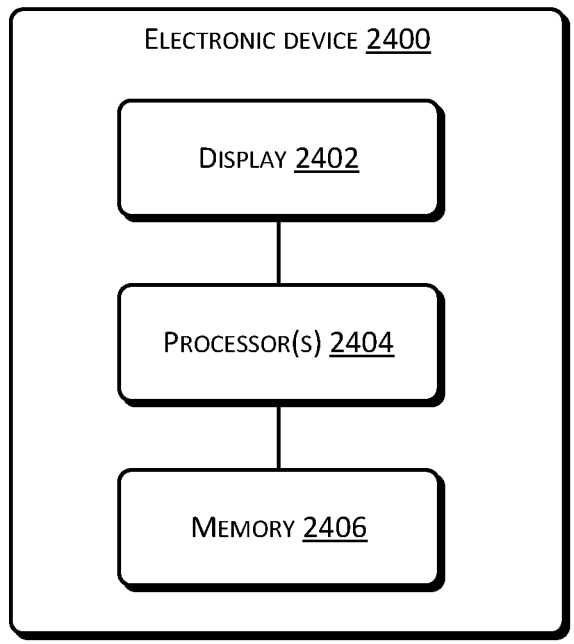
FIG. 24 is a schematic diagram of still another electronic device according to an embodiment of the present disclosure.

FIG. 24 is a schematic diagram of still another electronic device 2400 according to an embodiment of the present disclosure. The device embodiment is basically similar to the method embodiment, and so a description thereof is relatively brief. Related parts may be obtained with reference to the description of corresponding portions in the method embodiment. The device embodiment described herein is merely schematic.

In implementations, the electronic device 2400 may include a display 2402, processor(s) 2404 and memory 2406 for storing a word quantization apparatus. The word quantization apparatus, when executed by the processor(s) 2404, performs operations which include obtaining a parallel corpus; parsing sentences included in the parallel corpus, and obtaining all words included in the parallel corpus; setting word vectors for the words included in the parallel corpus in a first preset dimension to form correspondence relationships between the words and the word vectors; and randomly setting sentence vectors for the sentences in a second preset dimension; constructing neural net language model samples corresponding to N-gram phrases included in source language sentences and target language sentences in the parallel corpus for each pair of parallel corpora in the parallel corpus based on the correspondence relationships between the words and the word vectors, respective sentence vectors corresponding to the source language sentences and target language sentences in the parallel corpus, a preset neural net language model corresponding to a source language and a preset neural net language model corresponding to a target language; and training the neural net language model corresponding to the source language and the neural net language model corresponding to the target language to obtain the correspondence relationships between the words and the word vectors, by maximizing a sum of likelihood probabilities of the neural net language model samples corresponding to the N-gram phrases included in the source language sentences in the parallel corpus and a sum of likelihood probabilities of the neural net language model samples corresponding to the N-gram phrases included in the target language sentences in the parallel corpus, while minimizing a sum of distances between sentence vectors of all pairs of source language sentences and target language sentences in the parallel corpus as a training goal, where an input layer of the neural net language model includes sentence vectors corresponding to sentences where the N-gram phrases are located.

The word quantization method, apparatus and electronic apparatus provided in the present disclosure enable semantic information in generated work vectors to be applicable to cross-lingual inter-translated words by obtaining a parallel corpus; parsing sentences included in the parallel corpus, and obtaining all words included in the parallel corpus; setting word vectors for the words included in the parallel corpus in a first preset dimension to form correspondence relationships between the words and the word vectors; and randomly setting sentence vectors for the sentences in a second preset dimension; constructing neural net language model samples corresponding to N-gram phrases included in source language sentences and target language sentences in the parallel corpus for each pair of parallel corpora in the parallel corpus based on the correspondence relationships between the words and the word vectors, respective sentence vectors corresponding to the source language sentences and target language sentences in the parallel corpus, a preset neural net language model corresponding to a source language and a preset neural net language model corresponding to a target language; and training the neural net language model corresponding to the source language and the neural net language model corresponding to the target language to obtain the correspondence relationships between the words and the word vectors, by maximizing a sum of likelihood probabilities of the neural net language model samples corresponding to the N-gram phrases included in the source language sentences in the parallel corpus and a sum of likelihood probabilities of the neural net language model samples corresponding to the N-gram phrases included in the target language sentences in the parallel corpus, while minimizing a sum of distances between sentence vectors of all pairs of source language sentences and target language sentences in the parallel corpus as a training goal, where an input layer of the neural net language model includes sentence vectors corresponding to sentences where the N-gram phrases are located.

The present disclosure is described using exemplary embodiments in the foregoing description. These embodiments are not intended to limit the present disclosure. One skilled in the art can make possible variations and modifications without departing from the spirit and scope of the present disclosure. Therefore, the scope of protection of the present disclosure should subject to the scope defined by the appended claims of the present disclosure.

One skilled in the art should understand that the embodiments of the present disclosure may be provided as a method, a system, or a computer program product. Therefore, the present disclosure may be implemented as a completely hardware embodiment, a completely software embodiment, or an embodiment that is a combination of software and hardware. Moreover, the present disclosure may be a computer program product implemented on one or more computer usable storage media (including, but not limited to, a magnetic disk memory, a CD-ROM, an optical memory, and the like) include computer usable program codes.

What is claimed is:

1. A method implemented by one or more computing devices, the method comprising:
    decoding a sentence to be translated based at least in part on one or more translation rules to generate one or more candidate translated texts of the sentence to be translated;
    generating respective one or more probabilities of translation from the sentence to be translated to the one or more candidate translated texts based at least in part on one or more features of the one or more candidate translated texts that affect the respective one or more probabilities of translation and a translation probability prediction model; and
    selecting a candidate translated text as a translated text of the sentence to be translated from the one or more candidate translated texts;
    wherein the one or more features of the one or more candidate translated texts that affect the respective one or more probabilities of translation comprise at least respective one or more degrees of semantic similarity between the sentence to be translated and the one or more candidate translated texts; and
    wherein the respective one or more degrees of semantic similarity between the sentence to be translated and the one or more candidate translated texts is calculated by:
        obtaining a sentence vector of the sentence to be translated, and a sentence vector of a candidate translated text of the one or more candidate translated texts; and calculating a distance between the sentence vector of the sentence to be translated and the sentence vector of the candidate translated text for serving as a degree of semantic similarity between the sentence to be translated and the candidate translated text, wherein the sentence vector of the sentence to be translated and the sentence vector of the candidate translated text comprise respective semantic sentence information.

2. The method of claim 1, further comprising generating the sentence vector of the sentence to be translated and the sentence vector of the candidate translated text, the generating comprising:
constructing first neural net language model samples corresponding to first N-gram phrases included in the sentence to be translated and second neural net language model samples corresponding to second N-gram phrases included in the candidate translated text, respectively based at least in part on correspondence relationships between a plurality of words and a plurality of word vectors, a first neural net language model corresponding to a source language and a second neural net language model corresponding to a target language;
learning and obtaining the sentence vector of the sentence to be translated and the sentence vector of the candidate translated text by maximizing a sum of likelihood probabilities of the first neural net language model samples corresponding to the first N-gram phrases included in the sentence to be translated and a sum of likelihood probabilities of the second neural net language model samples corresponding to the second N-gram phrases included in the candidate translated text, while minimizing the distance between the sentence vector of the sentence to be translated and the sentence vector of the candidate translated text as a training goal, wherein the source language refers to a language to which the sentence to be translated belongs, and the target language refers to a language to which the candidate translated text belongs.

3. The method of claim 2, wherein the constructing comprises:
parsing the sentence to be translated and the candidate translated text to obtain first words included in the sentence to be translated and second words included in the candidate translated text;
obtaining first word vectors corresponding to the first words included in the sentence to be translated and second word vectors corresponding to the second words included in the candidate translated text based at least in part on the correspondence relationships between the plurality of words and the plurality of word vectors;
randomly setting the sentence vector of the sentence to be translated and the sentence vector of the candidate translated text;
constructing the first neural net language model samples corresponding to the first N-gram phrases included in the sentence to be translated based at least in part on the first word vectors corresponding to the first words included in the first N-gram phrases, the sentence vector of the sentence to be translated and the first neural net language model corresponding to the source language; and
constructing the second neural net language model samples corresponding to the second N-gram phrases included in the candidate translated text based at least in part on the second word vectors corresponding to the second words included in the second N-gram phrases, the sentence vector of the candidate translated text and the second neural net language model corresponding to the target language.

4. The method of claim 2, wherein the learning and obtaining comprises:
calculating a value of an objective function based at least in part on the first neural net language model samples and the second neural net language model samples; and
determining whether the value of the objective function is greater than a previous value of the objective function;
adopting an optimization algorithm to update the sentence vector of the sentence to be translated and the sentence vector of the candidate translated text in response to determining whether the value of the objective function is greater than the previous value of the objective function; and
recalculating the value of the objective function based at least in part on the first neural net language model samples and the second neural net language model samples, wherein:
the objective function includes a difference between a sum of a first average value and a second average value and the distance between the sentence vector of the sentence to be translated and the sentence vector of the candidate translated text,
the first average value includes an average value of the likelihood probabilities of the first neural net language model samples corresponding to the first N-gram phrases included in the sentence to be translated, and
the second average value includes an average value of the likelihood probabilities of the second neural net language model samples corresponding to the second N-gram phrases included in the candidate translated text.

5. The method of claim 1, wherein, the distance comprises an included angle cosine distance or a Euclidean distance.

6. The method of claim 1, wherein the one or more features comprises at least one of a degree of similarity between the sentence to be translated and a candidate translated text of the one or more candidate translated texts, a phrase translation probability from the sentence to be translated to the candidate translated text, a phrase translation probability from the candidate translated text to the sentence to be translated, a word translation probability from the sentence to be translated to the candidate translated text, a word translation probability from the candidate translated text to the sentence to be translated, a sentence probability of the candidate translated text, or a classification probability of whether the sentence to be translated and the candidate translated text are reordered.

7. The method of claim 1, wherein decoding the sentence to be translated based at least in part on the one or more translation rules comprises using one or more algorithms including a CYK decoding algorithm, a stack-based decoding algorithm or a shift-reduce decoding algorithm.

8. The method of claim 1, wherein the decoding comprises:
parsing the sentence to be translated to generate a plurality of substrings of the sentence to be translated;
obtaining respective candidate translated texts of the plurality of substrings based at least in part on the one or more translation rules; and
combining and splicing corresponding candidate translated texts of adjacent substrings according to positions of the plurality of substrings in the sentence to be translated to form the one or more candidate translated texts of the sentence to be translated.

9. The method of claim 8, wherein obtaining the respective candidate translated texts of the plurality of substrings based at least in part on the one or more translation rules comprises:
   determining whether a substring of the plurality of substrings belongs to a translation rule of the one or more translation rules; and
   generating a candidate translated text of the substring according to the translation rule in response to determining that the substring belongs to the translation rule.

10. The method of claim 1, further comprising learning the translation probability prediction model from pre-stored parallel corpora through a linear regression algorithm.

* * * * *